US010580428B2

(12) United States Patent
Osako et al.

(10) Patent No.: US 10,580,428 B2
(45) Date of Patent: Mar. 3, 2020

(54) AUDIO NOISE ESTIMATION AND FILTERING

(71) Applicant: SONY CORPORATION, Tokyo (JP)

(72) Inventors: Keiichi Osako, Tokyo (JP); Takashi Shibuya, Tokyo (JP); Toshiyuki Sekiya, Kanagawa (JP); Mototsugu Abe, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/501,124

(22) PCT Filed: Aug. 6, 2015

(86) PCT No.: PCT/JP2015/072319
§ 371 (c)(1),
(2) Date: Feb. 1, 2017

(87) PCT Pub. No.: WO2016/027680
PCT Pub. Date: Feb. 25, 2016

(65) Prior Publication Data
US 2017/0229137 A1 Aug. 10, 2017

(30) Foreign Application Priority Data
Aug. 18, 2014 (JP) ................................ 2014-165681

(51) Int. Cl.
*G10L 21/00* (2013.01)
*G10L 21/0232* (2013.01)
(Continued)

(52) U.S. Cl.
CPC ...... *G10L 21/0232* (2013.01); *G10L 21/0208* (2013.01); *G10L 21/0264* (2013.01);
(Continued)

(58) Field of Classification Search
USPC ................................ 704/200–230, 500–504
See application file for complete search history.

(56) References Cited

U.S. PATENT DOCUMENTS

2006/0271354 A1* 11/2006 Sun ........................ G10L 19/26 704/205
2009/0192796 A1* 7/2009 Buck .................. G10L 21/0208 704/233

(Continued)

FOREIGN PATENT DOCUMENTS

CN 102194464 A 9/2011
CN 102404671 A 4/2012

(Continued)

OTHER PUBLICATIONS

International Search Report and Written Opinion of PCT Application No. PCT/JP2015/072319, dated Oct. 20, 2015, 8 pages of English Translation and 7 pages of ISRWO.

(Continued)

*Primary Examiner* — Jesse S Pullias
(74) *Attorney, Agent, or Firm* — Chip Law Group

(57) ABSTRACT

The present technology relates to an audio processing apparatus, an audio processing method, and a program which enable to appropriately eliminate a noise. An audio processing apparatus includes a sound collector which collects audio, an audio enhancer which enhances audio to be extracted using an audio signal collected by the sound collector, an audio attenuator which attenuates the audio to be extracted using the audio signal collected by the sound collector, a noise environment estimator which estimates a surrounding noise environment, and a post-filtering unit which performs post-filtering processing using an audio-enhanced signal from the audio enhancer and an audio-attenuated signal from the audio attenuator, in which the post-filtering unit sets strength of processing for noise (Continued)

elimination according to the noise environment by the noise environment estimator. The present technology can be applied to an apparatus which performs audio recognition processing, such as a mobile phone.

12 Claims, 53 Drawing Sheets

(51) Int. Cl.

| | |
|---|---|
| ***G10L 21/0264*** | (2013.01) |
| ***G10L 25/84*** | (2013.01) |
| ***H04R 1/40*** | (2006.01) |
| ***G10L 21/0208*** | (2013.01) |
| ***H04R 3/00*** | (2006.01) |
| ***H04M 9/08*** | (2006.01) |
| *G10L 21/0216* | (2013.01) |

(52) U.S. Cl.
CPC ............. *G10L 25/84* (2013.01); *H04M 9/082* (2013.01); *H04R 1/40* (2013.01); *H04R 3/00* (2013.01); *G10L 2021/02166* (2013.01)

(56) References Cited

U.S. PATENT DOCUMENTS

| | | | | |
|---|---|---|---|---|
| 2011/0075857 | A1* | 3/2011 | Aoyagi | G01S 3/8036 381/92 |
| 2011/0228951 | A1 | 9/2011 | Sekiya et al. | |
| 2012/0057722 | A1 | 3/2012 | Osako et al. | |
| 2012/0078397 | A1* | 3/2012 | Lee | G10L 25/78 700/94 |
| 2013/0301837 | A1* | 11/2013 | Kim | H04N 7/15 381/56 |

FOREIGN PATENT DOCUMENTS

| | | | | |
|---|---|---|---|---|
| CN | 102907077 | A | 1/2013 | |
| EP | 2556652 | A1 | 2/2013 | |
| JP | 2007-147732 | * | 6/2007 | G10L 15/20 |
| JP | 2007-147732 | A | 6/2007 | |
| JP | 2009-049998 | A | 3/2009 | |
| JP | 2011-191669 | A | 9/2011 | |
| JP | 2012-058360 | A | 3/2012 | |
| JP | 2013-527490 | A | 6/2013 | |
| KR | 10-2012-0137436 | A | 12/2012 | |
| WO | 2011/127457 | A1 | 10/2011 | |

OTHER PUBLICATIONS

International Preliminary Report on Patentability of PCT Application No. PCT/JP2015/072319, dated Mar. 2, 2017, 8 pages of English Translation and 4 pages of IPRP.

* cited by examiner

FIG. 14 (A)
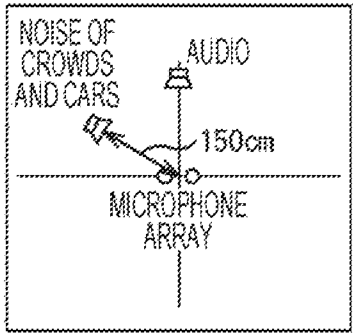
POINT SOUND SOURCE
FIG. 14 (B)
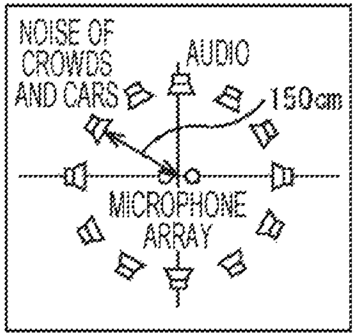
DIFFUSIVE NOISE
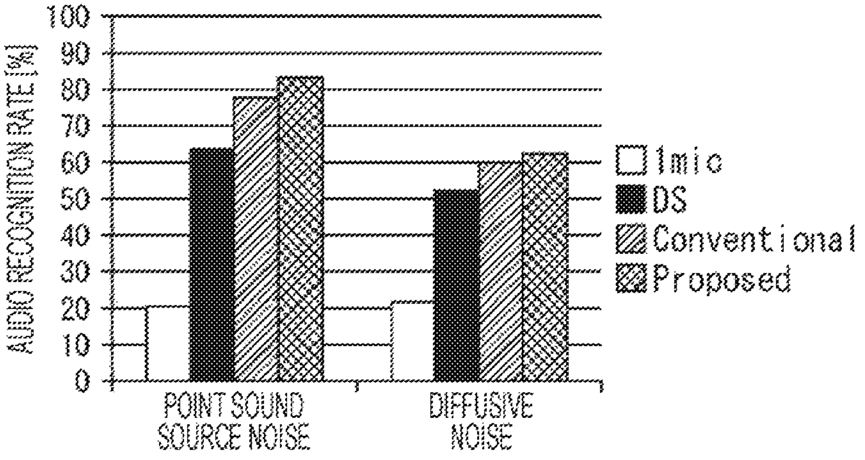
FIG. 14 (C)
| | 1mic | DS | Conventional | Proposed |
|---|---|---|---|---|
| POINT SOUND SOURCE NOISE | 20.47 | 63.74 | 77.73 | 83.3 |
| DIFFUSIVE NOISE | 21.68 | 52.42 | 60.01 | 62.33 |
FIG. 14 (D)

AUDIO NOISE ESTIMATION AND FILTERING

CROSS REFERENCE TO RELATED APPLICATIONS

This application is a U.S. National Phase of International Patent Application No. PCT/JP2015/072319 filed on Aug. 6, 2015, which claims priority benefit of Japanese Patent Application No. JP 2014-165681 filed in the Japan Patent Office on Aug. 18, 2014. Each of the above-referenced applications is hereby incorporated herein by reference in its entirety.

TECHNICAL FIELD

The present technology relates to an audio processing apparatus, an audio processing method, and a program. More specifically, the present technology relates to an audio processing apparatus, an audio processing method, and a program which can extract audio desired to be extracted by appropriately eliminating a noise.

BACKGROUND ART

Recently, user interfaces using audio have been spreading. The user interface using audio are used in, for example, a mobile phone (a device called a smartphone or the like) when making a telephone call or searching for information.

However, if it is used under an environment having many noises, the audio generated by a user cannot be correctly analyzed, and processing can be wrongly performed. Thus, Patent Document 1 proposes that desired audio is extracted by reducing influence of a noise.

CITATION LIST

Patent Document

Patent Document 1: Japanese Patent Application Laid-Open No. 2009-49998

SUMMARY OF THE INVENTION

Problems to be Solved by the Invention

In Patent Document 1, post-filter means is provided, and the post-filter means is configured so as to perform maximum a posteriori (MAP) optimization and the feedback loop operates in order for noises to be zero. With this configuration, if there is, for example, a multiple-point sound source noise (a non-point sound source noise), or a diffusive noise, a musical noise can be generated in an output signal.

When the musical noise is generated, a feeling of strangeness in an auditory sense is caused, and in addition, the audio recognition performance is deteriorated. Regardless of noise types such as a point sound source noise, a multiple-point sound source noise, and a diffusive noise, it is desired that the noise is to be appropriately eliminated so that the musical noise or the like is not generated.

The present technology has been made in view of the situation and is to enable to appropriately eliminate a noise and extract desired audio.

Solutions to Problems

An audio processing apparatus in an aspect of the present technology includes a sound collector which collects audio, an audio enhancer which enhances audio to be extracted using an audio signal collected by the sound collector, an audio attenuator which attenuates the audio to be extracted using the audio signal collected by the sound collector, a noise environment estimator which estimates a surrounding noise environment, and a post-filtering unit which performs post-filtering processing using an audio-enhanced signal from the audio enhancer and an audio-attenuated signal from the audio attenuator, in which the post-filtering unit sets strength of processing for noise elimination according to the noise environment by the noise environment estimator.

The noise environment estimator can estimate the noise environment using the audio collected by the sound collector The sound collector includes a plurality of microphones, and the noise environment estimator can calculate a correlation between signals collected by the plurality of microphones and set a value of the correlation as an estimation result of the noise environment.

The noise environment estimator can estimate the noise environment using the audio-enhanced signal and the audio-attenuated signal.

A correlation between an amplitude spectrum of the audio-enhanced signal and an amplitude spectrum of the audio-attenuated signal can be calculated, and a value of the correlation can be set as an estimation result of the noise environment.

The noise environment estimator can estimate the noise environment on the basis of information input externally.

The information input externally can be at least one piece of information of information on a surrounding noise environment supplied by a user, position information, or time information.

An utterance section estimator which estimates an utterance section using the audio-enhanced signal and the audio-attenuated signal is further included, in which the noise environment estimator can estimate the noise environment in a section estimated as a non-utterance section by the utterance section estimator.

The audio enhancer can generate the audio-enhanced signal using addition-type beam forming, Delay and Sum beam forming, or adaptive beam forming.

The audio attenuator can generate the audio-attenuated signal using subtraction-type beam forming, Null beam forming, or adaptive Null beam forming.

The number of microphones included in the sound collector and the number of inputs to the audio enhancer and the audio attenuator can be changed on the basis of an estimation result by the noise environment estimator.

The change can be performed during starting or operating.

An audio processing method in an aspect of the present technology includes the steps of collecting audio by a sound collector, generating an audio-enhanced signal in which audio to be extracted is enhanced using an audio signal collected by the sound collector, generating an audio-attenuated signal in which the audio to be extracted is attenuated using the audio signal collected by the sound collector, estimating a surrounding noise environment, and performing post-filtering processing using the audio-enhanced signal and the audio-attenuated signal, in which the post-filtering processing includes a step of setting strength of processing for noise elimination according to the estimated noise environment.

A program in an aspect of the present technology causing a computer to perform processing includes the steps of collecting audio by a sound collector, generating an audio-enhanced signal in which audio to be extracted is enhanced using an audio signal collected by the sound collector, generating an audio-attenuated signal in which the audio to be extracted is attenuated using the audio signal collected by the sound collector, estimating a surrounding noise environment, and performing post-filtering processing using the audio-enhanced signal and the audio-attenuated signal, in which the post-filtering processing includes a step of setting strength of processing for noise elimination according to the estimated noise environment.

In an audio processing apparatus, an audio processing method, and a program in an aspect of the present technology, audio is collected, an audio-enhanced signal in which audio to be extracted is enhanced using a collected audio signal is generated, an audio-attenuated signal in which the audio to be extracted is attenuated is generated, a surrounding noise environment is estimated, and post-filtering processing using the audio-enhanced signal and the audio-attenuated signal is performed. In the post-filtering processing, strength of processing for noise elimination is set according to the estimated noise environment.

Effects of the Invention

According to an aspect of the present technology, it is possible to appropriately eliminate a noise and extract desired audio.

Note that, effects are not necessarily limited to the effects described here and may be any one of the effects described in the present disclosure.

BRIEF DESCRIPTION OF DRAWINGS

FIGS. 14(A), 14(B), 14(C) and 14(D) are diagrams explaining improvement of an audio recognition rate.

MODE FOR CARRYING OUT THE INVENTION

Hereinafter, modes for carrying out the present technology (hereinafter, referred to as embodiments) are described. Note that, the description is made in the following order:

1. Configuration of external appearance of audio processing apparatus
2. Regarding sound source
3. Internal configuration and operation of first audio processing apparatus (a first (a) to a first (c) audio processing apparatuses)
4. Internal configuration and operation of second audio processing apparatus (a second (a) to a second (c) audio processing apparatuses)
5. Internal configuration and operation of third audio processing apparatus (a third (a) to a third (c) audio processing apparatuses)
6. Regarding recording medium <Configuration of External Appearance of Audio Processing Apparatus>

Figure 1:
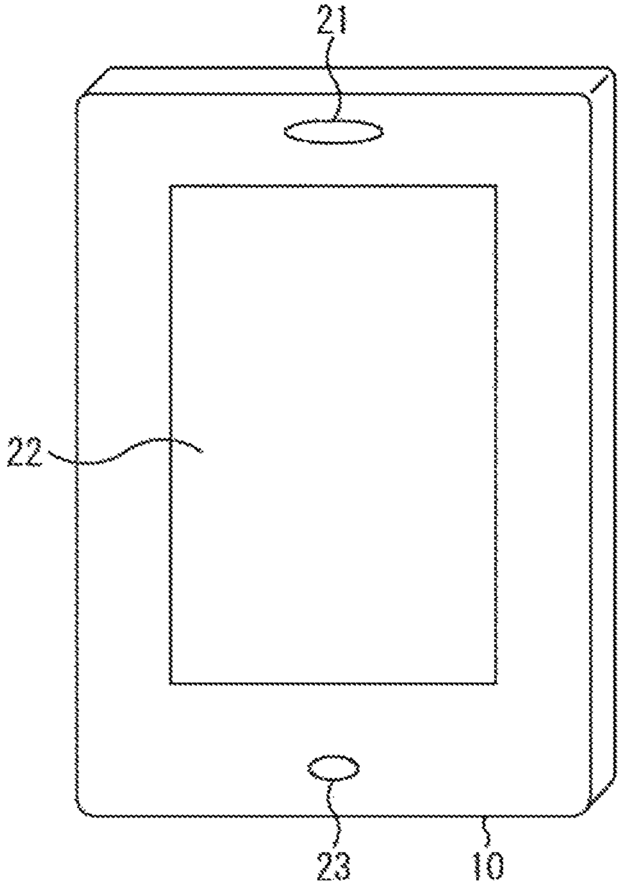
FIG. 1 is a diagram illustrating a configuration of an embodiment of an audio processing apparatus to which the present technology is applied.

FIG. 1 is a diagram illustrating of a configuration of an external appearance of an audio processing apparatus to which the present technology is applied. The present technology can be applied to an apparatus which processes an audio signal. For example, the present technology can be applied to mobile phones (including a device called a smartphone or the like), units which process a signal from a microphone of a game machine, noise cancelling headphones, earphones, or the like. Furthermore, the present technology can be applied to apparatuses equipped with applications which implement hands-free calling, an audio interactive system, audio command inputting, voice chatting, or the like.

The audio processing apparatus to which the present technology is applied may be a mobile terminal or an apparatus used by being installed at a predetermined position. Moreover, the present technology can be applied to a device called a wearable device or the like, which is an eyeglasses-type terminal or a terminal mounted on an arm or the like.

Here, a mobile phone (smartphone) is exemplified. FIG. 1 is a diagram illustrating a configuration of an external appearance of a mobile phone 10. On one side of the mobile phone 10, a speaker 21, a display 22, and a microphone 23 are provided.

The speaker 21 and the microphone 23 are used when audio calling is performed. The display 22 displays various types of information. The display 22 may be a touch panel.

The microphone 23 has a function to collect the audio uttered by a user and is a unit to which audio to be subjected processing to be described later is input. The microphone 23 is an electret condenser microphone, a MEMS microphone, or the like. The sampling of the microphone 23 is, for example, 16000 Hz.

Figure 3:
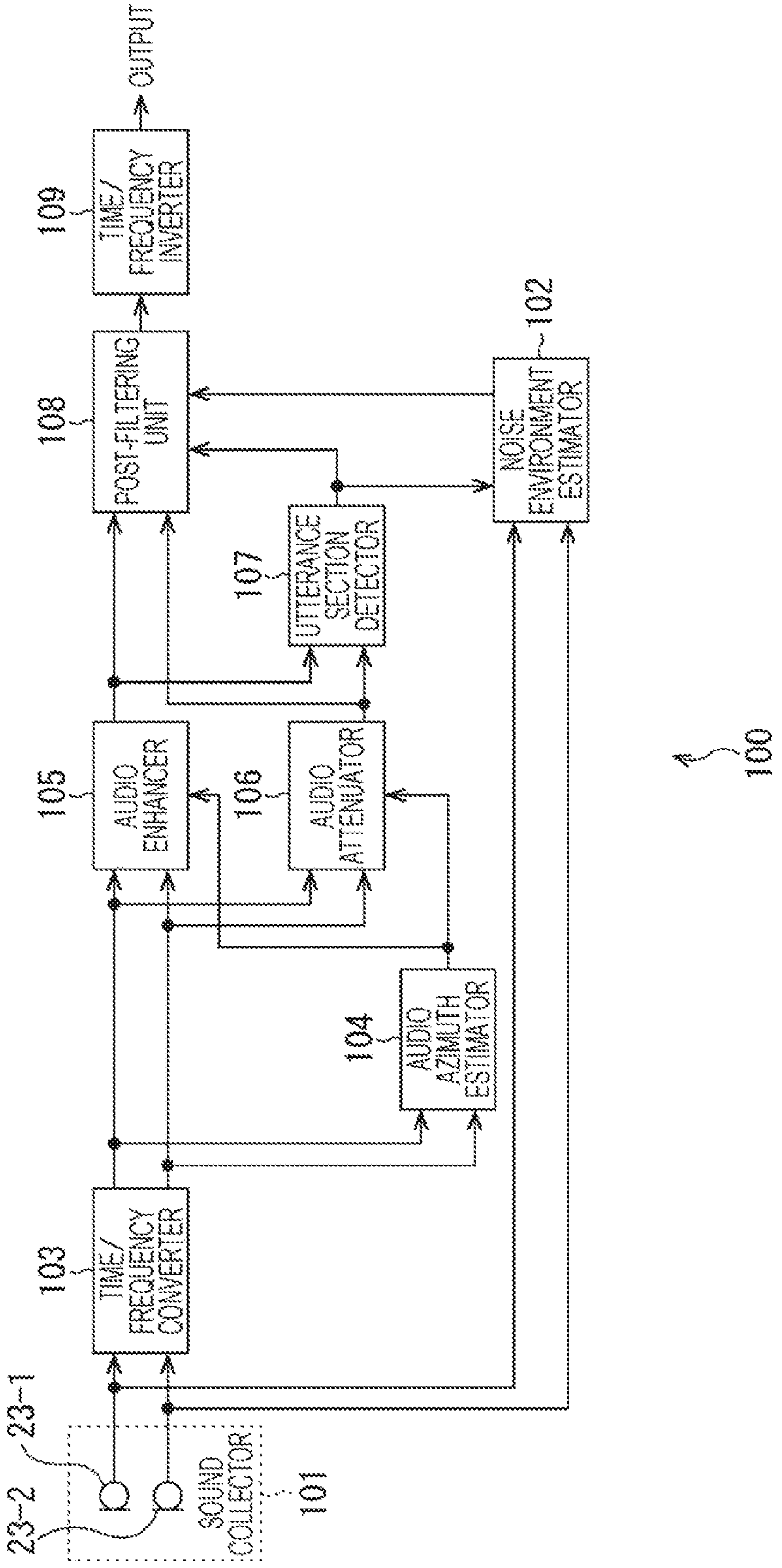
FIG. 3 is a diagram illustrating an internal configuration of a first (a) audio processing apparatus.

Note that, one microphone 23 is illustrated in FIG. 1, but two or more microphones 23 are provided as described later. In FIG. 3 and the following drawings, a plurality of microphones 23 is illustrated as a sound collector. The sound collector includes two or more microphones 23.

The installation position of the microphone 23 on the mobile phone 10 is merely an example, and this does not mean that the installation position is limited to the lower center part illustrated in FIG. 1. For example, although not illustrated, a microphone 23 may be provided at each of the lower left and the lower right of the mobile phone 10, or on a different face from the display 22, such as a side face of the mobile phone 10.

The installation position and the number of the microphones 23 are different from individual devices to which the microphone 23 is provided, and the microphone 23 is only required to be installed at an appropriate installation position for each device.

<Regarding Sound Source>

Figure 2:
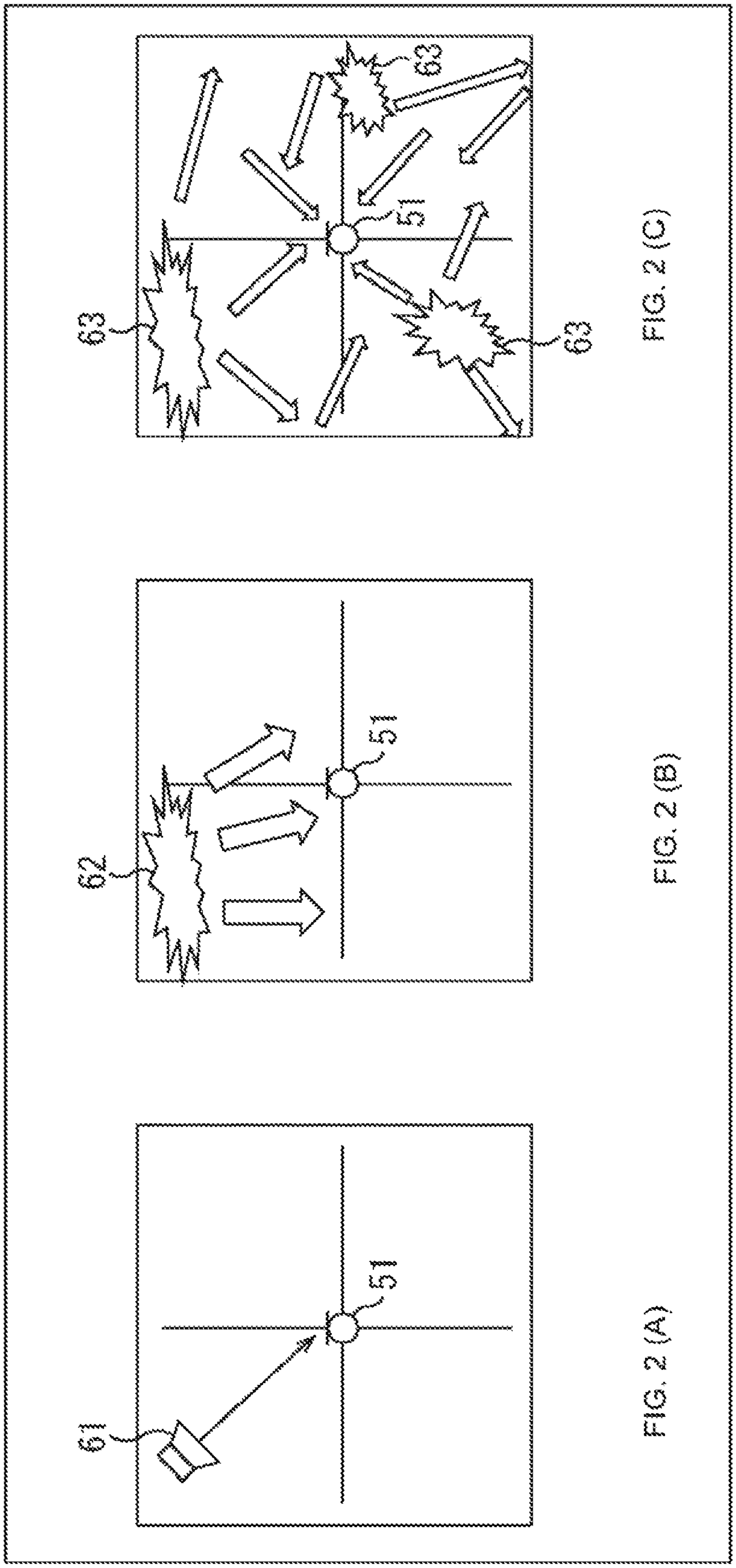
FIGS. 2(A), (B) and (C) are diagrams explaining a sound source.

With reference to FIGS. 2(A), 2(B) and 2(C), the term "sound source" used in the following description is explained. FIG. 2(A) is a diagram explaining a point sound source. A microphone 51 is positioned at a center part. It is assumed that a sound source 61 generates a sound to be collected by the microphone 51.

The point sound source is a sound source in a space and is a sound source which can be approximated as a point. For example, audio which one user is speaking or a sound generated from a speaker of a television receiver or an audio device is a sound from the point sound source.

FIG. 2(B) is a diagram explaining a non-point sound source (a multiple-point sound source). Similarly to FIG. 2(A), the microphone 51 is positioned at a center part, and a sound source 62 is generating sound, but the sound source 62 is a sound source which cannot be approximated as a point. The non-point sound source is, for example, a travelling sound of a vehicle, and the travelling sound of the vehicle is generated from all the four tires of the vehicle. This sound source cannot be approximated to a point, and is a sound source in which a sound is generated from a region having a certain size.

The non-point sound source is a sound source in a space and is a sound source which cannot be approximated as a point. For example, the non-point sound source includes, in addition to the above travelling sound of a vehicle or the like, air conditioning, fan noise, or the like.

FIG. 2(C) is a diagram explaining a diffusive sound source. Similarly to FIG. 2(A), the microphone 51 is positioned at a center part, but a plurality of sound sources 63 is around it. The diffusive sound source is a situation in which there are innumerable sound sources, or a situation becomes the same as the situation in which there are innumerable sound sources due to reflection or reverberation, and is a sound source when sound wavefronts disperse in all direction.

If a sound generated from a point sound source is a noise, it is relatively easy to remove the noise from the point sound source and extract desired audio. However, if a sound generated from a non-point sound source or a diffusive sound source is a noise, it is difficult to remove all noises from the sound source and extract desired audio compared to the case in which the noise is removed from the point sound source.

However, for example, a user interface by audio needs to handle various situations of when a noise from a point sound source is mixed with audio desired to be extracted, when a noise from a non-point sound source is mixed, when a noise from a diffusive sound source is mixed, or the like.

In other words, if noise elimination processing specializes in any one of a point sound source, a non-point sound source, or a diffusive sound source, the performance of the noise elimination to a sound source in which the noise elimination processing is not specialized is deteriorated, and the noise elimination processing needs to appropriately handle various noises. Thus, an audio processing apparatus capable of appropriately handling various noises is described below.

<Internal Configuration and Operation of First Audio Processing Apparatus>

<Internal Configuration and Operation of First (a) Audio Processing Apparatus>

FIG. 3 is a diagram illustrating a configuration of a first (a) audio processing apparatus 100. The audio processing apparatus 100 is provided inside the mobile phone 10 and constitutes a part of the mobile phone 10. The audio processing apparatus 100 illustrated in FIG. 3 includes a sound collector 101, a noise environment estimator 102, a time/frequency converter 103, an audio azimuth estimator 104, an audio enhancer 105, an audio attenuator 106, an utterance section detector 107, a post-filtering unit 108, and a time/frequency inverter 109.

Note that, the mobile phone 10 includes a communication unit to function as a telephone and a function to connect with a network, but the configuration of the audio processing apparatus 100 relating to audio processing is illustrated here and the illustration and description of other functions are omitted.

The sound collector 101 includes a plurality of microphones 23, and includes a microphone 23-1 and a microphone 23-2 in the example illustrated in FIG. 3. Note that, it is assumed that the sound collector 101 includes two microphones 23 here, but the sound collector 101 may include two or more microphones 23.

It is exemplified that a second and a third audio processing apparatuses to be described later each include two or more microphones 23. Furthermore, by providing two or more microphones 23, it is possible to improve precision of a result obtained by processing such as beam forming to be described later.

The audio signal collected by the sound collector 101 is supplied to the time/frequency converter 103 and the noise environment estimator 102. The information from the utterance section detector 107 is further supplied to the noise environment estimator 102. The time/frequency converter 103 converts the signal in the supplied time domain into a signal in a frequency domain, and supplies the converted signal to the audio azimuth estimator 104, the audio enhancer 105, and the audio attenuator 106.

The audio azimuth estimator 104 estimates the direction of a sound source. The audio azimuth estimator 104 estimates which direction the audio uttered by a user is generated from with respect to the sound collector 101. The information on the azimuth estimated by the audio azimuth estimator 104 is supplied to the audio enhancer 105 and an audio attenuator 105.

The audio enhancer 105 performs processing to enhance the audio estimated to be uttered by the user using the audio signal of the microphone 23-1 and the audio signal of the microphone 23-2 which are supplied from the time/frequency converter 103, and the information on the azimuth estimated by the audio azimuth estimator 104.

The audio attenuator 106 performs processing to attenuate the audio estimated to be uttered by the user using the audio signal of the microphone 23-1 and the audio signal of the microphone 23-2 which are supplied from the time/frequency converter 103, and the information on the azimuth estimated by the audio azimuth estimator 104.

The audio data output from the audio enhancer 105 and the audio attenuator 106 is supplied to the utterance section detector 107 and the post-filtering unit 108. The utterance section detector 107 detects a section estimated to be uttered by the user from the supplied audio data.

The section estimated to be uttered by the user is referred to as an utterance section, and the other sections are referred to as a non-utterance section. The utterance section is a section having an audio signal and a noise signal, and the non-utterance section is a section having a noise signal.

The information from the utterance section detector 107 is supplied to the post-filtering unit 108 and the noise environment estimator 102. The noise environment estimator 102 estimates a noise environment using the audio signal in the non-utterance section from the sound collector 101. The noise environment is whether the environment has many noises or whether the environment only has a noise easy to eliminate, and can be, for example, the information on the sound sources described with reference to FIGS. 2(A), 2(B) and 2(C).

Specifically, the noise environment is an environment in which a noise is generated from a point sound source, an environment in which a noise is not generated from a point sound source (that is, a noise is generated from a non-point sound source or a diffusive sound source), or the like. As described later, the noise environment estimator 102 does not specifically estimate the number of sound sources, but calculates a value indicating how many noises the environment has, and supplies the value to the post-filtering unit 108.

The post-filtering unit 108 receives supplies of an audio-enhanced signal from the audio enhancer 105, an audio-attenuated signal from the audio attenuator 106, information on the utterance section from the utterance section detector 107, and information on the noise environment from the noise environment estimator 102, and performs post-filtering processing using these signals and information.

As described later, the post-filtering unit 108 can perform appropriate post-filtering processing according to a noise environment using these signals and information. The signal processed by the post-filtering unit 108 is supplied to the time/frequency inverter 109. The time/frequency inverter 109 converts the signal in the supplied frequency band into a signal in a time domain, and outputs the converted signal to a post-stage processing unit which is not illustrated.

Figure 4:
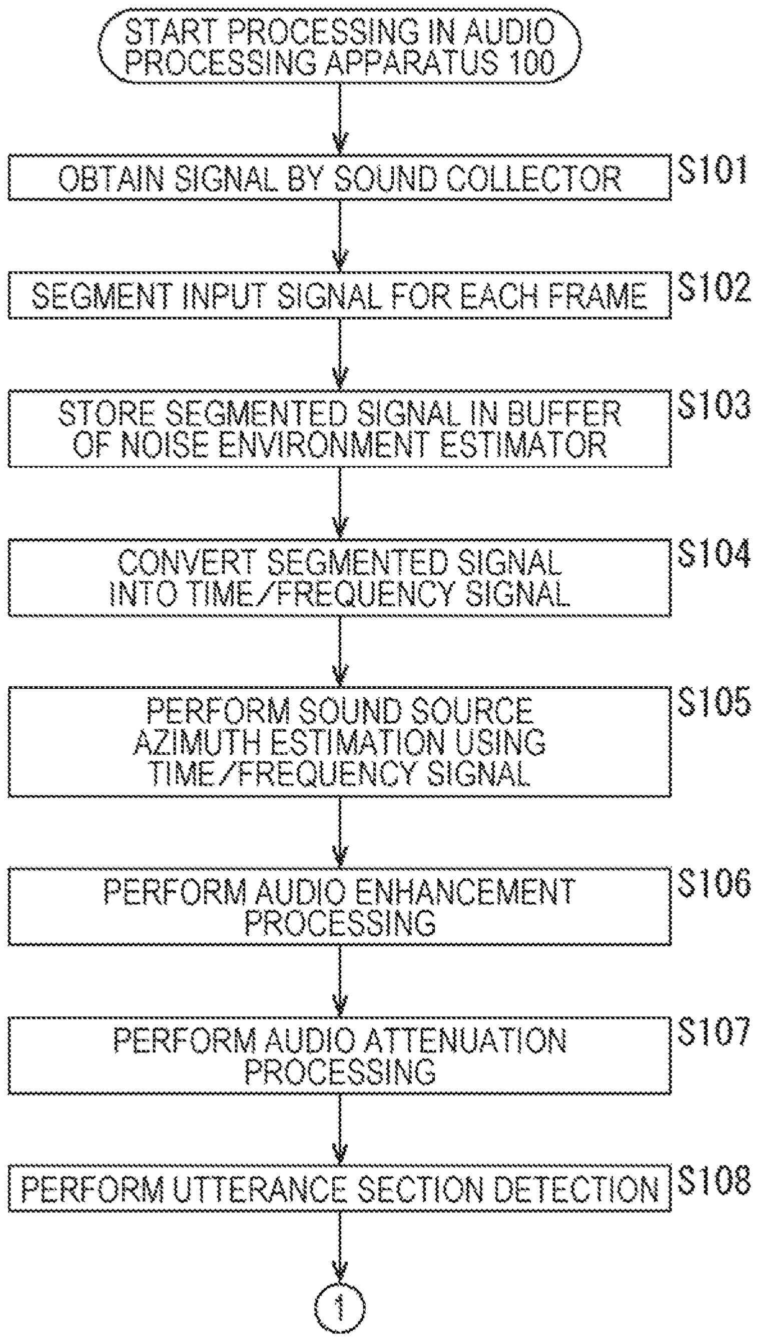
FIG. 4 is a flowchart explaining of an operation of the first (a) audio processing apparatus.
Figure 5:
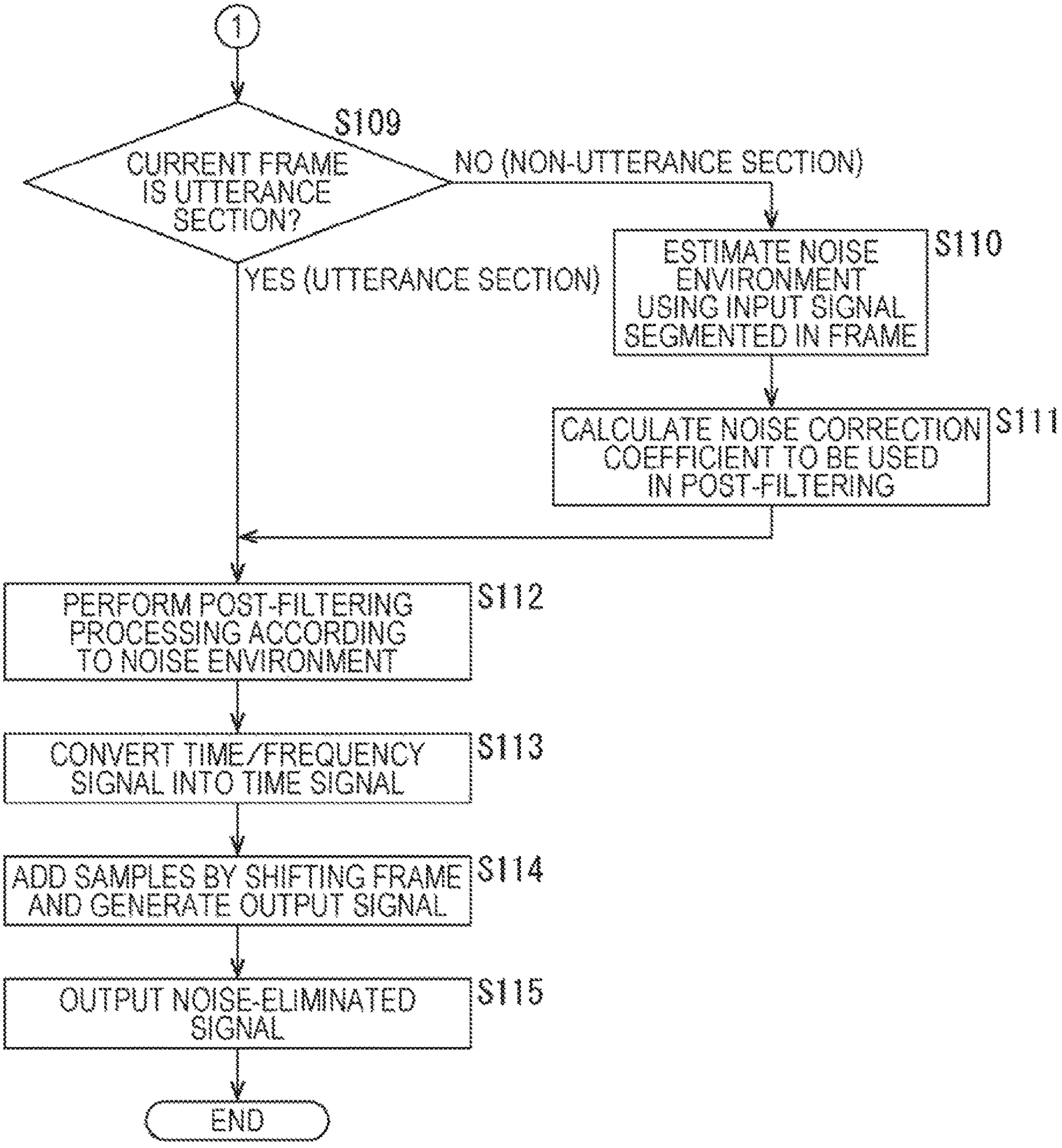
FIG. 5 is a flowchart explaining of the operation of the first (a) audio processing apparatus.

With reference to the flowcharts of FIGS. 4 and 5, the operation of the first (a) audio processing apparatus 100 illustrated in FIG. 3 is described.

In step S101, the microphone 23-1 and the microphone 23-2 of the sound collector 101 each collect an audio signal. Note that, the audio collected here is a sound generated by a user, a noise, or a sound mixed therewith.

In step S102, the input signal is segmented for each frame. The sampling when being segmented is performed at, for example, 16000 Hz. Here, it is assumed that the signal in a frame segmented from the microphone 23-1 is a signal $x_1$ (n) and that the signal in a frame segmented from the microphone 23-2 is a signal $x_2$ (n).

The segmented signal $x_1$ (n) and signal $x_2$ (n) are supplied to the noise environment estimator 102 and the time/frequency converter 103.

In step S103, the noise environment estimator 102 stores the supplied signal $x_1$ (n) and signal $x_2$ (n) in a buffer. Since the utterance section detector 107 estimates the noise environment in the section detected as the non-utterance section, the noise environment estimator 102 receives a supply of a detection result by the utterance section detector 107, but cannot start processing to the supplied signal until it is determined that the detection result is a non-utterance section. Thus, the signal $x_1$ (n) and the signal $x_2$ (n) supplied to the noise environment estimator 102 are temporarily stored in the buffer.

The buffer is not illustrated in FIGS. 2(A), (B) and (C), but may be included in the noise environment estimator 102 or may be provided separately from the noise environment estimator 102 and shared with other units. Furthermore, the buffer size can be reduced by discarding the signal $x_1$ (n) and the signal $x_2$ (n) stored in the buffer if the detection result by the utterance section detector 107 is an utterance section.

In step S104, the time/frequency converter 103 converts the supplied signal $x_1$ (n) and the signal $x_2$ (n) into time/frequency signals. By referring to FIG. 6(A), the signal $x_1$ (n) and the signal $x_2$ (n) in the time domain are input to the time/frequency converter 103. The signal $x_1$ (n) and the signal $x_2$ (n) are separately converted into a signal in a different frequency domain.

Here, it is assumed that the signal $x_1$ (n) in the time domain is converted into a signal $x_1$ (f,t) in a frequency domain and that the signal $x_2$ (n) in the time domain is converted into a signal $x_2$ (f,t) in a frequency domain. Note that, f of (f,t) is an index indicating a frequency band, and t of (f,t) is a frame index.

Figure 6:
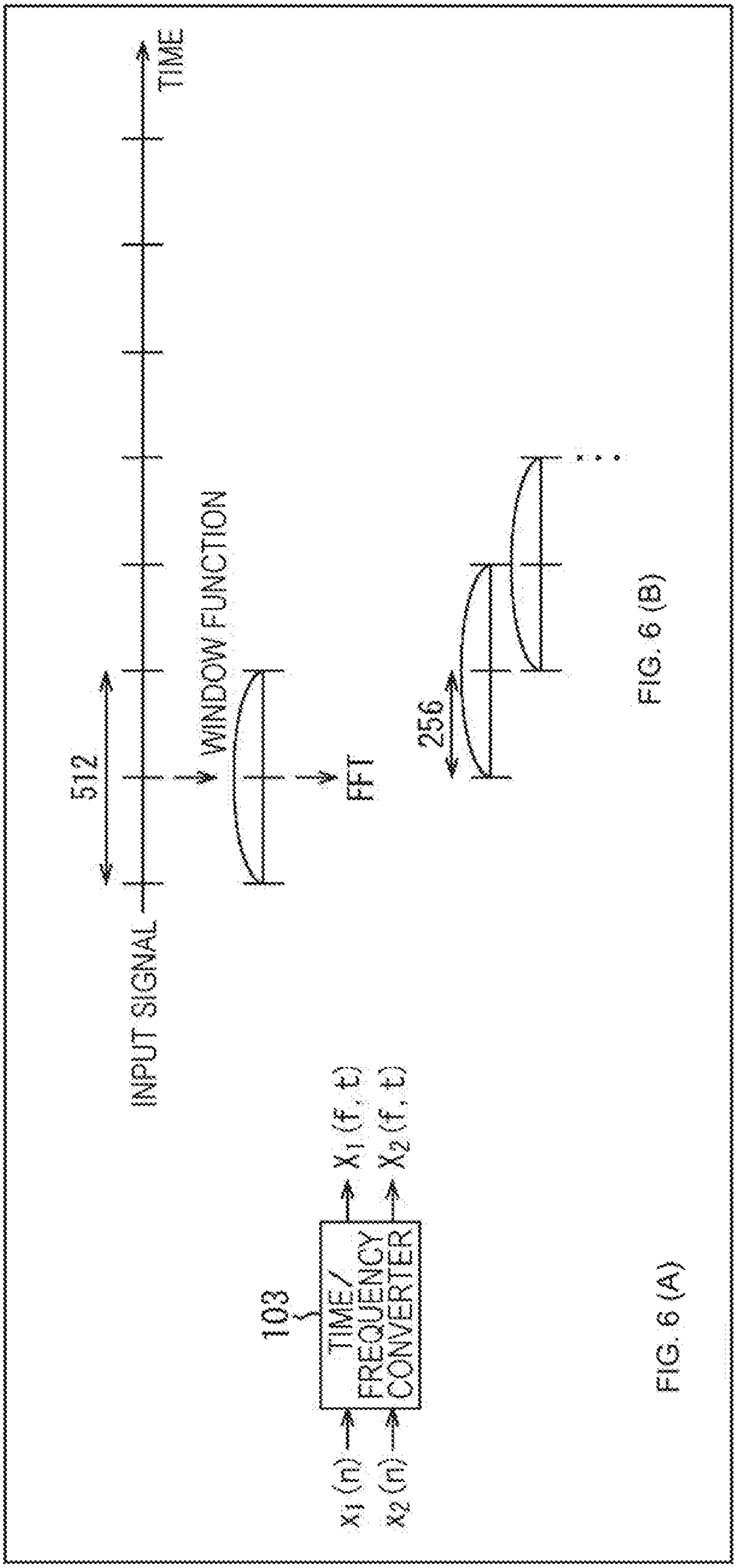
FIGS. 6(A) and 6(B) are diagrams explaining processing in a time/frequency converter.

As illustrated in FIG. 6(B), the time/frequency converter 103 divides the signal $x_1$ (n) or the signal $x_2$ (n) in the input time domain (hereinafter, the signal $x_1$ (n) is exemplified) into frames for each sample of a frame size N, multiplies the divided signal with a window function, and converts the multiplied signal into a signal in a frequency domain with a fast Fourier transform (FFT). In the frame division, a section to extract samples is shifted by each N/2.

FIG. 6(B) illustrates an example in which the frame size N is set to 512 and the shift size is set to 256. In this case, the input signal $x_1$ (n) is divided into frames by the frame size N of 512, multiplied with the window function, and converted into a signal in the frequency domain by performing an FFT computation.

Returning back to the description of the flowchart in FIG. 4, in step S104, the signal $x_1$ (f,t) and the signal $x_2$ (f,t) which are converted into the signals in the frequency domains by the time/frequency converter 103 are supplied to the audio azimuth estimator 104, the audio enhancer 105, and the audio attenuator 106.

In step S105, the audio azimuth estimator 104 performs sound source azimuth estimation using the time/frequency signal. The sound source azimuth estimation can be performed on the basis of, for example, the multiple signal classification (MUSIC) method. With regard to the MUSIC method, the method described in the following document can be applied.

R. O. Schmidt, "Multiple emitter location and signal parameter estimation," IEEE Trans. Antennas Propagation, vol. AP-34, no. 3, pp. 276-280, March 1986.

It is assumed that an estimation result by the audio azimuth estimator 104 is M(f,t). The estimation result M(f,t) is supplied to the audio enhancer 105 and the audio attenuator 106.

In step S106, the audio enhancer 105 performs audio enhancement processing. Furthermore, in step S107, the audio attenuator 106 performs audio attenuation processing. Here, with reference to FIGS. 7(A), 7(B) and 7(C) and 8(A), 8(B) and 8(C), the audio enhancement processing performed by the audio enhancer 105 and the audio attenuation processing performed by the audio attenuator 106 are described. The audio enhancement processing and the audio attenuation processing can be performed with processing using beam forming.

The beam forming is processing in which a sound is collected by a plurality of microphones (microphone array) and addition or subtraction is performed by adjusting the phase input to each microphone. With the beam forming, it is possible to enhance or attenuate a sound in a specific direction.

The audio enhancement processing can be performed with addition-type beam forming. Delay and Sum (hereinafter, referred to as DS) is addition-type beam forming and is beam forming to enhance the gain of a desired sound azimuth.

The audio attenuation processing can be performed with attenuation-type beam forming. Null Beam Forming (hereinafter, referred to as NBF) is attenuation-type beam forming and is beam forming to attenuate the gain of a desired sound azimuth.

Figure 7:
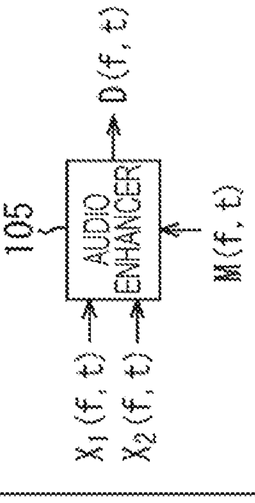
FIGS. 7 (A), 7(B) and 7(C) are diagrams explaining processing in an audio enhancer.
Figure 7:
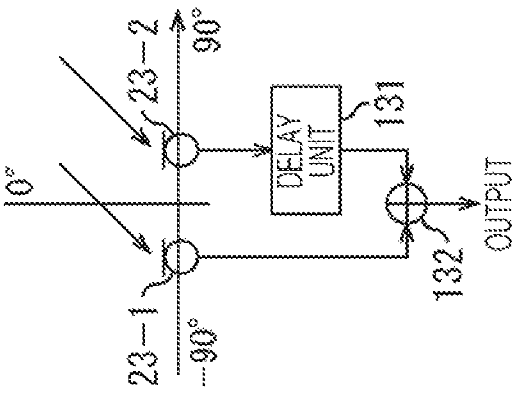
Figure 7:
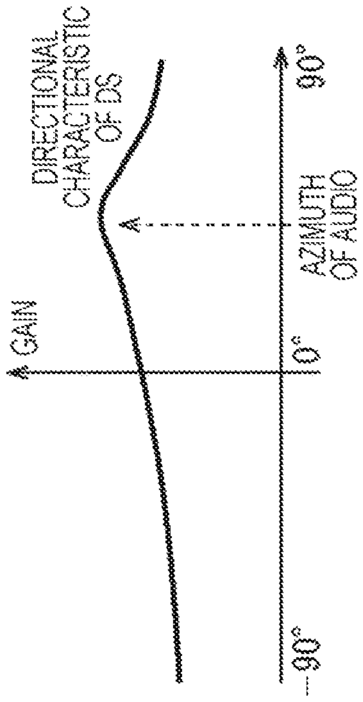

First, with reference to FIGS. 7 (A), 7(B) and 7(C), the audio enhancement processing performed by the audio enhancer 105 is described. Here, a case using DS beam forming which is the addition-type beam forming is exemplified. As illustrated in FIG. 7(A), the audio enhancer 105 inputs the signal $x_1$ (f,t) and the signal $x_2$ (f,t) from the time/frequency converter 103 and inputs the estimation result M(f,t) from the audio azimuth estimator 104. Then, as the processing result, a signal D(f,t) is output to the utterance section detector 107 and the post-filtering unit 108.

When the audio enhancer 105 performs the audio enhancement processing on the basis of the DS beam forming, the audio enhancer 105 has a configuration illustrated in FIG. 7(B). The audio enhancer 105 includes a delay unit 131 and an adder 132. In FIG. 7(B), the illustration of the time/frequency converter 103 is omitted.

The audio signal from the microphone 23-1 is supplied to the adder 132, and the audio signal from the microphone 23-2 is delayed by the delay unit 131 by a predetermined time and then supplied to the adder 132. Since the microphone 23-1 and the microphone 23-2 are installed apart by a predetermined distance, the audio signals are received as signals having a different propagation delay time by the route difference.

In the beam forming, the signal from one microphone 23 is delayed in order to compensate the propagation delay related to the signal arriving in a predetermined direction. The delay unit 131 performs the delay. In the DS beam forming illustrated in FIG. 7(B), the delay unit 131 is provided at the microphone 23-2 side.

In FIG. 7(B), it is assumed that the microphone 23-1 side is −90°, the microphone 23-2 side is 90°, and the front side of microphone 23 which is a vertical direction with respect to the axis passing through the microphone 23-1 and the microphone 23-2 is 0°. Furthermore, in FIG. 7(B), the arrow toward the microphone 23 indicates a sound wave of a sound generated from a predetermined sound source.

When the sound wave comes from a direction illustrated in FIG. 7(B), it means that the sound wave comes from the sound source positioned between 0° and 90° with respect to the microphone 23. With the DS beam forming, it is possible to obtain a directional characteristic illustrated in FIG. 7(C). The directional characteristic is an output gain of beam forming which is plotted for each azimuth.

In the input of the adder 132 which performs the DS beam forming and is illustrated in FIG. 7(B) in of the audio enhancer 105, when the phases of the signals arriving from a predetermined direction, that is, a direction between 0° and 90° are matched, the signal arriving from the direction is enhanced. On the other hand, the signals arriving from a direction other than the predetermined direction are not enhanced as much as the signal arriving from the predetermined direction since the phases are not matched.

From the above reasons, as illustrated in FIG. 7(C), the gain becomes high at an azimuth where there is a sound source. The signal D(f,t) output from the audio enhancer 105 has a directional characteristic illustrated in FIG. 7(C). Furthermore, the signal D(f,t) output from the audio enhancer 105 is the audio generated by the user and is a signal in which audio desired to be extracted (hereinafter, appropriately referred to as desired audio) is mixed with a noise desired to be suppressed.

The desired audio in the signal D(f,t) output from the audio enhancer 105 is more enhanced than the desired audio included in the signal $x_1$ (f,t) and the signal $x_2$ (f,t) which are input to the audio enhancer 105. Furthermore, the noise in the signal D(f,t) output from the audio enhancer 105 is more reduced than the noise included in the signal $x_1$ (f,t) and the signal $x_2$ (f,t) which are input to the audio enhancer 105.

The audio enhancement processing is further described. The audio enhancer 105 inputs, as described above, the signal $x_1$ (f,t) and the signal $x_2$ (f,t) and outputs the signal D(f,t) in which the desired audio is enhanced. When the audio enhancement processing is performed with the DS beam forming, the relation between the input signal and the output signal is expressed with the following Expression (1).

[Expression 1]

$$D(f,t)=W^T(f,t)X(f,t) \quad (1)$$

In Expression (1), X(f) indicates an input signal vector of the number L of microphones 23, W(f) is a filter coefficient vector of the DS beam forming, and the superscript ".T" indicates a transposition. Furthermore, X(f,t) and W(f,t) in Expression (1) are respectively expressed as the following Expression (2). Furthermore, the filter coefficient of the DS beam forming is obtained from the following Expression (3).

[Expression 2]

$$X(f,t)=[X_1(f,t), X_2(f,t)]^T \quad (2)$$
$$W(f,t)=[W_1(f,t), W_2(f,t)]^T$$

[Expression 3]

$$W_1(f,t)=\frac{1}{L}\exp(-i2\pi(f/N)f_s d\sin M(f,t)/c) \quad (3)$$

In Expression (3), L is a constant indicating the number of microphones, $f_S$ is a constant indicating a sampling frequency, N is a constant indicating a DFT point, d is a constant indicating an interval of microphones, and c is a constant indicating a sound speed.

The audio enhancer 105 performs the audio enhancement processing by substituting values for Expressions (1) to (3). Note that, although the DS beam forming has been exemplified here, other beam forming such as adaptive beam forming, or audio enhancement processing by means other than the beam forming, can be applied to the present technology.

Figure 8:
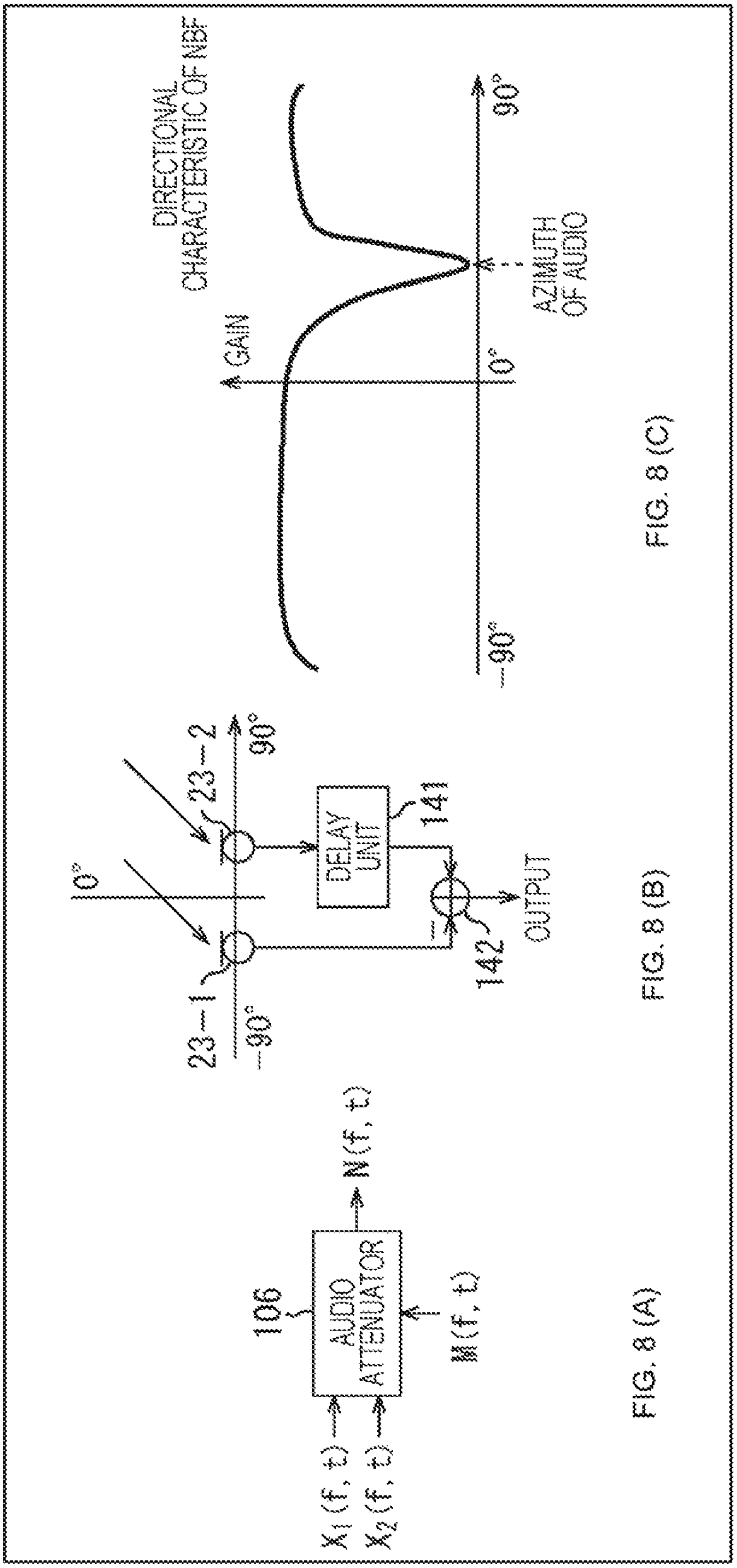
FIGS. 8(A), 8(B) and 8(C) are diagrams explaining processing in an audio attenuator.

Next, with reference to FIGS. 8(A), 8(B) and 8(C), the audio attenuation processing performed by the audio attenuator 106 is described. Here, a case using Null beam forming (NBF) which is subtraction-type beam forming is exemplified.

As illustrated in FIG. 8(A), the audio attenuator 106 inputs the signal $x_1$ (f,t) and the signal $x_2$ (f,t) from the time/frequency converter 103 and inputs the estimation result M(f,t) from the audio azimuth estimator 104. Then, as the processing result, a signal D(f,t) is output to the utterance section detector 107 and the post-filtering unit 108.

When the audio attenuator 106 performs the audio attenuation processing on the basis of the NULL beam forming, the audio attenuator 106 has a configuration illustrated in FIG. 8(B). The audio attenuator 106 includes a delay unit 141 and a subtractor 142. In FIG. 8(B), the illustration of the time/frequency converter 103 is omitted.

The audio signal from the microphone 23-1 is supplied to the subtractor 142, and the audio signal from the microphone 23-2 is delayed by the delay unit 141 by a predetermined time and then supplied to the subtractor 142. The configuration to perform the Null beam forming and the configuration to perform the DS beam forming which has been described with reference to FIGS. 7(A), 7(B) and 7(C) are basically the same and have a difference between that addition is performed by the adder 132 or that subtraction is performed by the subtractor 142. Thus, the detailed description regarding the configuration is omitted here. Furthermore, the descriptions regarding the same units as those in FIGS. 7(A), 7(B) and 7(C) are appropriately omitted.

When the sound wave comes from a direction indicated by an arrow in FIG. 8(B), it means that the sound wave comes from the sound source positioned between 0° and 90° with respect to the microphone 23. With the NULL beam forming, it is possible to obtain a directional characteristic illustrated in FIG. 8(C).

In the input of the subtractor 142 which performs the NULL beam forming and is illustrated in FIG. 8(B) in the audio attenuator 106, when the phases of the signals arriving from a predetermined direction, that is, a direction between 0° and 90° are matched, the signal arriving from the direction is attenuated. Theoretically, as a result of the attenuation, the desired audio becomes zero. On the other hand, the signals arriving from a direction other than the predetermined direction are not attenuated as much as the signal arriving from the predetermined direction since the phases are not matched.

From the above reasons, as illustrated in FIG. 8(C), the gain becomes low at an azimuth where there is a sound source. The signal N(f,t) output from the audio attenuator 106 has a directional characteristic illustrated in FIG. 8(C). Furthermore, a signal N(f,t) output from the audio attenuator 106 is a signal in which the desired audio is cancelled and the noise remains.

The desired audio in the signal N(f,t) output from the audio attenuator 106 is more attenuated than the desired audio included in the signal $x_1$ (f,t) and the signal $x_2$ (f,t) which are input to the audio attenuator 106. Furthermore, the noise included in the signal $x_1$ (f,t) and the signal $x_2$ (f,t) which are input to the audio attenuator 106 is about the same level as the noise in the signal N(f,t) output from the audio attenuator 106.

The audio attenuation processing is further described. The audio attenuator 106 inputs, as described above, the signal $x_1$ (f,t) and the signal $x_2$ (f,t) and outputs the signal N(f,t) in which the desired audio is attenuated. When the audio attenuation processing is performed with the NULL beam forming, the relation between the input signal and the output signal is indicated with the following Expression (4).

[Expression 4]

$$N(f,t)=F^T(f,t)X(f,t) \quad (4)$$

In Expression (4), X(f) indicates an input signal vector of the number L of microphones 23, F(f) is a filter coefficient vector of the NULL beam forming, and the superscript ".T" indicates a transposition. Furthermore, X(f,t) and F(f,t) in Expression (1) are respectively expressed as the following Expression (5). Furthermore, the filter coefficient of the NULL beam forming is obtained from the following Expression (6).

[Expression 5]

$$X(f,t)=[X_1(f,t),\ X_2(f,t)]^T \quad (5)$$
$$F(f,t)=[F_1(f,t),\ -F_2(f,t)]^T$$

[Expression 6]

$$F_1(f,t)=\frac{1}{L}\exp(-i2\pi(f/N)f_s d\sin M(f,t)/c) \quad (6)$$

In Expression (6), L is a constant indicating the number of microphones, $f_S$ is a constant indicating a sampling frequency, N is a constant indicating a DFT point, d is a constant indicating an interval of microphones, and c is a constant indicating a sound speed.

The audio attenuator 106 performs the audio attenuation processing by substituting values for Expressions (4) to (6). Note that, although the NULL beam forming has been exemplified here, other beam forming such as adaptive Null beam forming or audio attenuation processing by means other than the beam forming, can be applied to the present technology.

The explanation is returned back to the flowchart in FIG. 4. The audio enhancer 105 performs the audio enhancement processing in step S106, the audio attenuator 106 performs the audio attenuation processing in step S107, and these results are supplied to the utterance section detector 107 and the post-filtering unit 108.

Figure 9:
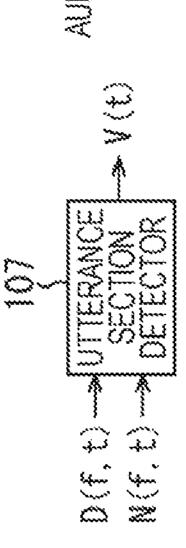
FIGS. 9(A) and 9(B) are diagrams explaining processing in an utterance section detector.
Figure 9:
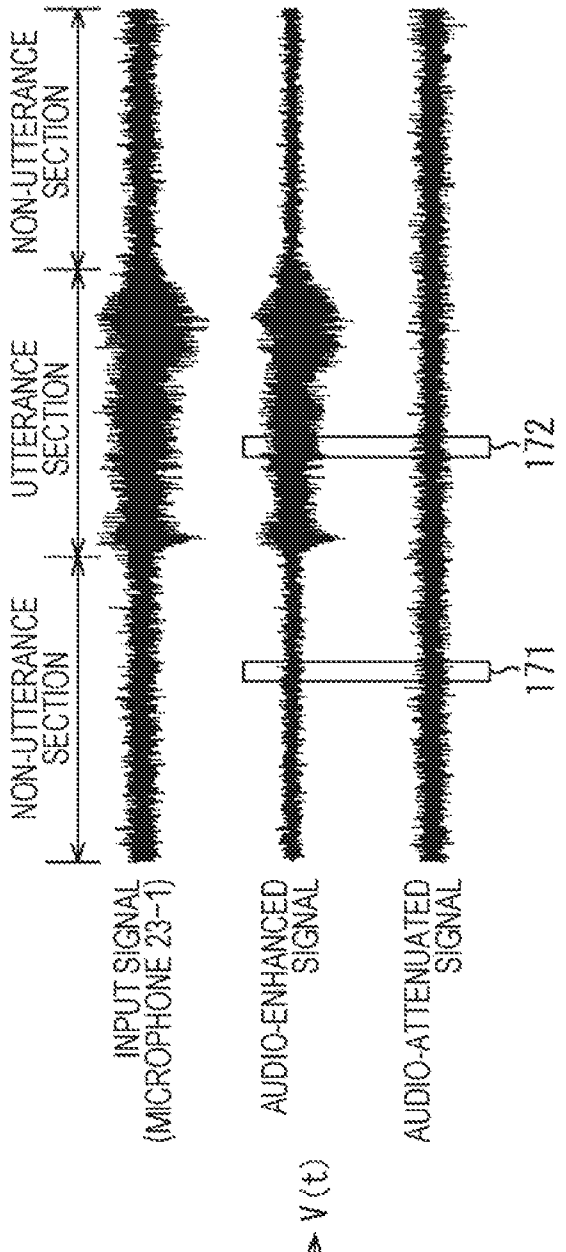

In step S108, the utterance section detector 107 performs utterance section detection (voice activity detection: VAD). This detection is described with reference to FIGS. 9(A) and 9(B). As illustrated in FIG. 9(A), the audio-enhanced signal D(f,t) from the audio enhancer 105 and the audio-attenuated signal N(f,t) from the audio attenuator 106 are input to the utterance section detector 107. The utterance section detector 107 outputs a detection result V(t).

The upper row of FIG. 9(B) indicates an example of a waveform of the input signal, the middle row indicates an example of a waveform of the audio-enhanced signal D(f,t), and the lower row indicates an example of a waveform of the audio-attenuated signal N(f,t). Note that, although the waveforms illustrated in FIG. 9(B) indicate the waveforms in the time domain, the actual processing is performed in the frequency domain since the audio processing apparatus 100 performs the processing after converting the signal into the signal in the frequency domain, as described above. Here, the waveform in the time domain is illustrated for the sake of description.

It is assumed that the waveform of the input signal illustrated in the upper row of FIG. 9(B) is, for example, the waveform of the audio collected by the microphone 23-1. The part where the waveform becomes large at the center part is an utterance section, and the parts before and after it are non-utterance sections. The utterance section is a section where a user utters, and the non-utterance section is a section where a user does not utter.

In the audio-enhanced signal illustrated in the middle row of FIG. 9(B), the signal at the utterance section becomes larger and the signal at the non-utterance section becomes smaller compared to the input signal. In the audio-attenuated signal illustrated in the lower row of FIG. 9(B), the signal at the utterance section becomes smaller and the signal at the non-utterance section becomes substantially the same compare to the input signal.

The audio-enhanced signal illustrated in the middle row of FIG. 9(B) is compared with the audio-attenuated signal illustrated in the lower row in a section 171 and a section 172 which are enclosed with squares in the drawing. The section 171 is a section in the non-utterance section, and when the audio-enhanced signal is compared with the audio-attenuated signal in the non-utterance section, for example, when the difference is taken, the difference is small. In contrast, the section 172 is a section in the utterance section, and when the audio-enhanced signal is compared with the audio-attenuated signal in the utterance section, for example, when the difference is taken, the difference is large.

For this reason, it is possible to recognize the utterance section or the non-utterance section from the difference between the audio-enhanced signal and the audio-attenuated signal. Specifically, by using a value calculated in the computation based on the following Expression (7), the detection results of the utterance section and the non-utterance section is generated by the determination based on the following Expression (8) and output.

[Expression 7]

$$vad=20\log_{10}\left\{\frac{\sum_{f=f_a}^{f_b}|D(f,t)|}{\sum_{f=f_a}^{f_b}|N(f,t)|}\right\} \quad (7)$$

[Expression 8]

$$V(t)=\begin{cases}0 & vad<Thr\\ 1 & vad>Thr\end{cases} \quad (8)$$

In Expression (7), $f_a$ and $f_b$ are respectively the lower limit and the upper limit of the frequency band used in the calculation for the utterance section detection. By setting a band in which many audio components are included as the frequency band, better performance can be obtained. For example, the lower limit is set to 200 Hz, and the upper limit is set to 2000 Hz.

In Expression (8), Thr indicates a threshold and is set to, for example, about 10 db. As indicated in Expression (8), when a value of a value vad calculated with Expression (7) is smaller than the threshold Thr, 0 is output as the detection result V(t), and when a value of the value vad is larger than the threshold Thr, 1 is output as the detection result V(t).

It is assumed that when the detection result V(t) is 0, this indicates that it is determined as the non-utterance section (there is only a noise signal), and that when the detection result V(t) is 1, this indicates that it is determined as the utterance section (there are an audio signal and a noise signal).

Note that, although the description is based on the above settings here, this description does not mean that the applicable scope of the present technology is limited when 0 or 1 is output as the detection result V(t).

Returning back to the flowchart in FIG. 4, when the utterance section detection is performed by the utterance section detector 107 in step S108, the processing proceeds to step S109 (FIG. 5). In step S109, the noise environment estimator 102 determines whether the current frame is the utterance section.

This determination is performed by referring to the detection result V(t) supplied from the utterance section detector 107. Specifically, when the detection result V(t) is "0", it is determined that the current frame is not the utterance section in step S109, and when the detection result V(t) is "1", it is determined as the utterance section in step S109.

When it is determined that the current frame is not the utterance section in step S109, in other words, when it is determined as the non-utterance section, the processing proceeds to step S110. In step S110, the noise environment estimator 102 estimates the noise environment using the input signal segmented in a frame.

Figure 10:
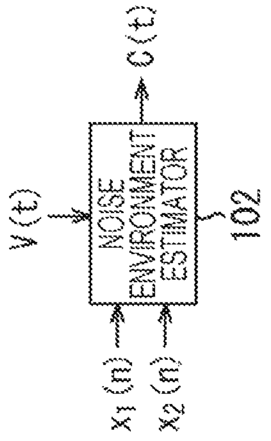
FIGS. 10(A) and 10(B) are diagrams explaining processing in a noise environment estimator.
Figure 10:
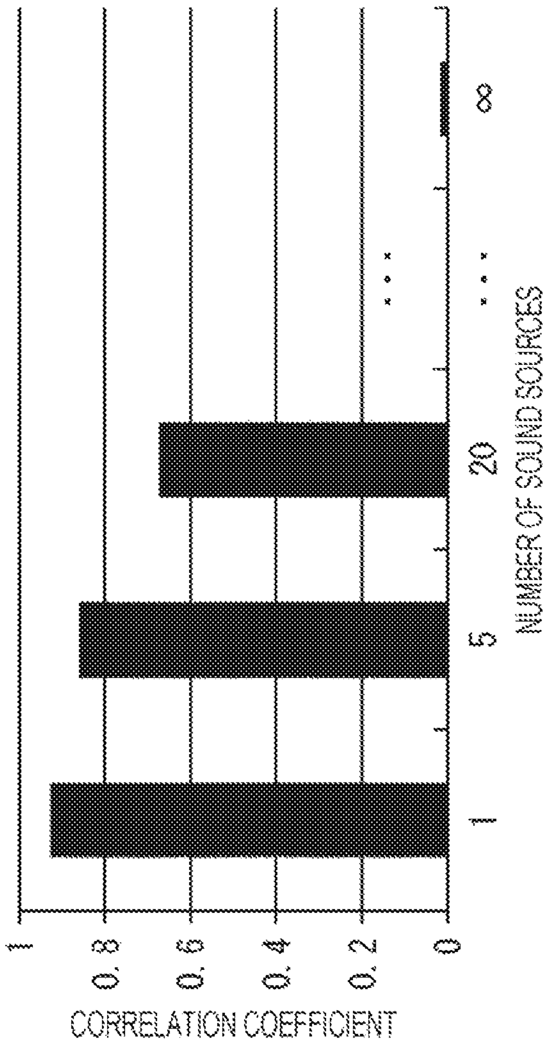

With reference to FIGS. 10(A) and 10(B), the noise environment estimation by the noise environment estimator 102 is described. As illustrated in FIG. 10(A), the signal $x_1$ (n) of the sound collected by the microphone 23-1 of the sound collector 101 and the signal $x_2$ (n) of the sound collected by the microphone 23-2 are input to the noise environment estimator 102. Furthermore, the detection result V(t) is input to the noise environment estimator 102 from the utterance section detector 107.

When it is determined as the non-utterance section referring to the supplied detection result V(t), the noise environment estimator 102 estimates the noise environment using the signal $x_1$ (n) and the signal $x_2$ (n). The estimation result is supplied to the post-filtering unit 108 as a correlation coefficient C(t). The correlation coefficient C(t) is calculated with the following Expression (9).

[Expression 9]

$$C(t) = \frac{\sum_{n=1}^{N} \{x_1(n) - \bar{x}_1\}\{x_2(n) - \bar{x}_2\}}{\sqrt{\sum_{n=1}^{N} \{x_1(n) - \bar{x}_1\}^2} \sqrt{\sum_{n=1}^{N} \{x_2(n) - \bar{x}_2\}^2}} \tag{9}$$

In Expression (9), N indicates a frame size. With the computation based on Expression (9), the correlation of the collected signals is calculated. The correlation coefficient C(t) calculated with Expression (9) is a value from −1.0 to 1.0.

The correlation coefficient C(t) relates to the number of sound sources around the microphone 23 (the sound collector 101). This is described with reference to FIG. 10(B). In the graph illustrated in FIG. 10(B), the abscissa indicates the number of sound sources, and the ordinate indicates a correlation coefficient.

When the number of sound sources is 1, the correlation coefficient is a value close to 1. When the number of sound sources is 5, the correlation coefficient is a value close to 0.8. When the number of sound sources is 20, the correlation coefficient is a value close to 0.6. Then, when the number of sound sources is infinity, in other words, when the number of sound sources is innumerable noises or a diffusive noise, the correlation coefficient is a value close to 0.

As described above, the number of sound sources around the microphone and the correlation value between the signals obtained from a plurality of microphones have a relation. Specifically, as illustrated in FIG. 10(B), there is a relationship that the correlation coefficient becomes smaller as the number of sound sources is increased. By using this relationship, the noise environment is estimated.

Here, since the correlation coefficient is calculated in the non-utterance section, the correlation coefficient to be calculated relates to the number of sound sources generating the noise. Thus, it is possible to estimate whether the environment has many sound sources generating the noise or the environment has a few sound sources from the correlation coefficient.

Then, in the case that the environment has many sound sources generating the noise, if the processing to suppress the noise is strongly performed, the possibility to generate the noise called a musical noise or the like becomes high. Thus, when it is determined that the environment has many sound sources generating the noise, the processing to suppress the noise is lightly performed to perform the control so that the musical noise is not generated.

On the other hand, in the case that the environment has a few sound sources generating the noise, if the processing to suppress the noise is strongly performed, the possibility to generate the noise called a musical noise or the like is low. Thus, when it is determined that the environment has a few sound sources generating the noise, the processing to suppress the noise is strongly performed to perform the control so that the noise is suppressed and the desired audio is extracted.

In order to control the strength of the processing to suppress the noise according to the noise environment, the noise correction coefficient to be used in the post-filtering is calculated in step S111. Here, the noise correction coefficient is described.

Figure 11:
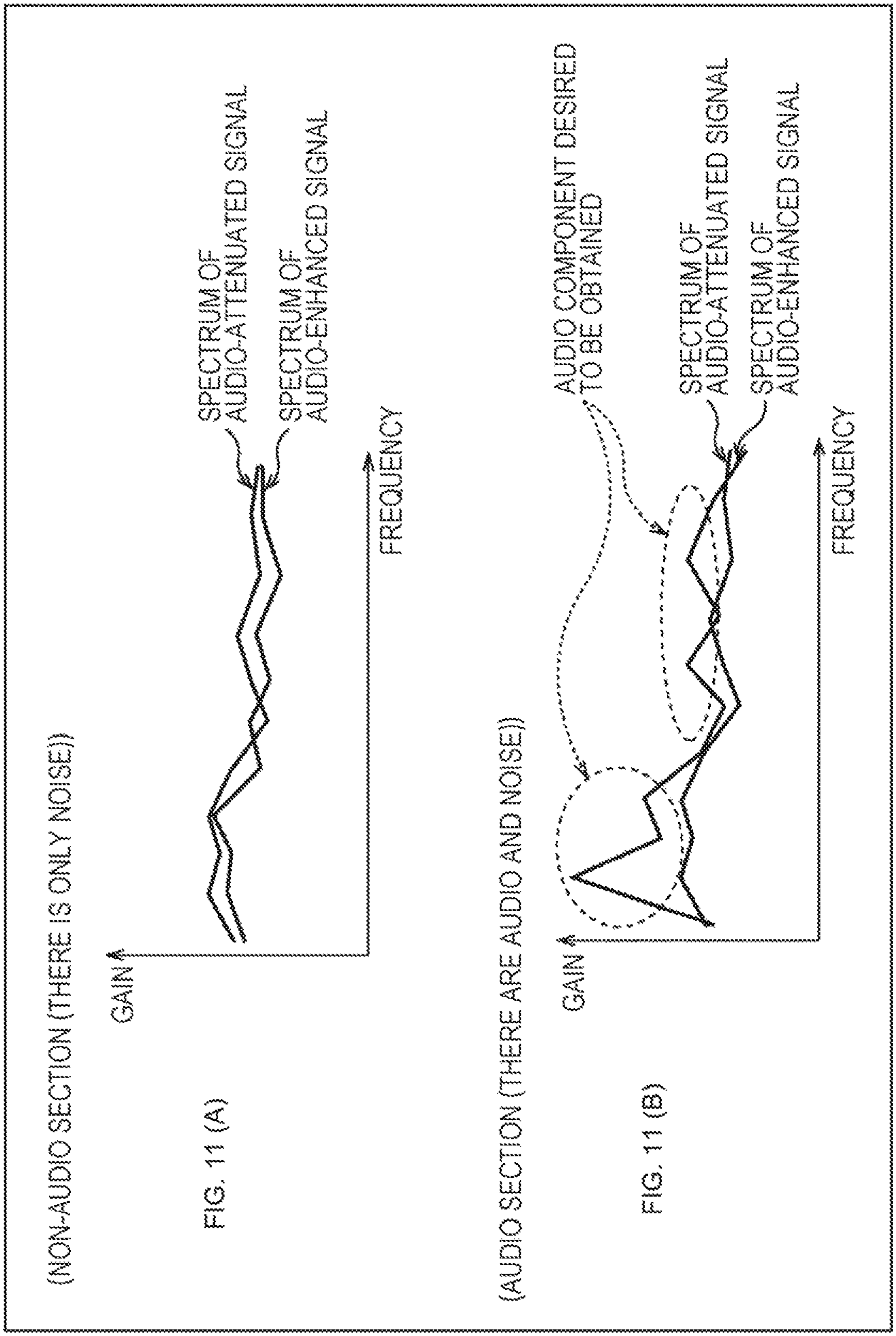
FIGS. 11(A) and 11(B) are diagrams explaining correction at a post-filtering unit.

FIG. 11(A) is a graph showing the spectrum of the audio-attenuated signal and the spectrum of the audio-enhanced signal in the non-audio section (the section in which there is only a noise). FIG. 11(B) is a graph showing the spectrum of the audio-attenuated signal and the spectrum of the audio-enhanced signal in the audio section (the section in which there are audio and a noise). In the graphs illustrated in FIG. 11(A) and FIG. 11(B), the abscissa indicates a frequency, and the ordinate indicates a gain.

In FIG. 11(B), there are audio components desired to be obtained in the parts enclosed by ellipsoidal broken lines (frequency band). The graph in the non-audio section illustrated in FIG. 11(A) shows that there is the difference between the audio-attenuated signal and the audio-enhanced signal from the frequencies. By referring to FIG. 11(B), it is shown that the gain of the audio-enhanced signal is high in the part where there is the audio component desired to be obtained.

For the above reasons, by subtracting the audio-attenuated signal from the audio-enhanced signal, it is possible to leave the audio component desired to be obtained. Furthermore, if the audio-attenuated signal is simply subtracted from the audio-enhanced signal, there is the difference between the audio-enhanced signal and the audio-attenuated signal in the section where there is only a noise as illustrated in FIG. 11(A), and the difference needs to be taken into consideration.

Figure 12:
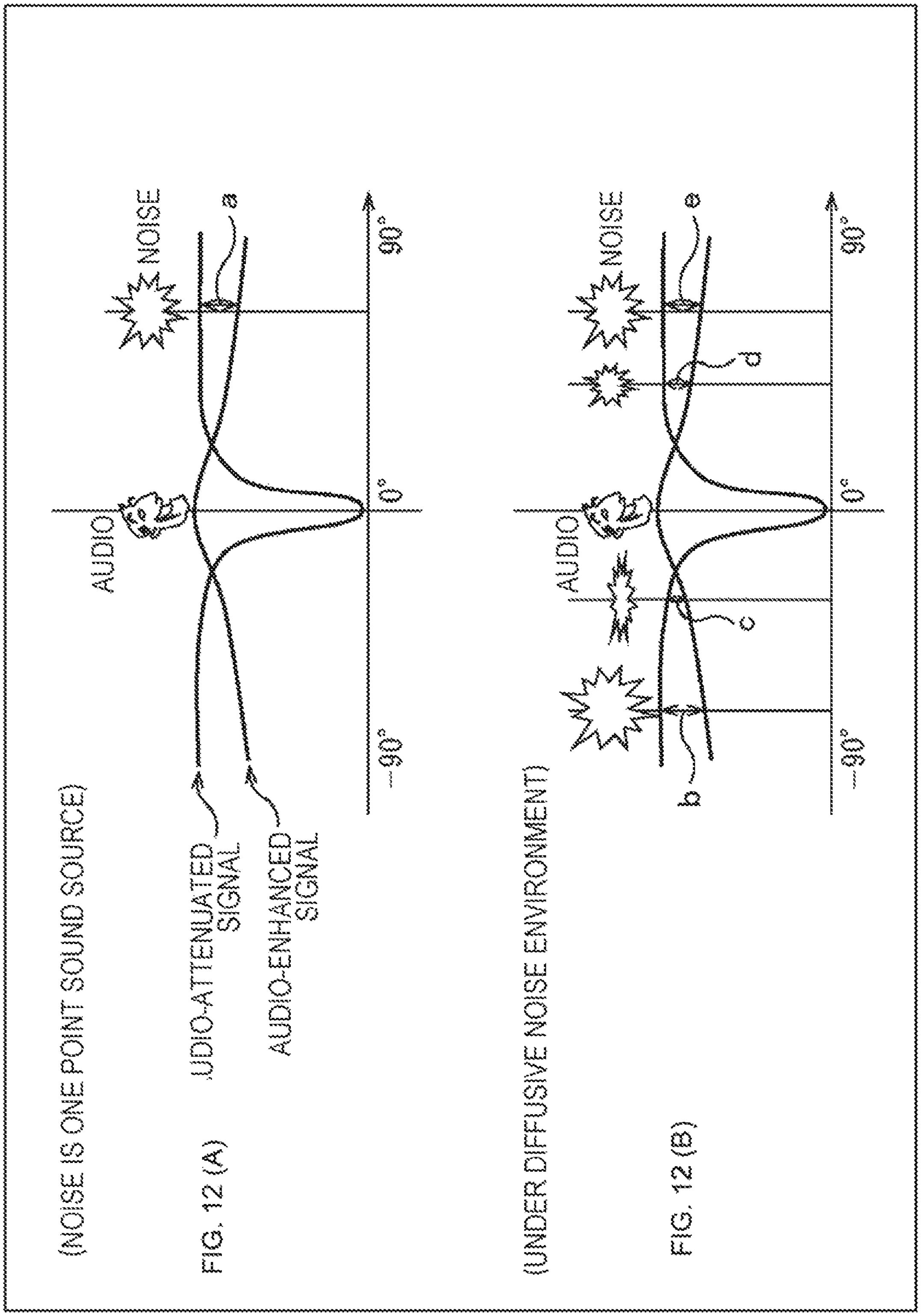
FIGS. 12(A) and 12(B) are diagrams explaining correction at the post-filtering unit.

As to be described with reference to FIGS. 12(A) and 12(B), the number of sound sources of the noise, in other words, the noise environment needs to be taken into consideration. FIG. 12(A) is a graph in which the audio-attenuated signal when the noise is one point sound source and the directional characteristic of the audio-enhanced signal are overlapped. FIG. 12(B) is a graph in which the audio-attenuated signal when the noise is the diffusive sound source (under the diffusive noise environment) and the directional characteristic of the audio-enhanced signal are overlapped.

Both of FIG. 12(A) and FIG. 12(B) show the case in which there is a sound source desired to be extracted in right front (0°) of the microphone 23. Furthermore, FIG. 12(A) and FIG. 12(B) show the positions the sound sources generating the noise.

By referring to FIG. 12(A), a difference a is generated in the gain of the noise included in the audio-attenuated signal and the audio-enhanced signal. The difference a is corrected by a noise correction coefficient which is described later. As illustrated in FIG. 12(A), when the noise is one point sound source, the point to be corrected is the part where there is the noise, and the noise correction coefficient can be uniquely set.

By referring to FIG. 12(B), there are many points to be corrected under the diffusive noise environment or under the non-point sound source noise environment, and the points can change momentarily. In the example illustrated in FIG. 12(B), there are four sound sources of the noise, and correction coefficients to correct a difference b, a difference c, a difference d, and a difference e at the sound sources are needed, but it is difficult to uniquely determine the correction coefficients. Furthermore, since these differences b to e can change momentarily, it is more difficult to uniquely determine the correction coefficients.

In the present technology, since the noise environment is estimated and the noise correction coefficient itself is corrected according to the noise environment, it is possible to perform the correction suitable for the noise environment. In other words, the post-filtering unit 108 performs the correction (suppression of noise) as described below.

Figure 13:
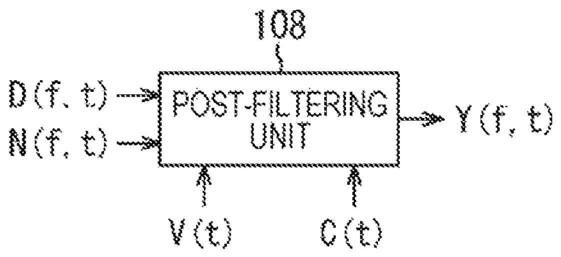
FIGS. 13(A) and 13(B) are diagrams explaining correction at the post-filtering unit.
Figure 13:
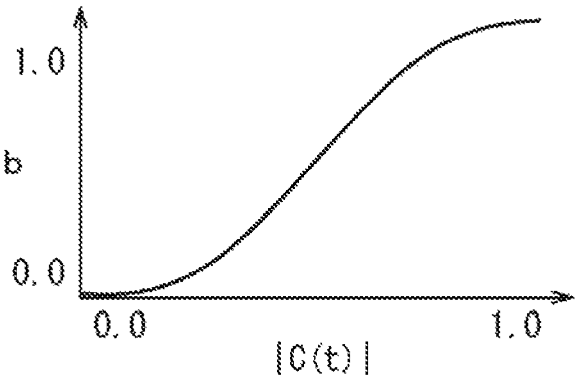

By referring to FIG. 13(A), the audio-enhanced signal D(f,t) from the audio enhancer 105 and the audio-attenuated signal N(f,t) from the audio attenuator 106 are supplied to the post-filtering unit 108. Furthermore, the utterance section detection result V(t) from the utterance section detector 107 and the estimation result C(t) of the noise environment (the correlation coefficient C(t)) from the noise environment estimator 102 are supplied to the post-filtering unit 108.

The post-filtering unit 108 performs the post-filtering processing using these supplied signal and information, and outputs an estimated audio spectrum Y(f,t) as a result thereof. The estimated audio spectrum Y(f,t) is the audio in which the noise is eliminated.

To the post-filtering processing performed by the post-filtering unit 108, for example, a spectrum subtraction method, the MMSE-STSA method, or the like can be applied. The spectrum subtraction method is disclosed in the following document and can be applied to the present technology.

S. F. Boll, "Suppression of acoustic noise in speech using spectral subtraction," IEEE Trans. Acoustics, Speech, and Signal Processing, vol. 27. no, 2, pp. 113-120, 1979.

Furthermore, the MMSE-STSA method is disclosed in the following document and can be applied to the present technology.

Y. Ephraim and D. Malah, "Speech enhancement using a minimum mean-square error short-time spectral amplitude estimator." IEEE Trans. Acoustics, Speech., end Signal Processing, vol. 32, no. 6, pp. 1109-1121, 1984.

Here, a case in which post-filtering processing based on a spectrum subtraction method is applied is exemplified. In a simple spectrum subtraction method, the amplitude spectrum of the audio-attenuated signal N(f,t) is subtracted from the amplitude spectrum the audio-enhanced signal D(f,t). However, as described with reference to FIGS. 11(A), 11(B) and 12(A), 12(B), since there is an error between the amplitude spectrum of the audio-enhanced signal D(f,t) and the amplitude spectrum of the audio-attenuated signal N(f,t), the noise spectrum needs to be corrected.

The correction of the noise spectrum is performed on the basis of the following Expressions (10) and (11) in the section determined as the non-utterance section (v(t)=0) by the utterance section detector 107.

[Expression 10]

$$H(f,t)=G(f,t)N(f,t) \tag{10}$$

[Expression 11]

$$G(f,t)=\frac{1}{M}\sum_{k=0}^{K}\{|D(f,t-k)|/|N(f,t-k)|\} \tag{11}$$

In Expressions (10) and (11), G(f,t) is a correction coefficient to obtain the correct spectrum, and is a value calculated by smoothing data of past k frames. H(f,t) is a noise correction coefficient obtained by multiplying the correction coefficient G(f,t) with the audio-attenuated signal N(f,t).

Next, on the basis of the following Expression (12), the estimated audio spectrum Y(f,t) is obtained from the audio-enhanced signal D(f,t) and the estimated noise correction coefficient H(f,t).

[Expression 12]

$$|Y(f,t)|=\begin{cases}|D(f,t)|-ab|H(f,t)| & |D(f,t)|-ab|H(f,t)|\geq 0\\ c|D(f,t)| & \text{otherwise}\end{cases} \tag{12}$$

In Expression (12), a is a subtraction coefficient and is a value set to about 1.0 to 2.0. c is a flooring coefficient and is a value set to about 0.01 to 0.5. b is a value changing according to the noise environment estimation result and performs as follows.

The case in which the absolute value of C(t) is large: The possibility that the noise is a small number of point sound sources is high, and the noise elimination is strongly performed.

The case in which the absolute value of C(t) is small: The possibility that the noise is the non-point sound source or the diffusive sound source is high, and the noise elimination is weakly performed.

Since the strength of the noise elimination is set according to the noise environment and the processing relating to the noise elimination is performed in this manner, it is possible to precisely perform the noise elimination to the change of the noise.

In Expression (12), the value of the coefficient b can be calculated with, for example, the following Expression (13).

[Expression 13]

$$b=|C(t)| \tag{13}$$

According to Expression (13), the value of the coefficient b is the absolute value of the correlation coefficient C(t). In this manner, the correlation coefficient C(t) may be directly used. Alternatively, the value of the coefficient b may be calculated by using a graph illustrated in FIG. 13(B) or a table based on the graph. Furthermore, the coefficient b may be loaded externally (from a recording medium) or may be calculated when needed.

In the graph illustrated in FIG. 13(B), the abscissa is the correlation coefficient C(t), and the ordinate is the coefficient b. The coefficient b may be set as a predetermined function calculated using the correlation coefficient C(t).

Furthermore, a value of the coefficient b does not need to be within a range equal to or less than 1.0 and can be set to an appropriate value according to the use of the audio processing apparatus to which the present technology is applied, such as hands-free calling or audio recognition.

According to the present technology, since the strength of the noise elimination is set according to the noise environment and the processing relating to the noise elimination is performed in this manner, it is possible to precisely perform the noise elimination to various noise environments.

Returning back to the flowchart in FIG. 5, when the noise correction coefficient to be used in the post-filtering processing performed by the post-filtering unit 108 is calculated in step S111, the processing proceeds to step S112. The processing also proceeds to step S112 when it is determined that the current frame is the utterance section in step S109.

In step S112, the post-filtering unit 108 performs the post-filtering processing according to the noise environment.

Note that, when there is no non-utterance section and the noise correction coefficient is not calculated, the post-filtering processing is performed using the noise correction coefficient set as an initial value in step S112.

The estimated audio spectrum Y(f,t) calculated by the post-filtering unit 108 is supplied to the time/frequency inverter 109. The time/frequency inverter 109 converts the time/frequency signal into a time signal in step S113. The estimated audio spectrum Y(f,t) to be converted into the signal in the time domain is the signal in the frequency band subjected to the noise elimination according to the noise environment as described above.

In step S114, the time/frequency inverter 109 adds the samples by shifting the frame and generates an output signal y(n). As described with reference to FIGS. 6(A) and 6(B), when the time/frequency converter 103 performs the processing, the time/frequency inverter 109 performs inverse FFT for each frame, and as a result, the output signal y(n) is generated by superimposing the output 512 samples by shifting the samples by 256.

The generated output signal y(n) is output from the time/frequency inverter 109 to a post-stage processing unit which is not illustrated in step S115.

In this manner, in the audio processing apparatus 100 to which the present technology is applied, since the noise environment is estimated and the strength of the noise elimination is set according to the estimated noise environment, it is possible to perform appropriate noise eliminating processing according to the noise environment. Thus, it is possible to prevent the generation of a musical noise or the like.

With reference to FIGS. 14(A), 14(B), 14(C) and 14(D), FIGS. 14(A), 14(B), 14(C) and 14(D) illustrates the result of the experiment how the audio recognition rate changes between the audio processing apparatus to which the present technology is applied and the audio processing apparatus to which the present technology is not applied. FIG. 14(A) illustrates the situation in which the noise is assumed to be the point sound source, the sound source generating the audio desired to be extracted is installed in front of the microphone array, and one sound source generating the noise is installed at diagonally forward left side.

FIG. 14(B) illustrates the situation in which the noise is assumed to be the diffusive noise, the sound source generating the audio desired to be extracted is installed in front of the microphone array, and a plurality of sound sources generating the noise is installed so as to surround the microphone array.

FIG. 14(C) and FIG. 14(D) are diagrams illustrating the measurement results when the audio recognition rates are measured under the situation illustrated in FIG. 14(A) and under the situation illustrated in FIG. 14(B). The audio recognition rate is the probability of correctly recognizing an uttered predetermined phrase.

In FIG. 14(C) and FIG. 14(D), 1 mic indicates the result when the measurement is performed with one microphone, DS indicates the result when the measurement is performed only with the Delay and Sum beam forming, Conventional indicates the measurement result when the post-filtering processing is performed without taking the noise environment into consideration, and Proposed indicates the measurement result when the post-filtering processing is performed with the configuration of the audio processing apparatus 100 illustrated in FIG. 3 and taking the noise environment into consideration.

By referring to FIG. 14(C) and FIG. 14(D), it is shown that the audio recognition rate of the audio processing apparatus 100 to which the present technology is applied is the highest both in the point sound source noise and in the diffusive noise. For this reason, as described above, it is shown that the audio recognition rate is enhanced by estimating the noise environment and performing the noise eliminating processing according to the estimated noise environment.

<Internal Configuration and Operation of First (b) Audio Processing Apparatus>

Next, a configuration and an operation of a first (b) audio processing apparatus are described. Although the above described first (a) audio processing apparatus 100 (FIG. 3) estimates the noise environment using the audio signal obtained from the sound collector 101, a first (b) audio processing apparatus 200 (FIG. 15) is different in that it estimates the noise environment using the audio-enhanced signal obtained from the audio enhancer 105 and the audio-attenuated signal obtained from the audio attenuator 106.

Figure 15:
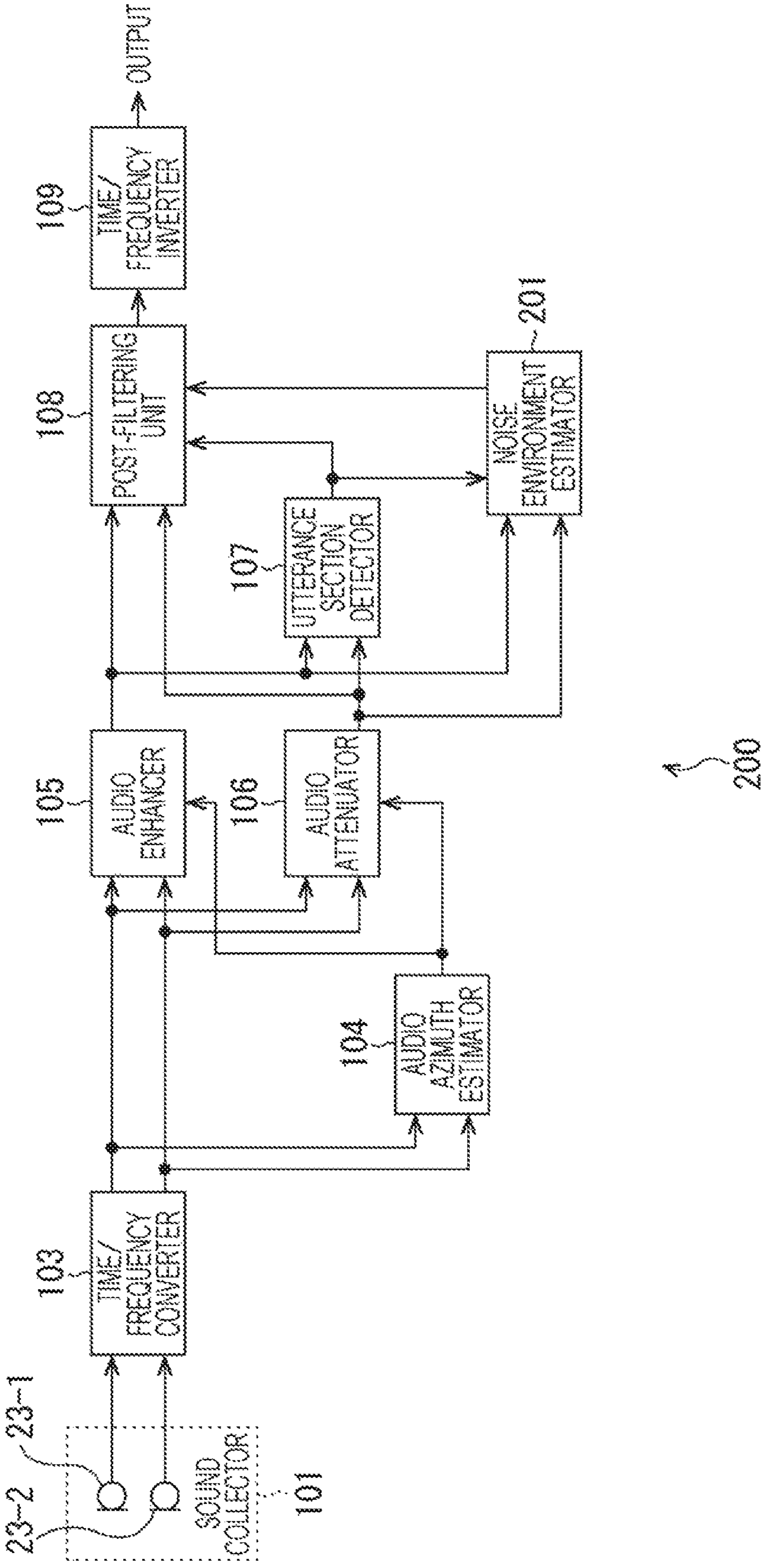
FIG. 15 is a diagram illustrating an internal configuration of a first (b) audio processing apparatus.

FIG. 15 is a diagram illustrating a configuration of the first (b) audio processing apparatus 200. In the audio processing apparatus 200 illustrated in FIG. 15, the same reference signs are attached to the units having the same function as the first (a) audio processing apparatus 100 illustrated in FIG. 3, and the descriptions thereof are omitted.

The audio processing apparatus 200 illustrated in FIG. 15 has a configuration in which the audio-enhanced signal D(f,t) from the audio enhancer 105 and the audio-attenuated signal N(f,t) from an audio attenuator 206 are also supplied to a noise environment estimator 201, and has a different configuration from that of the audio processing apparatus 100 illustrated in FIG. 3 in that the signal from the sound collector 101 is not supplied to the noise environment estimator 201.

Figure 16:
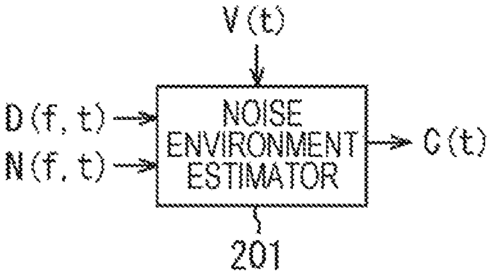
FIG. 16 is a diagram explaining a configuration of a noise environment estimator.

As illustrated in FIG. 16, a noise audio estimator 201 is configured so that the audio-enhanced signal D(f,t) from the audio enhancer 105 and the audio-attenuated signal N(f,t) from the audio attenuator 206 are supplied and the detection result V(t) of the utterance section from the utterance section detector 107 is also supplied.

The noise environment estimator 201 supplies, similarly to the above described noise environment estimator 102 (FIG. 3), a value C(t) from −1.0 to 1.0 to a post-filtering unit 208 using the supplied signal and information. Furthermore, the noise environment estimator 201 calculates a value C(t) from −1.0 to 1.0 in the non-utterance section detected by the utterance section detector 107 and supplies the value to the post-filtering unit 108.

The shapes of the amplitude spectrum of the audio-enhanced signal D(f,t) output from the audio enhancer 105 and the amplitude spectrum of the audio-attenuated signal N(f,t) output from the audio attenuator 106 tend to be substantially matched with each other when the noise is the point sound source. Furthermore, when the noise is diffusive, the shapes of the amplitude spectrum of the audio-enhanced signal D(f,t) and the amplitude spectrum of the audio-attenuated signal N(f,t) tend not to be matched with each other.

By using this tendency, it is possible to estimate the surrounding noise environment from the matching rate (similarity) of the amplitude spectrum of the audio-enhanced signal D(f,t) and the amplitude spectrum of the audio-attenuated signal N(f,t). For example, it may have a configuration in which the correlation between the amplitude spectrums in each frame is calculated, and the correlation value is output as the estimation result C(t) by the noise environment estimator 201.

When it is configured so as to estimate the noise environment in this manner, a memory and the like can be omitted. In the audio processing apparatus 100 illustrated in FIG. 3 (FIG. 3), a buffer region (memory) is needed in order to temporarily hold the signal in the time domain segmented in a frame for the noise environment estimation. However, the audio processing apparatus 200 (FIG. 15) may have a configuration in which the buffer region (memory) is omitted, since it is not necessary to temporarily hold the signal in the time domain segmented in a frame for the noise environment estimation.

The operation of the audio processing apparatus 200 having this configuration is described with reference to the flowcharts in FIGS. 17 and 18. The basic operation is similar to that of the audio processing apparatus 100 illustrated in FIG. 3, and the description of the similar operation is omitted.

The processing in steps S201 to S207 (FIG. 17) is performed similarly to the processing in steps S101, S102, S104 to S108 in FIG. 4. In other words, although the processing to store the segmented signal in the buffer of the noise environment estimator 102 is performed in step S103 in the first (a) audio processing apparatus 100, the processing is not needed in the first (b) audio processing apparatus 200 and omitted in the processing procedure.

The processing in steps S208 to S214 (FIG. 18) is performed basically similarly to the processing in steps S109 to S115 illustrated in FIG. 5, but step S209 (the processing corresponding to step S110) is different.

When it is determined that the current frame is not the utterance section in step S208, the noise environment estimator 201 estimates the noise environment using the audio-enhanced signal and the audio-attenuated signal in step S209. This estimation is performed, as described above, using the audio-enhanced signal and the audio-attenuated signal.

Since the estimation result of a value C(t) from −1.0 to 1.0 is supplied to the post-filtering unit 108 similarly to the noise environment estimator 102 of the first (a) audio processing apparatus 100, the processing in the post-filtering unit 108 or the like can be performed similarly to the first (a) audio processing apparatus 100.

In the first (b) audio processing apparatus 200, the noise environment can be estimated from the signal obtained from the audio enhancer 105 and the signal obtained from the audio attenuator 106 in this manner. The first (b) audio processing apparatus 200 can also estimate the noise environment and perform the noise eliminating processing according to the estimated noise environment similarly to the first (a) audio processing apparatus 100, and it is possible to enhance the precision of the audio processing, such as the audio recognition rate.

<Internal Configuration and Operation of First (c) Audio Processing Apparatus>

Next, a configuration and an operation of a first (c) audio processing apparatus are described. Although the above described first (a) audio processing apparatus 100 (FIG. 3) estimates the noise environment using the audio signal obtained from the sound collector 101, a first (c) audio processing apparatus 300 (FIG. 19) is different in that it estimates the noise environment using information input externally.

Figure 19:
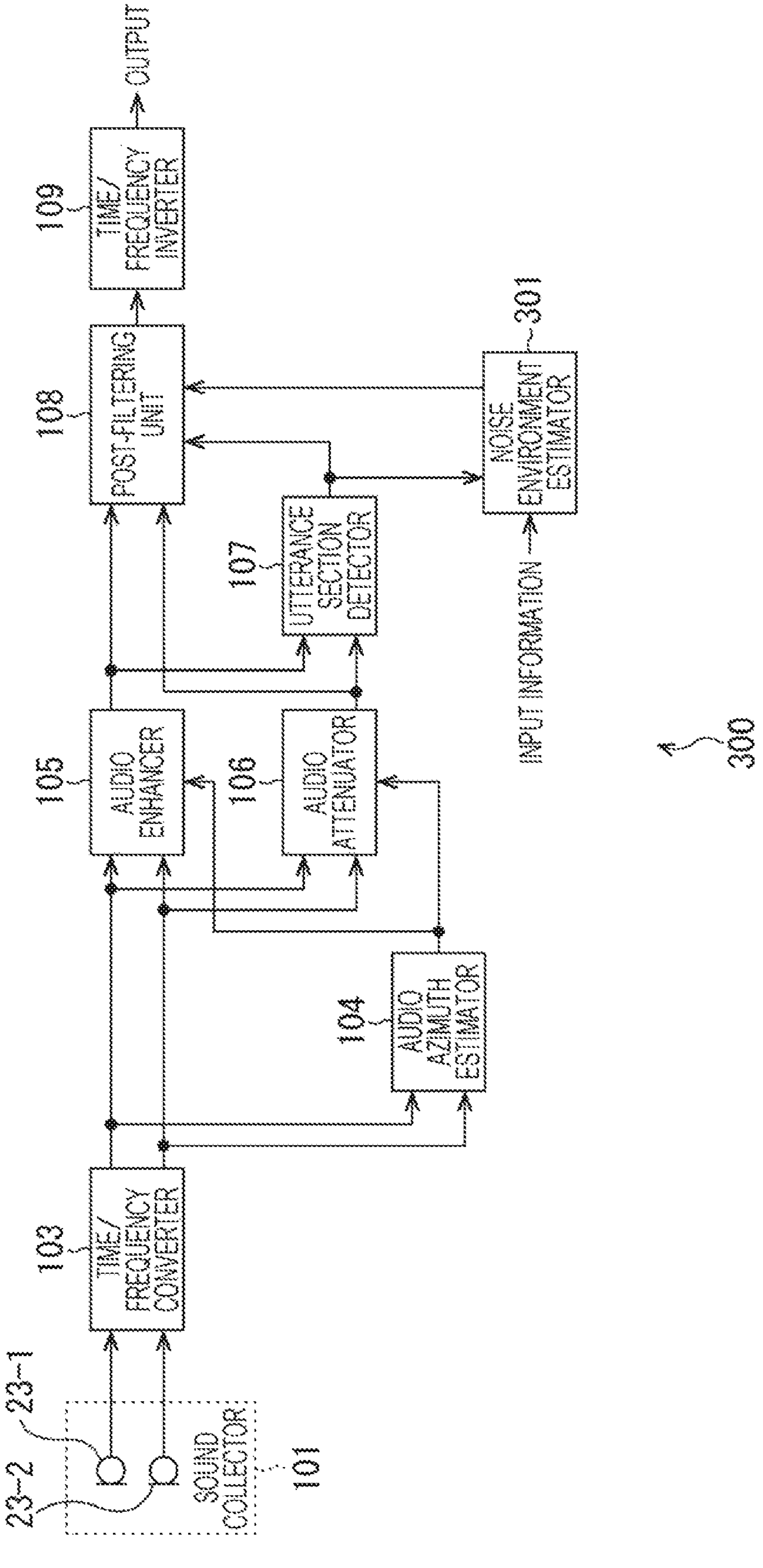
FIG. 19 is a diagram illustrating an internal configuration of a first (c) audio processing apparatus.

FIG. 19 is a diagram illustrating a configuration of the first (c) audio processing apparatus 300. In the audio processing apparatus 300 illustrated in FIG. 19, the same reference signs are attached to the units having the same function as the first (a) audio processing apparatus 100 illustrated in FIG. 3, and the descriptions thereof are omitted.

The audio processing apparatus 300 illustrated in FIG. 19 has a configuration in which the information necessary for the noise environment estimation is externally supplied to a noise environment estimator 301, and has a different configuration from the audio processing apparatus 100 illustrated in FIG. 3 in that the signal from the sound collector 101 is not supplied to the noise environment estimator 301.

As the information necessary for the noise environment estimation to be supplied to the noise environment estimator 301, for example, the information input by the user is used. For example, it may have a configuration in which the user selects whether the environment has many noises before starting to utter, and the selected information is to be input.

Furthermore, the user's position is determined from the information of an external sensor, such as the global positioning system (GPS), and it may be determined whether the position is the environment having many noises. For example, it is configured when it is determined that the position is indoors from the GPS information, it is determined that the environment has a few noises, or when it is determined that the position is outdoors, it is determined that the environment has many noises, and it may be configured so that information based on the determination is input.

Furthermore, time information as well as the position information such as the GPS information, or time information may be used. For example, since a nighttime or the like is less likely to have many noises than a daytime, when it is determined that it is a nighttime from time information, it may be determined that the environment has a few noises, or when it is determined that it is a daytime, it may be determined that the environment has many noises.

Furthermore, it may be configured so that the noise environment is estimated by combining the information. Furthermore, the estimated results and the feedbacks from the user are learnt, the information obtained from the learning, for example, the information on the time when the environment is quiet is obtained, and the learning result may be used for the noise environment estimation.

Figure 20:
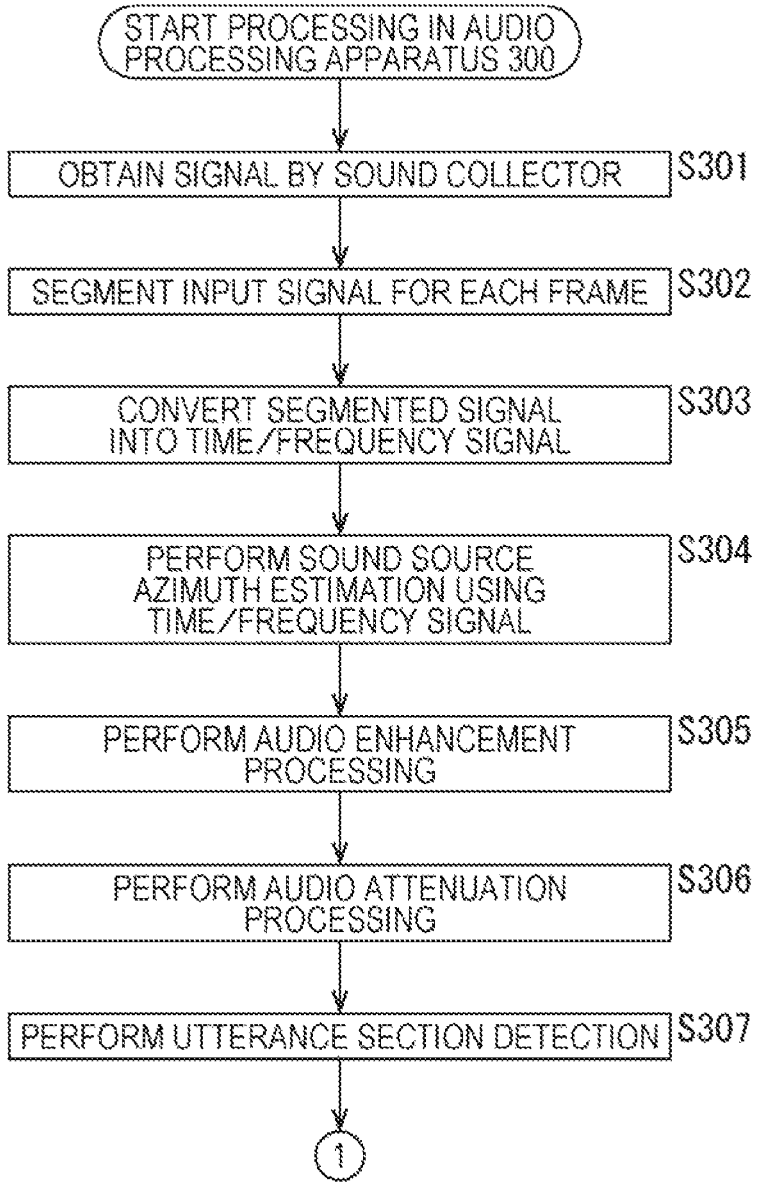
FIG. 20 is a flowchart explaining of an operation of a first (c) audio processing apparatus.
Figure 21:
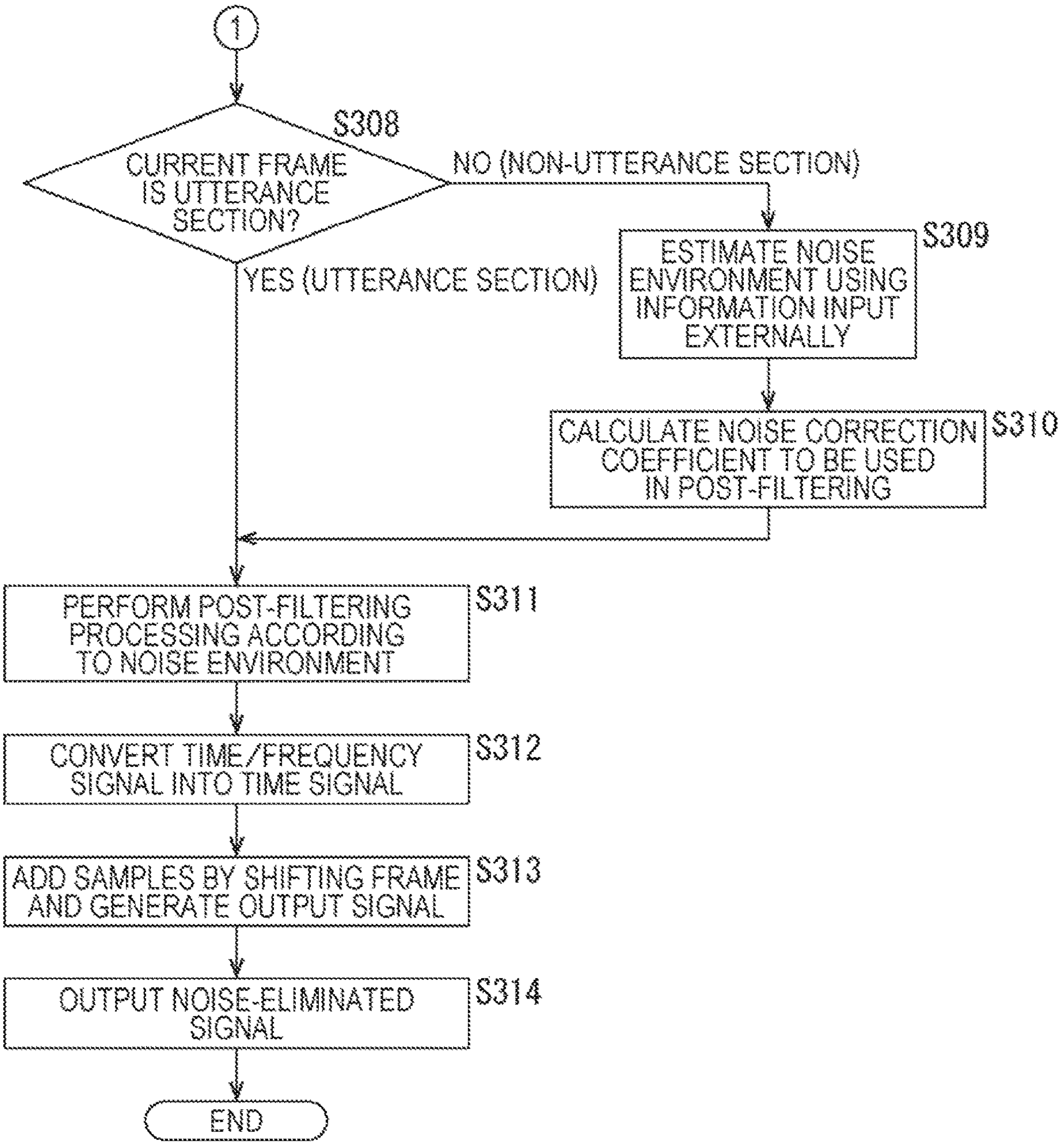
FIG. 21 is a flowchart explaining of the operation of the first (c) audio processing apparatus.

The operation of the audio processing apparatus 300 having this configuration is described with reference to the flowcharts in FIGS. 20 and 21. The basic operation is similar to that of the audio processing apparatus 100 illustrated in FIG. 3, and the description of the similar operation is omitted.

The processing in steps S301 to S307 (FIG. 20) is performed similarly to the processing in steps S101, S102, S104 to S108 in FIG. 4.

In other words, although the processing to store the segmented signal in the buffer of the noise environment estimator 102 is performed in step S103 in the first (a) audio processing apparatus 100, the processing is not needed in the first (c) audio processing apparatus 300 and omitted in the processing procedure. The processing procedure is the same procedure of the flowchart illustrated in FIG. 17 which is the operation of the first (b) audio processing apparatus 200 (FIG. 15).

The processing in steps S308 to S314 (FIG. 21) is performed basically similarly to the processing in steps S109 to S115 illustrated in FIG. 5, but step S309 (the processing corresponding to step S110) is different.

When it is determined that the current frame is not the utterance section in step S308, the noise environment estimator 201 estimates the noise environment using the information input externally in step S309.

The estimation result of a value C(t) from −1.0 to 1.0 is supplied to the post-filtering unit 108 similarly to the noise environment estimator 102 of the first (a) audio processing apparatus 100. The processing in the post-filtering unit 108 or the like can be performed similarly to the first (a) audio processing apparatus 100.

In the first (c) audio processing apparatus 300, the noise environment can be estimated from the signal input externally in this manner. The first (c) audio processing apparatus 300 can also estimate the noise environment and perform the noise eliminating processing according to the estimated noise environment similarly to the first (a) audio processing apparatus 100, and it is possible to enhance the precision of the audio processing, such as the audio recognition rate.

Furthermore, in the audio processing apparatus 100 illustrated in FIG. 3 (FIG. 3), a buffer region (memory) is needed in order to temporarily hold the signal in the time domain segmented in a frame for the noise environment estimation. However, the audio processing apparatus 300 (FIG. 19) may have a configuration in which the buffer region (memory) is omitted, since it is not necessary to temporarily hold the signal in the time domain segmented in a frame for the noise environment estimation.

Furthermore, since the first (c) audio processing apparatus 300 has a configuration in which the correlation calculation necessary for the first (a) audio processing apparatus 100 or the first (b) audio processing apparatus 200 is not performed, it is possible to reduce the computation cost.

<Internal Configuration and Operation of Second Audio Processing Apparatus>

<Internal Configuration of Second (a) Audio Processing Apparatus>

Figure 22:
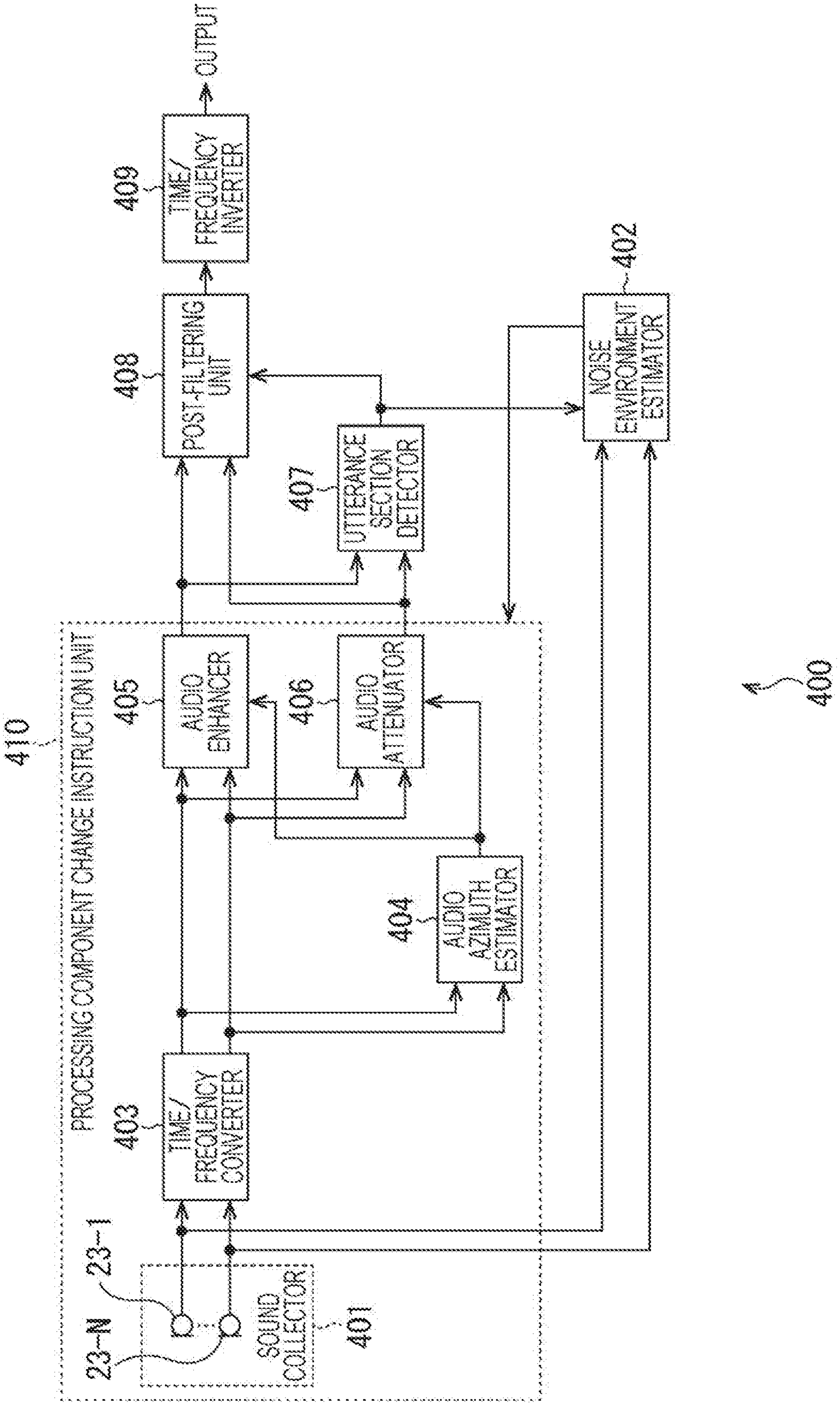
FIG. 22 is a diagram illustrating an internal configuration of a second (a) audio processing apparatus.

FIG. 22 is a diagram illustrating a configuration of a second (a) audio processing apparatus 400. The audio processing apparatus 400 is provided inside the mobile phone 10 and constitutes a part of the mobile phone 10. The audio processing apparatus 400 illustrated in FIG. 22 includes a sound collector 401, a noise environment estimator 402, a time/frequency converter 403, an audio azimuth estimator 404, an audio enhancer 405, an audio attenuator 406, an utterance section detector 407, a post-filtering unit 408, and a time/frequency inverter 409.

This configuration is similar to that of the first audio processing apparatus, but the second audio processing apparatus has a different configuration from the first audio processing apparatus in that a processing component change instruction unit 410 includes the sound collector 401, the noise environment estimator 402, the time/frequency converter 403, the audio azimuth estimator 404, the audio enhancer 405, and the audio attenuator 406.

The above described first audio processing apparatus has the configuration and operation to estimate the noise environment and to control the strength of the noise elimination in the post-filtering unit 108 according to the estimated noise environment. The second audio processing apparatus has the configuration and operation to estimate the noise environment and to reduce the power consumption while the performance of the noise elimination is maintained by changing the configurations in the processing component change instruction unit 410 according to the estimated noise environment.

The sound collector 401 includes a plurality of microphones 23-1 to 23-N. In the second audio processing apparatus, as to be described later, in order to change the number of microphones 23 to be used according to the noise environment, two or more microphones 23 are included in the sound collector 401.

Although it is not illustrated, when it is configured so as to include a plurality of microphones 23, the post-stage time/frequency converter 403 and the like are connected with wires to input signals from the microphones 23 and processed signals. Furthermore, the time/frequency converter 403 and the like are configured so as to process the signals from the microphones 23 and the processed signals.

The sound collector 401 includes a plurality of microphones 23, and when, for example, it is estimated that there is a diffusive noise, the processing is performed using the microphones 23 (two or more microphones 23), or when it is estimated that there is a noise from the point sound source, the processing is performed using two microphones 23.

The sound collector 401 includes the microphones 23, and further includes, in addition to the microphone 23, an AD converter, a sampling rate converter, and the like (all of them are not illustrated). With the configuration in which the number of microphones 23 is reduced according to the noise environment, it is possible to cut the power supply to the AD converter, the sampling rate converter, and the like and suppress the power consumption.

Furthermore, since all the units of the time/frequency converter 403, the audio azimuth estimator 404, the audio enhancer 405, and the audio attenuator 406 are configured so as to process the audio obtained by the microphones 23, the number of microphones 23 is two, and the number of inputs is reduced to two. The processing to estimate the azimuth of the audio and the number of inputs are reduced since much product-sum computation is caused in the beam forming, and it is possible to reduce the computation amount. From this point, it is possible to reduce the power consumption.

The sound collector 401, the noise environment estimator 402, the time/frequency converter 403, the audio azimuth estimator 404, the audio enhancer 405, the audio attenuator 406, the utterance section detector 407, and the time/frequency inverter 409 of the audio processing apparatus 400 are different in that processing a plurality of pieces of audio, but basically perform the processing similarly to the sound collector 101, the noise environment estimator 102, the time/frequency converter 103, the audio azimuth estimator 104, the audio enhancer 105, the audio attenuator 106, the utterance section detector 107, the post-filtering unit 108, and the time/frequency inverter 109 of the audio processing apparatus 100 (FIG. 3), and the detailed descriptions thereof are omitted.

Figure 23:
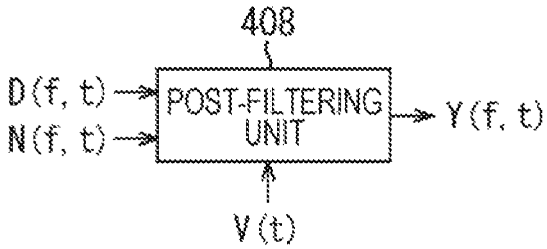
FIG. 23 is a diagram explaining a configuration of a post-filtering unit.

The post-filtering unit 408 is different from the post-filtering unit 108 of the first audio processing apparatus, and has the configuration illustrated in FIG. 23 because the estimation result C(t) from the noise environment estimator 402 is not input.

The post-filtering unit 108 inputs the audio-enhanced signal D(f,t) from the audio enhancer 405 and the audio-attenuated signal N(f,t) from the audio attenuator 406. Furthermore, the post-filtering unit 108 inputs the utterance section detection result V(t) from the utterance section detector 407.

The post-filtering unit 108 outputs the estimated audio spectrum Y(f,t) on the basis of the following Expression (14) using the input signal and information. The estimated audio spectrum Y(f,t) is the audio in which the noise is eliminated.

[Expression 14]

$$|Y(f,t)| = \begin{cases} |D(f,t)| - a|H(f,t)| & |D(f,t)| - a|H(f,t)| \geq 0 \\ c|D(f,t)| & \text{otherwise} \end{cases} \quad (14)$$

In Expression (14), a is a subtraction coefficient, and is set to a value about 1.0 to 2.0. Furthermore, c is a flooring coefficient, and is set to a value about 0.01 to 0.5.

<First Operation of Second (a) Audio Processing Apparatus>

An operation of the audio processing apparatus 400 having this configuration is described with reference to the flowcharts in FIGS. 24 and 25. The basic operation is similar to that of the first (a) audio processing apparatus 100 illustrated in FIG. 4, and the description of the similar operation is omitted.

The processing in steps S401 to S408 (FIG. 24) is performed similarly to the processing in steps S101 to S108 illustrated in FIG. 4.

In other words, the sound collector 401, the noise environment estimator 402, the time/frequency converter 403, the audio azimuth estimator 404, the audio enhancer 405, the audio attenuator 406, and the utterance section detector 407 of the second (a) audio processing apparatus 400 perform the processing similarly to the processing performed by the sound collector 101, the noise environment estimator 102, the time/frequency converter 103, the audio azimuth estimator 104, the audio enhancer 105, the audio attenuator 106, and the utterance section detector 107 of the first (a) audio processing apparatus 100.

However, since the signal obtained from the set numbers of microphones 23 to be used at the time when the processing is performed in the audio processing apparatus 400, two or more audio signals can be processed.

In step S409 (FIG. 25), when it is determined that the current frame is not the utterance section, the noise environment estimator 102 estimates the noise environment using the input signal segmented in a frame in step S410.

As described with reference to FIGS. 10(A) and 10(B), the noise environment estimator 402 estimates the noise environment using the audio signal obtained from the microphone 23. This estimation is performed similarly to the estimation performed by the audio processing apparatus 100 illustrated in FIG. 3 in step S110 (FIG. 5), and the description thereof is omitted.

When the noise environment is estimated in step S410, it is determined whether the environment has a small number of noises in step S411. For example, as the estimation result of the noise environment, the correlation between the collected signals is calculated by the computation based on the above described Expression (9), and the calculate correlation coefficient C(t) is a value from −1.0 to 1.0.

For example, a threshold is set in advance, and it may be determined whether the environment has a large number of noises in the case where the correlation coefficient C(t) is greater than or less than a predetermined threshold. When the threshold is set to, for example, 0.8 and the absolute value of the correlation coefficient C(t) is equal to or greater than 0.8, it may be estimated that there is a small number of noises surrounding the microphone 23 and it is the point sound source noise.

When it is determined that the environment has a small number of noises in step S411, the processing proceeds to step S412. In step S412, the sound collector 401, the noise environment estimator 402, the time/frequency converter 403, the audio azimuth estimator 404, the audio enhancer 405, and the audio attenuator 406 of the processing component change instruction unit 410 are changed to the setting to reduce the number of inputs.

In other words, since it is determined that the environment has a small number of noises and the processing can be performed without lowering the precision of the processing to eliminate the noise although the number of microphones 23 to be used is reduced, the processing component change instruction unit 410 is instructed so as to change the setting to reduce the signals to be processed.

By performing the processing, it is possible to reduce the power consumption under the environment having a small number of noises without lowering the precision to eliminate the noise.

Note that, although the case in which all of the units of the processing component change instruction unit 410 are changed to the setting to reduce the power consumption is exemplified here, the setting may be opposite to it. In other words, the normal setting is the setting to reduce the power consumption, and when it is determined that the environment has a large number of noises, the units may be changed to the setting to enhance the precision.

For example, it is to be determined whether the environment has a large number of noises in step S510, and when it is determined that the environment has a large number of noises, all the units of the processing component change instruction unit 410 may be changed to the setting to more enhance the precision than to reduce the power consumption, that is, the setting to increase the number of inputs to perform the processing using two or more microphones 23.

Alternatively, the number of microphones 23 to be used may be set according to the estimated noise environment. For example, in the audio processing apparatus 400 including the sound collector 401 equipped with four microphones 23, the environment is divided into three environments having a large number of noises, a middle number of noises, and a small number of noises, and the units are changed to the setting to use four microphones 23 when it is determined that the environment has a large number of noises, the units are changed to the setting to use three microphones 23 when it is determined that the environment has a middle number of noises, and the units are changed to the setting to user two microphones 23 when it is determined that the environment has a small number of noises.

Furthermore, the determination of the environment having a large number of noises, a middle number of noises, or a small number of noises can be classified by providing a plurality of thresholds, comparing the estimation result by the noise environment estimator 402 with the thresholds, and using the comparison result. The number of the microphones 23 to be used may be set according to the number of noises in this manner.

When the settings in the processing component change instruction unit 410 are changed in step S412, the processing proceeds to step S413, and the noise correction coefficient to be used by the post-filtering unit 408 is calculated. Since the processing in step S413 is performed similarly to that in step S112 (FIG. 5), the description thereof is omitted, but the calculation is performed according to the number of using microphones 23 at the time when the noise correction coefficient is calculated in step S413.

On the other hand, when it is determined that the environment has a large number of noises in step S411, the processing proceeds to step S413. In this case, the number of using microphones 23 is not changed, and the noise correction coefficient to be used by the post-filtering unit 408 is calculated with the setting which has been set at the time.

When the noise correction coefficient is calculated in step S413 or when it is determined that the current frame is the utterance section in step S409, the processing proceeds to step S414.

In step S414, the post-filtering unit 108 performs the post-filtering processing. In this case, as described with reference to FIG. 23, when the detection result using the audio-enhanced signal D(f,t) from the audio enhancer 405 and the audio-attenuated signal N(f,t) from the audio attenuator 406 shows that the utterance section detection result V(t) from the utterance section detector 407 is the utterance section, the estimated audio spectrum Y(f,t) is calculated on the basis of Expression (14) and output to the post-stage time/frequency inverter 409. The estimated audio spectrum Y(f,t) is the audio in which the noise is eliminated.

The processing performed by the time/frequency inverter 409 in steps S415 to S417 is performed similarly to the processing performed by the time/frequency inverter 109 (FIG. 3) in steps S113 to S115 in FIG. 5, and the description thereof is omitted.

In the second (a) audio processing apparatus 400, the configurations in the audio processing apparatus 400 can be changed according to the noise environment in this manner, and it is possible to change the configuration capable of performing the noise eliminating processing suitable for the noise environment. Thus, it is possible to reduce the power consumption in the environment having a few noises.

Figure 24:
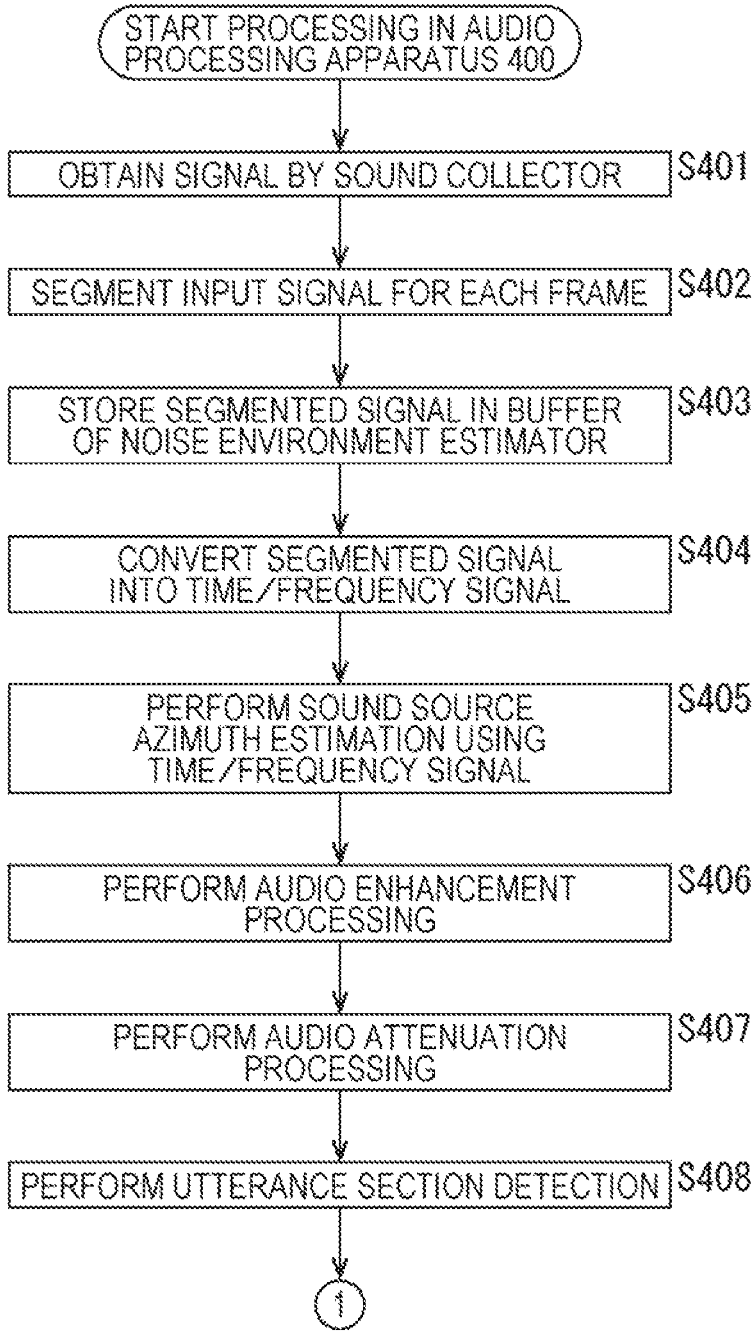
FIG. 24 is a flowchart explaining of an operation of the second (a) audio processing apparatus.
Figure 25:
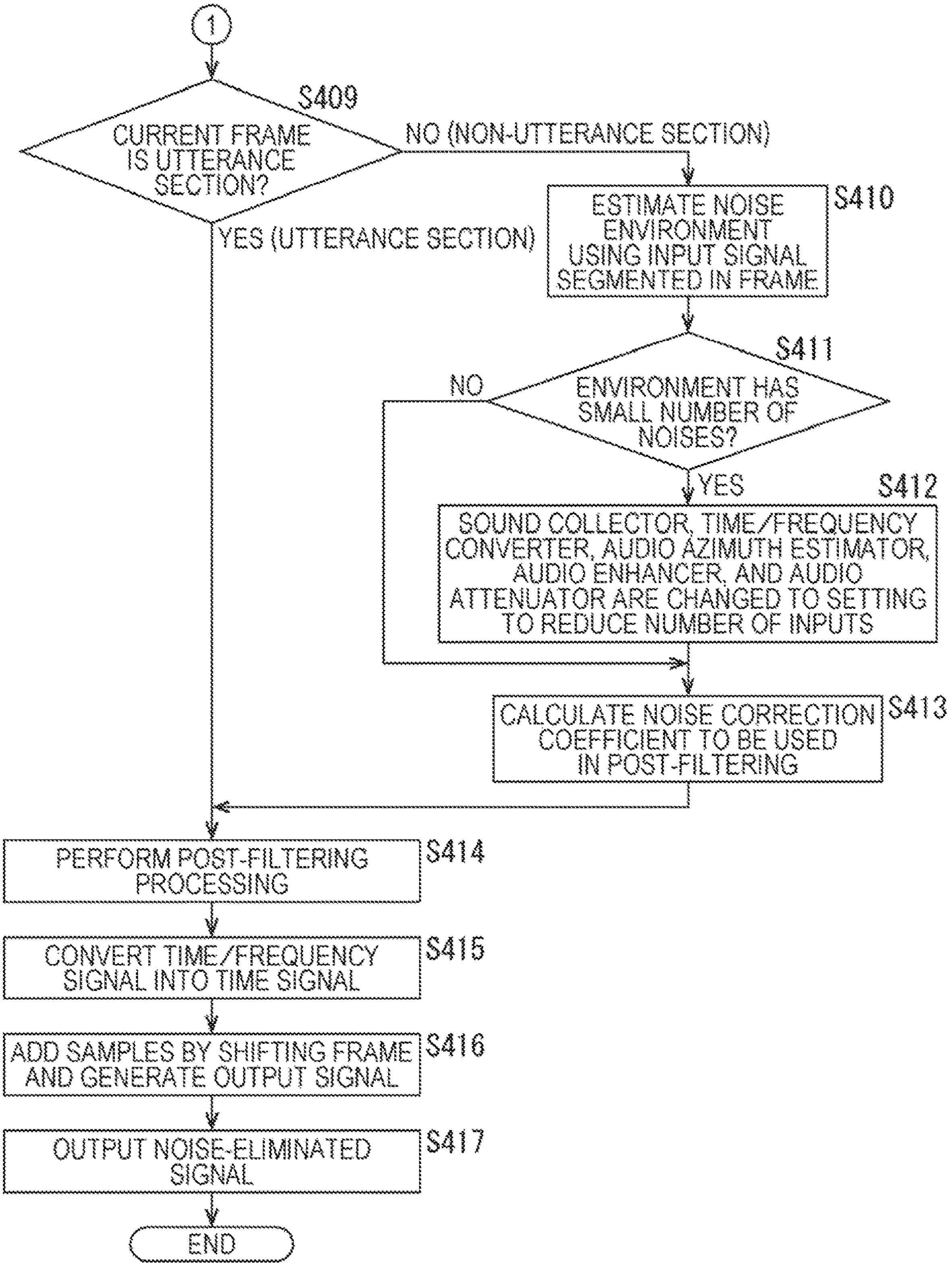
FIG. 25 is a flowchart explaining of the operation of the second (a) audio processing apparatus.

When the processing is performed on the basis of the flowcharts illustrated in FIGS. 24 and 25, the processing in steps S410 to S413 is repeated during the audio processing apparatus 400 operates. Thus, it is possible to handle the change of the noise environment. For example, when the noise environment is changed by moving from a noisy environment to a quiet environment during the audio processing apparatus 400 operates, for example, during calling, the setting is appropriately changed, and it is possible to reduce the power consumption or the like.

<Second Operation of Second (a) Audio Processing Apparatus>

Another operation of the audio processing apparatus 400 illustrated in FIG. 22 is described with reference to the flowcharts illustrated in FIGS. 26 and 27. In the operation based on the flowcharts illustrated in FIGS. 26 and 27, the processing to change the configurations of the processing component change instruction unit 410 according to the noise environment is performed at the time when a system is started.

The time when the system is started is, for example, the time when the user instructs that the processing performed by the audio processing apparatus 400 is to be started or the like. The processing performed by the audio processing apparatus 400 is started, for example, when a predetermined application for audio recognition is started or when a telephone call is made.

In step S451, it is determined whether the system is started and the initialization needs to be performed. When it is determined that the system is started and the initialization needs to be performed in step S451, the processing proceeds to step S452.

In step S452, the audio signal is obtained by the sound collector 401 with the microphones 23. In step S453, the input signal is segmented for each frame. The processing in step S452 and the processing in step S453 can be performed similarly to, for example, that in steps S401 and S402 in FIG. 24.

In step S454, the noise environment estimator 402 estimates the noise environment using the input signal segmented in a frame, and it is determined whether the environment has a small number of noises using the estimation result in step S455. When it is determined that the environment has a small number of noises in step S455, the processing proceeds to step S456. In step S456, the settings in all the units of the processing component change instruction unit 410 are changed.

The processing in steps S454 to S456 is performed similarly to the processing in steps S410 to S412 (FIG. 25). In other words, as described above, when the noise environment is estimated at the time when the system is started and it is determined as the quiet environment, the sound collector 401, the noise environment estimator 402, the time/frequency converter 403, the audio azimuth estimator 404, the audio enhancer 405, and the audio attenuator 406 of the processing component change instruction unit 410 are changed to the setting to reduce the number of inputs.

When the changing and setting in the processing component change instruction unit 410 are performed in step S456, the processing proceeds to step S457. In this case, the setting is suitable for the noise environment.

On the other hand, when it is determined that the environment has a large number of noises in step S455, the processing proceeds to step S457. In this case, the setting set as the initial value is applied to all the units of the processing component change instruction unit 410, and the processing is started.

Furthermore, when it is determined that the system is not started in step S451, the processing proceeds to step S457. When the audio processing apparatus 400 operates, it is determined that the system is not started, and the processing proceeds to step S457.

The processing in steps S457 to S464 (FIG. 27) is performed similarly to the processing in steps S401 to S408 in FIG. 24. In other words, the processing of initialization is performed at the time when the system is started, and the audio processing is performed with the setting set by the initialization thereafter.

In step S465 (FIG. 27), it is determined whether the current frame is the utterance section, and when it is determined that the current frame is not the utterance section, the processing proceeds to step S466. In step S466, the noise correction coefficient to be used in the post-filtering processing by the post-filtering unit 408 is calculated.

When the noise correction coefficient is calculated in step S466 or when it is determined that the current frame is the utterance section in step S465, the processing proceeds to step S467, and the post-filtering unit 108 performs the post-filtering processing.

The processing in steps S465 to S467 is the processing in which the processing in steps S410 to S412 is omitted from the processing in steps S409 to S414 of the flowchart illustrated in FIG. 25. Since the processing in steps S410 to S412 is performed in steps S452 to S456 as the initialization processing, and the processing is omitted.

The noise environment estimation by the noise environment estimator 402 is performed at the time when the system is started, and is not performed during the system operates after started. Thus, after the noise environment estimation is performed at the time when the system is started, the processing to estimate the noise environment by the noise environment estimator 402 is stopped, and the power supply or the like to the noise environment estimator 402 may also be stopped. By operating in this manner, it is possible to reduce the power consumption.

The processing in steps S468 to S470 is performed similarly to that in steps S415 to S417 (FIG. 25).

In the second (a) audio processing apparatus 400, the configurations in the audio processing apparatus 400 can be changed according to the noise environment in this manner, and it is possible to change the configuration capable of performing the noise eliminating processing suitable for the noise environment. Thus, it is possible to reduce the power consumption in the environment having a few noises.

<Internal Configuration of Second (b) Audio Processing Apparatus>

Next, a configuration and an operation of a second (b) audio processing apparatus are described. Although the above described second (a) audio processing apparatus 400 (FIG. 22) estimates the noise environment using the audio signal obtained from the sound collector 401, a second (b) audio processing apparatus 500 (FIG. 28) is different in that it estimates the noise environment using the audio-enhanced signal obtained from the audio enhancer 405 and the audio-attenuated signal obtained from the audio attenuator 406. This configuration is a similar to the configuration of the audio processing apparatus 200 illustrated in FIG. 15.

Figure 28:
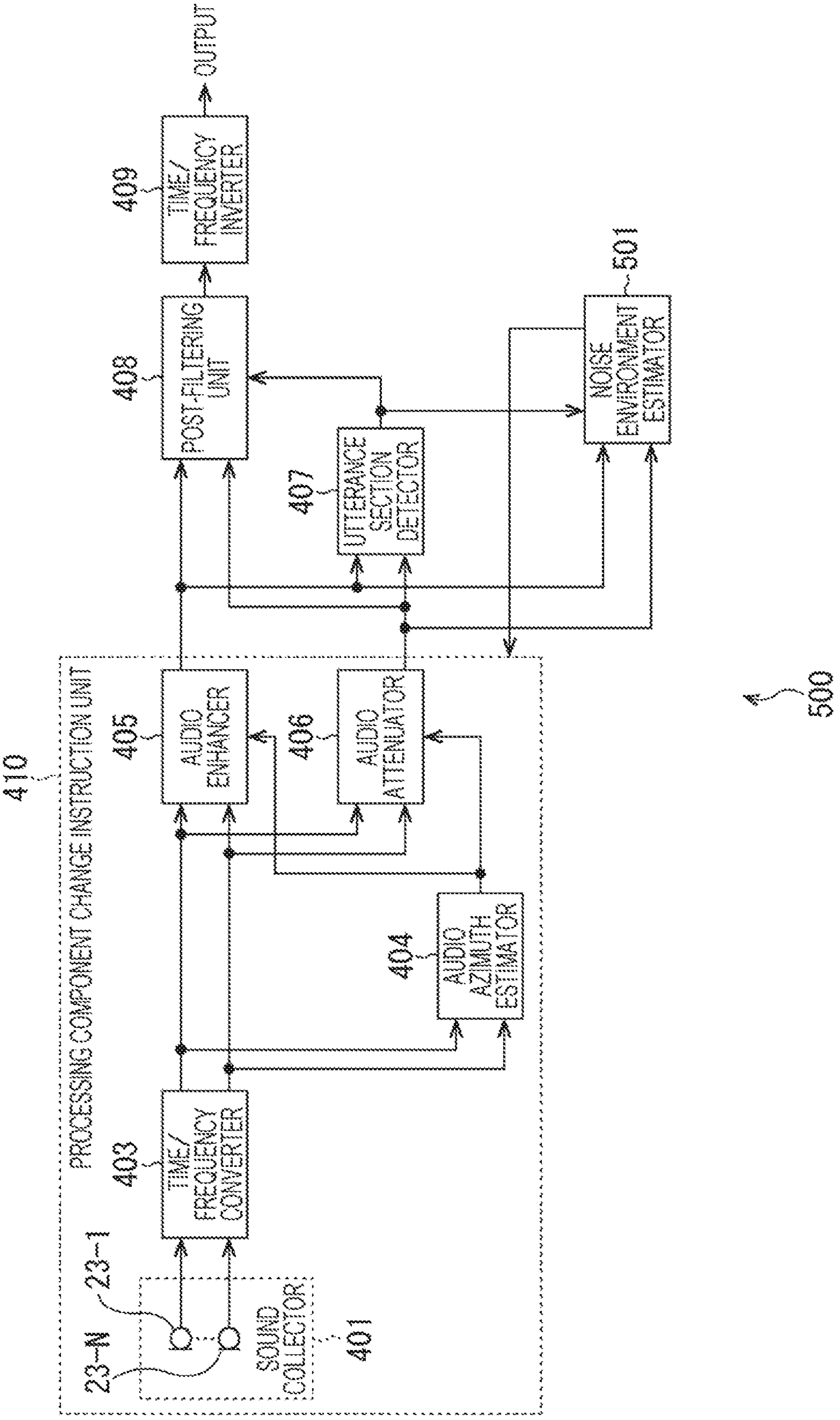
FIG. 28 is a diagram illustrating an internal configuration of a second (b) audio processing apparatus.

FIG. 28 is a diagram illustrating a configuration of the second (b) audio processing apparatus 500. In the audio processing apparatus 500 illustrated in FIG. 28, the same reference signs are attached to the units having the same function as the second (a) audio processing apparatus 400 illustrated in FIG. 22, and the descriptions thereof are omitted.

The audio processing apparatus 500 illustrated in FIG. 28 has a configuration in which the audio-enhanced signal D(f,t) from the audio enhancer 405 and the audio-attenuated signal N(f,t) from an audio attenuator 406 are also supplied to the noise environment estimator 402, and has a different configuration from that of the audio processing apparatus 400 illustrated in FIG. 22 in that the signal from the sound collector 401 is not supplied to the noise environment estimator 402.

A noise audio estimator 501 is configured so that the audio-enhanced signal D(f,t) from the audio enhancer 405 and the audio-attenuated signal N(f,t) from the audio attenuator 406 are supplied and the detection result V(t) of the utterance section from the utterance section detector 407 is also supplied.

A noise environment estimator 501 supplies, similarly to the above described noise environment estimator 402 (FIG. 22), a value C(t) from −1.0 to 1.0 to the post-filtering unit 408 using the supplied signal and information. The noise environment estimation performed by the noise environment estimator 501 is performed similarly to the noise environment estimation performed by the noise environment estimator 201 of the first (b) audio processing apparatus 200 illustrated in FIG. 15.

When it is configured so as to estimate the noise environment in this manner, a memory and the like can be omitted. In the audio processing apparatus 400 illustrated in FIG. 22, a buffer region (memory) is needed in order to temporarily hold the signal in the time domain segmented in a frame for the noise environment estimation. However, the audio processing apparatus 500 (FIG. 28) may have a configuration in which the buffer region (memory) is omitted, since it is not necessary to temporarily hold the signal in the time domain segmented in a frame for the noise environment estimation.

<First Operation of Second (b) Audio Processing Apparatus>

An operation of the audio processing apparatus 500 having this configuration is described with reference to the flowcharts in FIGS. 29 and 30. The basic operation is similar to that of the audio processing apparatus 200 illustrated in FIG. 15 or the audio processing apparatus 400 illustrated in FIG. 22, and the description of the similar operation is omitted.

Figure 17:
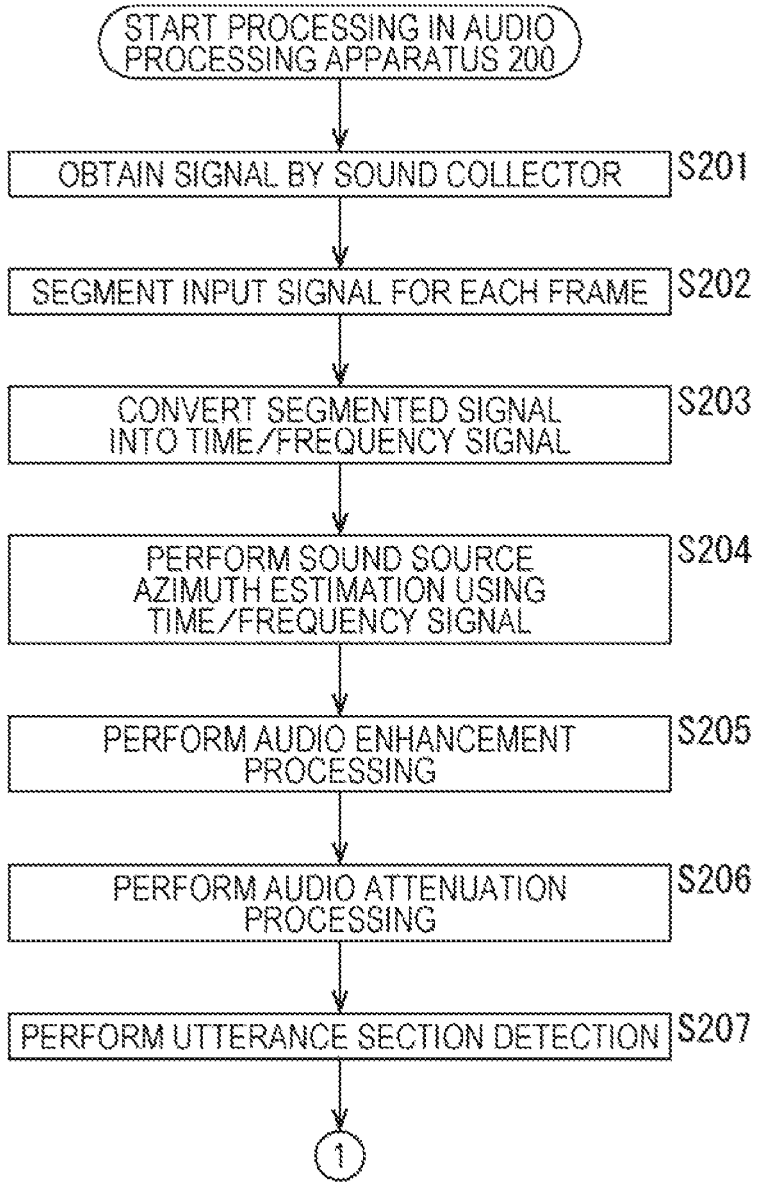
FIG. 17 is a flowchart explaining of an operation of the first (b) audio processing apparatus.

The processing in steps S501 to S507 (FIG. 29) is performed similarly to the processing in steps S201 to S207 in FIG. 17.

The processing in steps S508 to S516 (FIG. 30) is performed basically similarly to the processing in steps S409 to S417 illustrated in FIG. 25, but step S509 (the processing corresponding to step S410) is different.

When it is determined that the current frame is not the utterance section in step S508, the noise environment estimator 501 estimates the noise environment using the audio-enhanced signal and the audio-attenuated signal in step S509. The estimation result is calculated as a value C(t) from −1.0 to 1.0 similarly to that of the noise environment estimator 402 of the second (a) audio processing apparatus 400, and it is determined whether the environment has a small number of noises by comparing the value C(t) with the predetermined threshold (step S510).

Since the above processing is performed by the noise environment estimator 501, the processing after step S510 can be performed similarly to the processing after step S412 (FIG. 25), and the processing by the processing component change instruction unit 410 or the like can be performed similarly to that by the second (a) audio processing apparatus 400.

In the second (b) audio processing apparatus 500, the noise environment can be estimated from the signal obtained from the audio enhancer 405 and the signal obtained from the audio attenuator 406 in this manner. The second (b) audio processing apparatus 500 can also estimate the noise environment and perform the noise eliminating processing with the setting according to the estimated noise environment similarly to the second (a) audio processing apparatus 400, and it is possible to reduce the power consumption.

<Second Operation of Second (b) Audio Processing Apparatus>

Another operation of the audio processing apparatus 500 illustrated in FIG. 28 is described with reference to the flowcharts illustrated in FIGS. 31 and 32. In the operation based on the flowcharts illustrated in FIGS. 31 and 32, the processing to change the configurations of the processing component change instruction unit 410 according to the noise environment is performed at the time when the system is started.

In step S551, it is determined whether the system is started and the initialization needs to be performed. When it is determined that the system is started and the initialization needs to be performed in step S551, the processing proceeds to step S552.

In step S552, the audio signal is obtained by the sound collector 401 with the microphones 23. In step S553, the input signal is segmented for each frame. In step S554, the time/frequency converter 403 converts the segmented signal into a time/frequency signal.

In step S555, the audio azimuth estimator 404 performs the sound source azimuth estimation using the time/frequency signal. An audio enhancer 505 performs the audio enhancement processing in step S556, and an audio attenuator 506 performs the audio attenuation processing in step S557. Then, in step S558, the noise environment estimator 501 estimates the noise environment using the audio-enhanced signal and the audio-attenuated signal.

After the estimated result is referred to in step S558, it is determined whether the environment has a small number of noises in step S559, and when it is determined that the environment has a small number of noises, the processing proceeds to step S560. In step S560, the settings of all the units of the processing component change instruction unit 410 are changed to the setting to reduce the power consumption.

Figure 29:
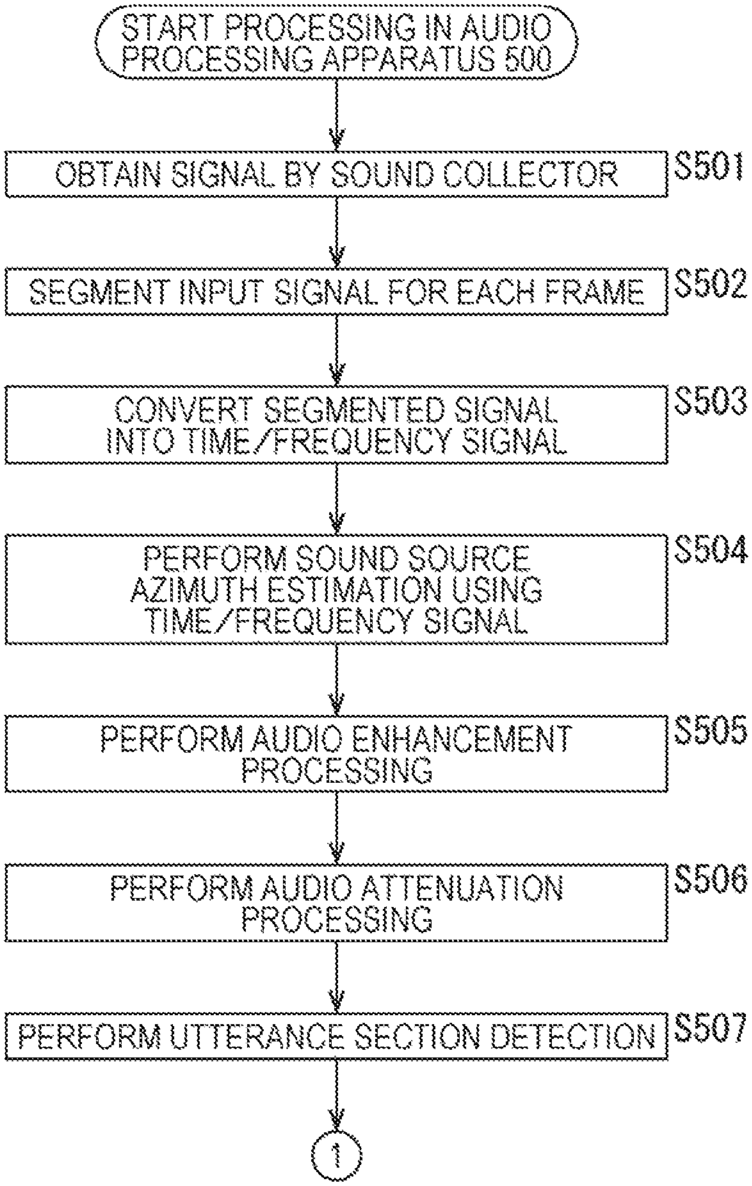
FIG. 29 is a flowchart explaining of an operation of the second (b) audio processing apparatus.
Figure 30:
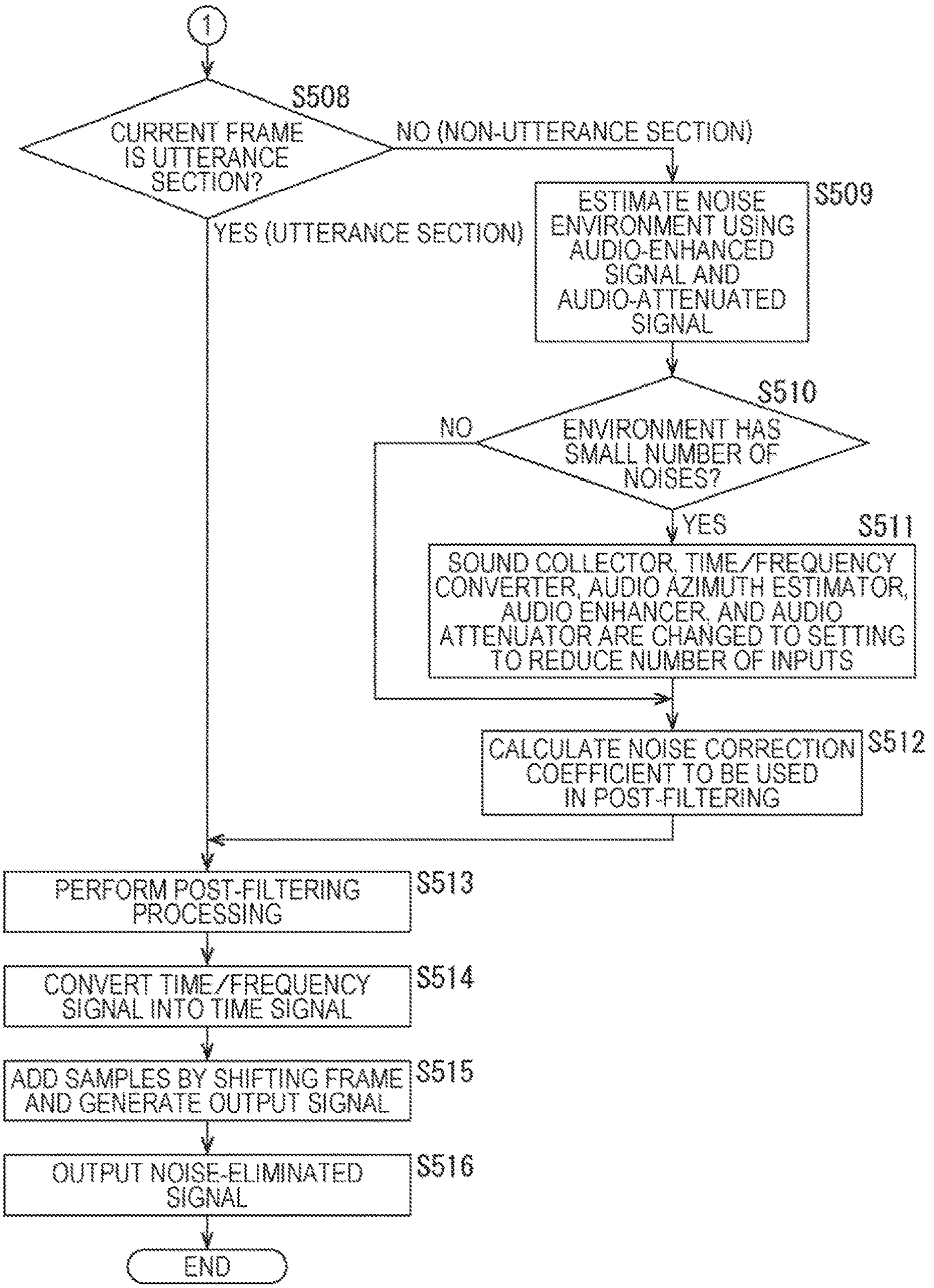
FIG. 30 is a flowchart explaining of the operation of the second (b) audio processing apparatus.

The processing in steps S552 to S560 can be performed similarly to that in steps S501 to S506 in FIG. 29 and in steps S509 to S511 (FIG. 30). In steps S551 to S560, when the initialization is performed, the processing proceeds to step S561.

As described above, when the noise environment is estimated at the time when the system is started and it is determined as the quiet environment, the sound collector 401, the noise environment estimator 402, the time/frequency converter 403, the audio azimuth estimator 404, the audio enhancer 405, and the audio attenuator 406 of the processing component change instruction unit 410 are changed to the setting to reduce the number of inputs.

On the other hand, when it is determined that the environment has a large number of noises in step S559, the processing proceeds to step S561. In this case, the setting set as the initial value is applied to all the units of the processing component change instruction unit 410, and the processing is started.

Furthermore, when it is determined that the system is not started in step S551, the processing proceeds to step S561. The processing in steps S561 to S567 (FIG. 32) is performed similarly to the processing in steps S501 to S507 in FIG. 29. In other words, the processing of initialization is performed at the time when the system is started, and the audio processing is performed with the setting set by the initialization thereafter.

Figure 27:
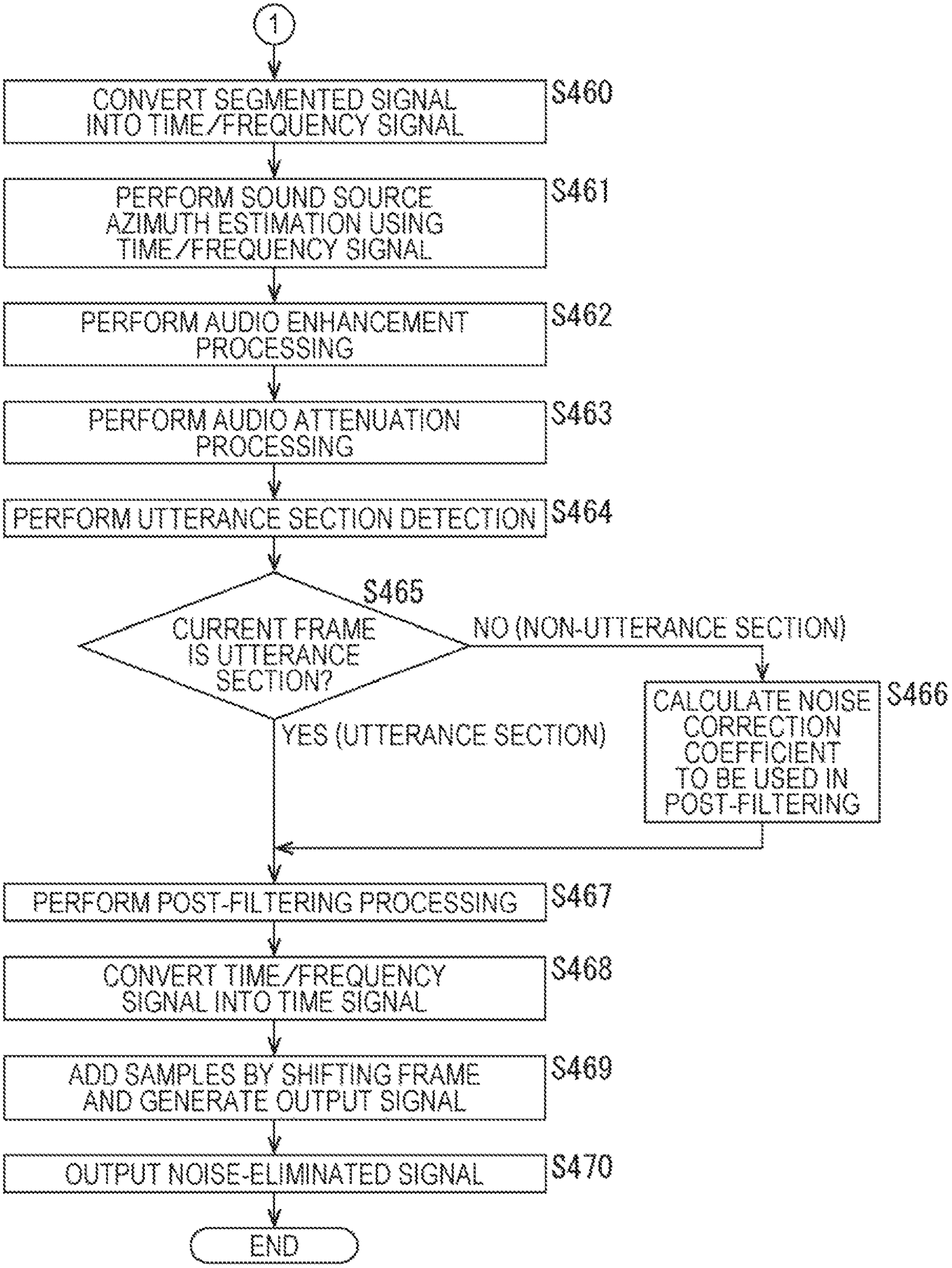
FIG. 27 is a flowchart explaining of the other operation of the second (a) audio processing apparatus.

The processing in steps S568 to S573 (FIG. 32) is performed similarly to the processing performed by the second (a) audio processing apparatus 400 illustrated in FIG. 27 in steps S465 to S470.

In the second (b) audio processing apparatus 500, the noise environment can be estimated from the signal obtained from the audio enhancer 405 and the signal obtained from the audio attenuator 406 in this manner. The second (b) audio processing apparatus 500 can also estimate the noise environment and perform the noise eliminating processing with the setting according to the estimated noise environment similarly to the second (a) audio processing apparatus 400, and it is possible to reduce the power consumption.

<Internal Configuration of Second (c) Audio Processing Apparatus>

Next, a configuration and an operation of a second (c) audio processing apparatus are described. Although the above described second (a) audio processing apparatus 400 (FIG. 22) estimates the noise environment using the audio signal obtained from the sound collector 401, a second (c) audio processing apparatus 600 (FIG. 33) is different in that it estimates the noise environment using information input externally. This configuration is a similar to the configuration of the audio processing apparatus 300 illustrated in FIG. 19.

Figure 33:
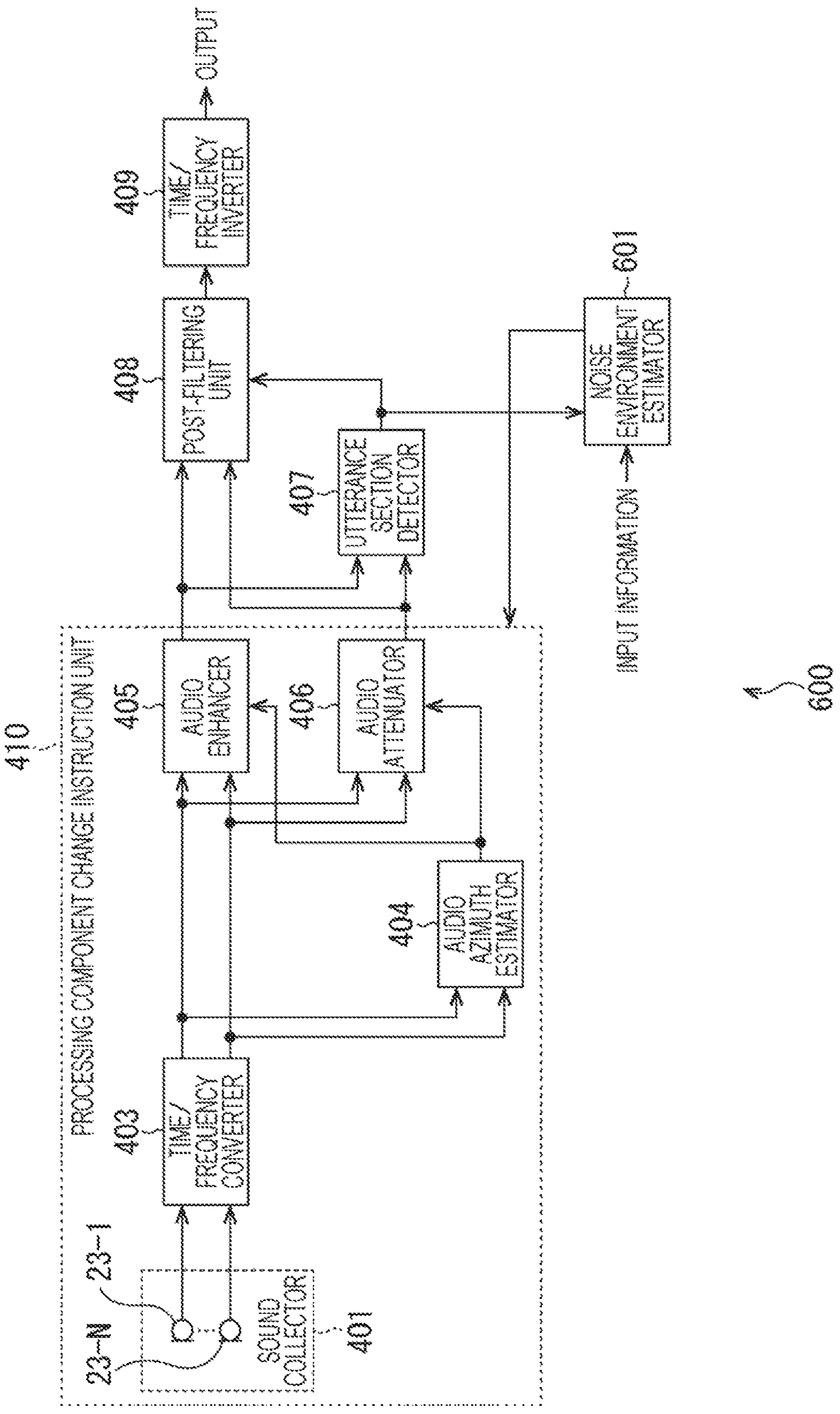
FIG. 33 is a diagram illustrating an internal configuration of a second (c) audio processing apparatus.

FIG. 33 is a diagram illustrating a configuration of the second (c) audio processing apparatus 600. In the audio processing apparatus 600 illustrated in FIG. 33, the same reference signs are attached to the units having the same function as the second (a) audio processing apparatus 400 illustrated in FIG. 22, and the descriptions thereof are omitted.

The audio processing apparatus 600 illustrated in FIG. 33 has a configuration in which the information necessary for the noise environment estimation is externally supplied to a noise environment estimator 601, and has a different configuration from the audio processing apparatus 400 illustrated in FIG. 22 in that the signal from the sound collector 401 is not supplied to the noise environment estimator 601.

Furthermore, as the information necessary for the noise environment estimation to be supplied to the noise environment estimator 601, for example, the information input by the user, position information such as the GPS, or time information is used similarly to the noise environment estimator 301 of the first (c) audio processing apparatus 300.

<First Operation of Second (c) Audio Processing Apparatus>

An operation of the audio processing apparatus 600 having this configuration is described with reference to the flowcharts in FIGS. 34 and 35. The basic operation is similar to that of the audio processing apparatus 400 illustrated in FIG. 22 or the audio processing apparatus 500 illustrated in FIG. 28, and the description of the similar operation is omitted.

The processing in steps S601 to S607 (FIG. 34) is performed similarly to the processing in steps S501 to S507 illustrated in FIG. 29. In other words, all the units of the processing component change instruction unit 410 and the utterance section detector 407 have similar configurations to all the units of the processing component change instruction unit 410 and the utterance section detector 407 of the audio processing apparatus 500 which are illustrated in FIG. 28, and similarly perform the processing.

The processing in steps S608 to S616 (FIG. 35) is performed basically similarly to the processing in steps S508 to S516 illustrated in FIG. 30, but step S609 (the processing corresponding to step S509) is different.

When it is determined that the current frame is not the utterance section in step S608, the noise environment estimator 601 estimates the noise environment using the information input externally in step S609.

The estimation result is calculated as a value C(t) from −1.0 to 1.0 similarly to that of the noise environment estimator 402 of the second (a) audio processing apparatus 400 or the noise environment estimator 501 of the second (b) audio processing apparatus 500, and it is determined whether the environment has a small number of noises by comparing the value C(t) with the predetermined threshold (step S610).

Since the above processing is performed by the noise environment estimator 601, the processing after step S610 can be performed similarly to the processing after step S510 (FIG. 30), and the processing by the processing component change instruction unit 410 or the like can be performed similarly to that by the second (b) audio processing apparatus 500 (or the second (a) audio processing apparatus 400).

In the second (c) audio processing apparatus 600, the noise environment can be estimated from the signal input externally in this manner. The second (c) audio processing apparatus 600 can also estimate the noise environment and perform the noise eliminating processing with the setting according to the estimated noise environment similarly to the second (a) audio processing apparatus 400, and it is possible to reduce the power consumption.

<Second Operation of Second (c) Audio Processing Apparatus>

Another operation of the audio processing apparatus 600 illustrated in FIG. 33 is described with reference to the flowcharts illustrated in FIGS. 36 and 378. In the operation based on the flowcharts illustrated in FIGS. 36 and 37, the processing to change the configurations of the processing component change instruction unit 410 according to the noise environment is performed at the time when the system is started.

In step S651, it is determined whether the system is started and the initialization needs to be performed. When it is determined that the system is started and the initialization needs to be performed in step S651, the processing proceeds to step S652.

In step S652, the noise environment estimator 501 estimates the noise environment using information input externally.

After the estimated result is referred to in step S652, it is determined whether the environment has a small number of noises in step S653, and when it is determined that the environment has a small number of noises, the processing proceeds to step S654. In step S654, the settings of all the units of the processing component change instruction unit 410 are changed to the setting to reduce the power consumption.

Figure 35:
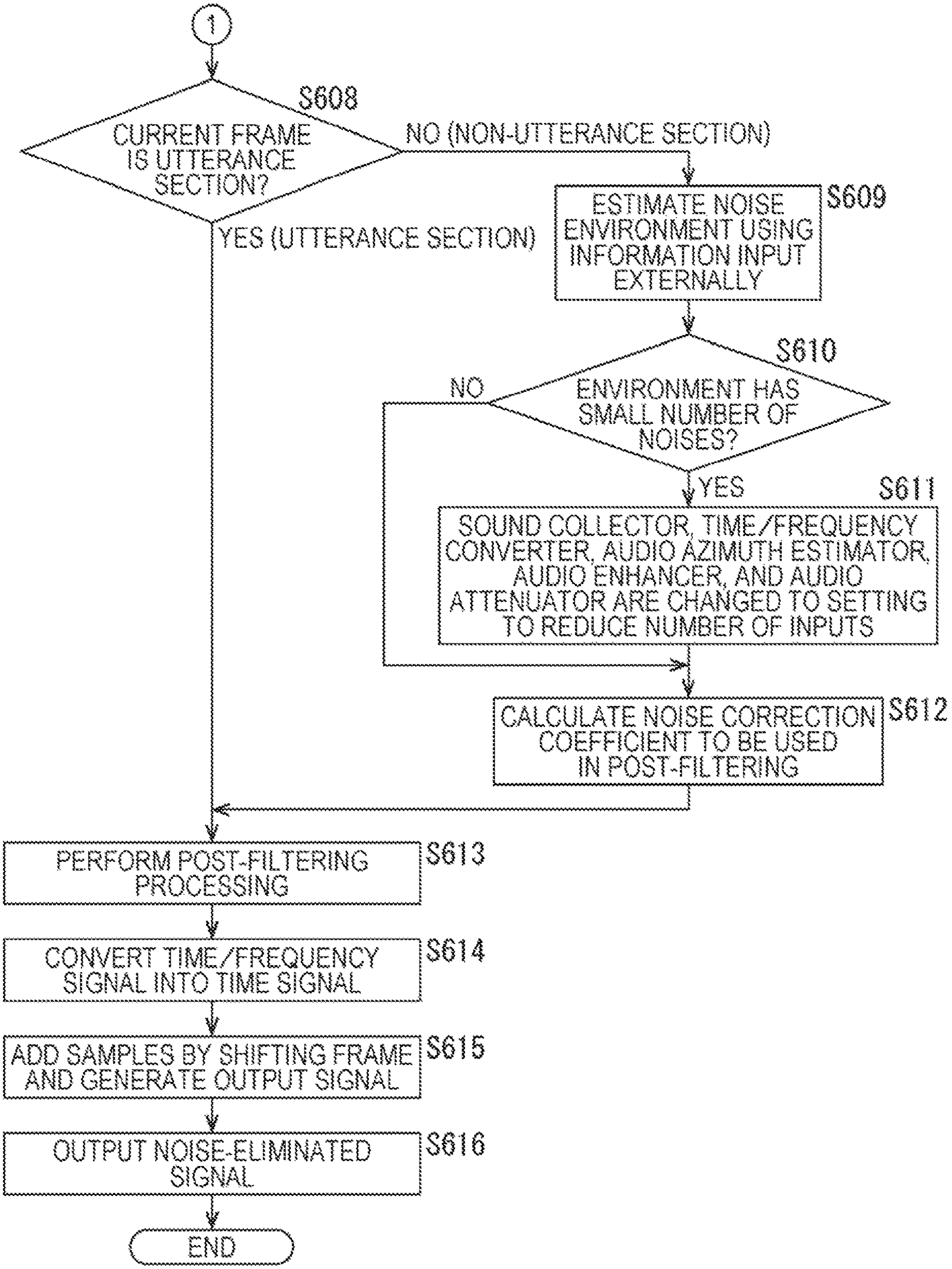
FIG. 35 is a flowchart explaining of the operation of the second (c) audio processing apparatus.

The processing in steps S652 to S654 can be performed similarly to that in steps S609 to S611 in FIG. 35. When the initialization is performed in steps S652 to S654, the processing proceeds to step S655.

As described above, when the noise environment is estimated at the time when the system is started and it is determined as the quiet environment, the sound collector 401, the noise environment estimator 402, the time/frequency converter 403, the audio azimuth estimator 404, the audio enhancer 405, and the audio attenuator 406 of the processing component change instruction unit 410 are changed to the setting to reduce the number of inputs.

On the other hand, when it is determined that the environment has a large number of noises in in step S653, the processing proceeds to step S655. In this case, the setting set as the initial value is applied to all the units of the processing component change instruction unit 410, and the processing is started.

Furthermore, when it is determined that the system is not started in step S651, the processing proceeds to step S655. The processing in steps S655 (FIG. 36) to S667 (FIG. 37) is performed similarly to the processing in steps S561 (FIG. 31) in FIG. 31 to S573 (FIG. 32) (the processing performed by the second (b) audio processing apparatus 500). In other words, the processing of initialization is performed at the time when the system is started, and the audio processing is performed with the setting set by the initialization thereafter.

In the second (c) audio processing apparatus 600, the noise environment can be estimated from the information input externally in this manner. The second (c) audio processing apparatus 600 can also estimate the noise environment and perform the noise eliminating processing with the setting according to the estimated noise environment similarly to the second (a) audio processing apparatus 400, and it is possible to reduce the power consumption.

Furthermore, in the audio processing apparatus 400 illustrated in FIG. 22, a buffer region (memory) is needed in order to temporarily hold the signal in the time domain segmented in a frame for the noise environment estimation. However, the audio processing apparatus 600 (FIG. 33) may have a configuration in which the buffer region (memory) is omitted, since it is not necessary to temporarily hold the signal in the time domain segmented in a frame for the noise environment estimation.

Furthermore, since the second (c) audio processing apparatus 600 has a configuration in which the correlation calculation necessary for the second (a) audio processing apparatus 400 or the second (b) audio processing apparatus 500 is not performed, it is possible to reduce the computation cost.

<Internal Configuration and Operation of Third Audio Processing Apparatus>

<Internal Configuration of Third (a) Audio Processing Apparatus>

Another configuration of the audio processing apparatus is described. A third audio processing apparatus is configured by combining the above described first audio processing apparatus and second audio processing apparatus.

Figure 38:
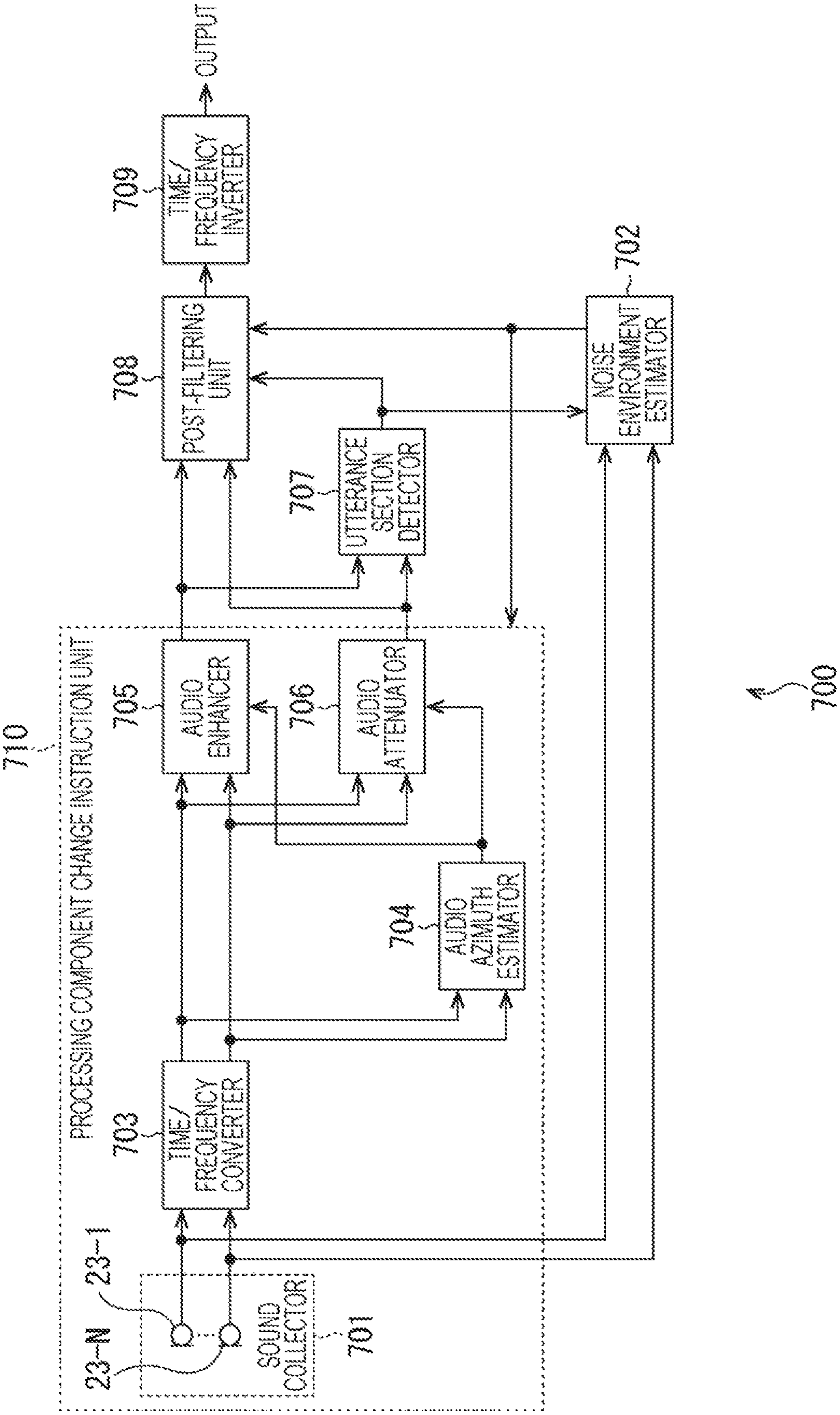
FIG. 38 is a diagram illustrating an internal configuration of a third (a) audio processing apparatus.

FIG. 38 is a diagram illustrating a configuration of a third (a) audio processing apparatus 700. The third (a) audio processing apparatus 700 is configured by combining the above described first (a) audio processing apparatus 100 (FIG. 3) and second (a) audio processing apparatus 400 (FIG. 22).

The audio processing apparatus 700 is provided inside the mobile phone 10 and constitutes a part of the mobile phone 10. The audio processing apparatus 700 illustrated in FIG. 38 includes a sound collector 701, a noise environment estimator 702, a time/frequency converter 703, an audio azimuth estimator 704, an audio enhancer 705, an audio attenuator 706, an utterance section detector 707, a post-filtering unit 708, and a time/frequency inverter 709.

This configuration is similar to that of the first audio processing apparatus or the second audio processing apparatus, but the third audio processing apparatus has a different configuration from the first audio processing apparatus, but a similar configuration to the second audio processing apparatus, in that a processing component change instruction unit 710 includes the sound collector 701, the noise environment estimator 702, the time/frequency converter 703, the audio azimuth estimator 704, the audio enhancer 705, and the audio attenuator 706.

The internal configuration of the processing component change instruction unit 710 is changed according to the estimation result of the noise environment by the noise environment estimator 702. This configuration is similar to that of the second (a) audio processing apparatus 400 (FIG. 22).

The estimation result by the noise environment estimator 702 is also supplied to the post-filtering unit 708, and the post-filtering unit 708 is configured so as to control the strength of the noise elimination according to the estimated noise environment. This configuration is similar to that of the first (a) audio processing apparatus 100 (FIG. 3).

The sound collector 701, the noise environment estimator 702, the time/frequency converter 703, the audio azimuth estimator 704, the audio enhancer 705, the audio attenuator 706, the utterance section detector 707, and the time/frequency inverter 709 of the third (a) audio processing apparatus 700 perform the processing similarly to the sound collector 401, the noise environment estimator 402, the time/frequency converter 403, the audio azimuth estimator 404, the audio enhancer 405, the audio attenuator 406, the utterance section detector 407, the post-filtering unit 408, and the time/frequency inverter 409 of the second (a) audio processing apparatus 400 (FIG. 22), and the detailed descriptions are omitted.

The estimation result C(t) from the noise environment estimator 702 is input to the post-filtering unit 708 similarly to the post-filtering unit 108 of the first audio processing apparatus, and the post-filtering unit 708 performs the post-filtering processing using the estimation result C(t).

<First Operation of Third (a) Audio Processing Apparatus>

Figure 39:
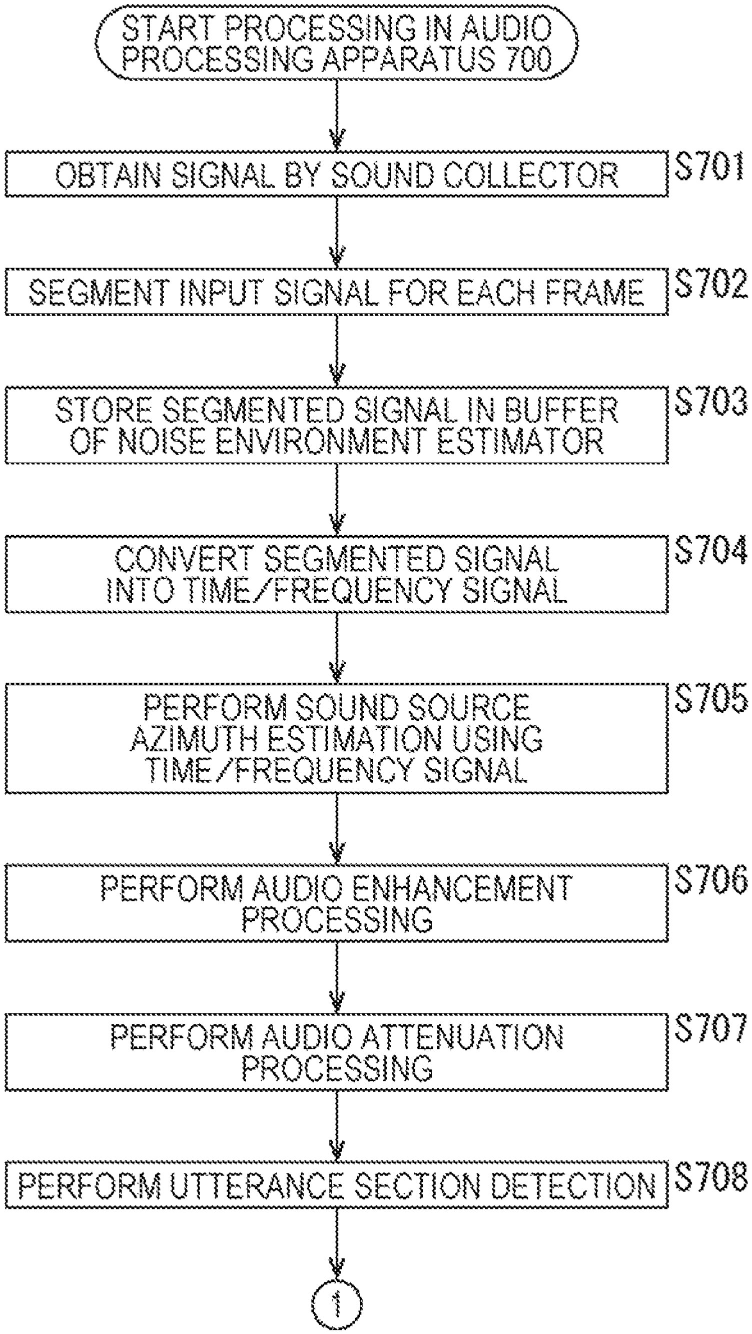
FIG. 39 is a flowchart explaining of an operation of the third (a) audio processing apparatus.
Figure 40:
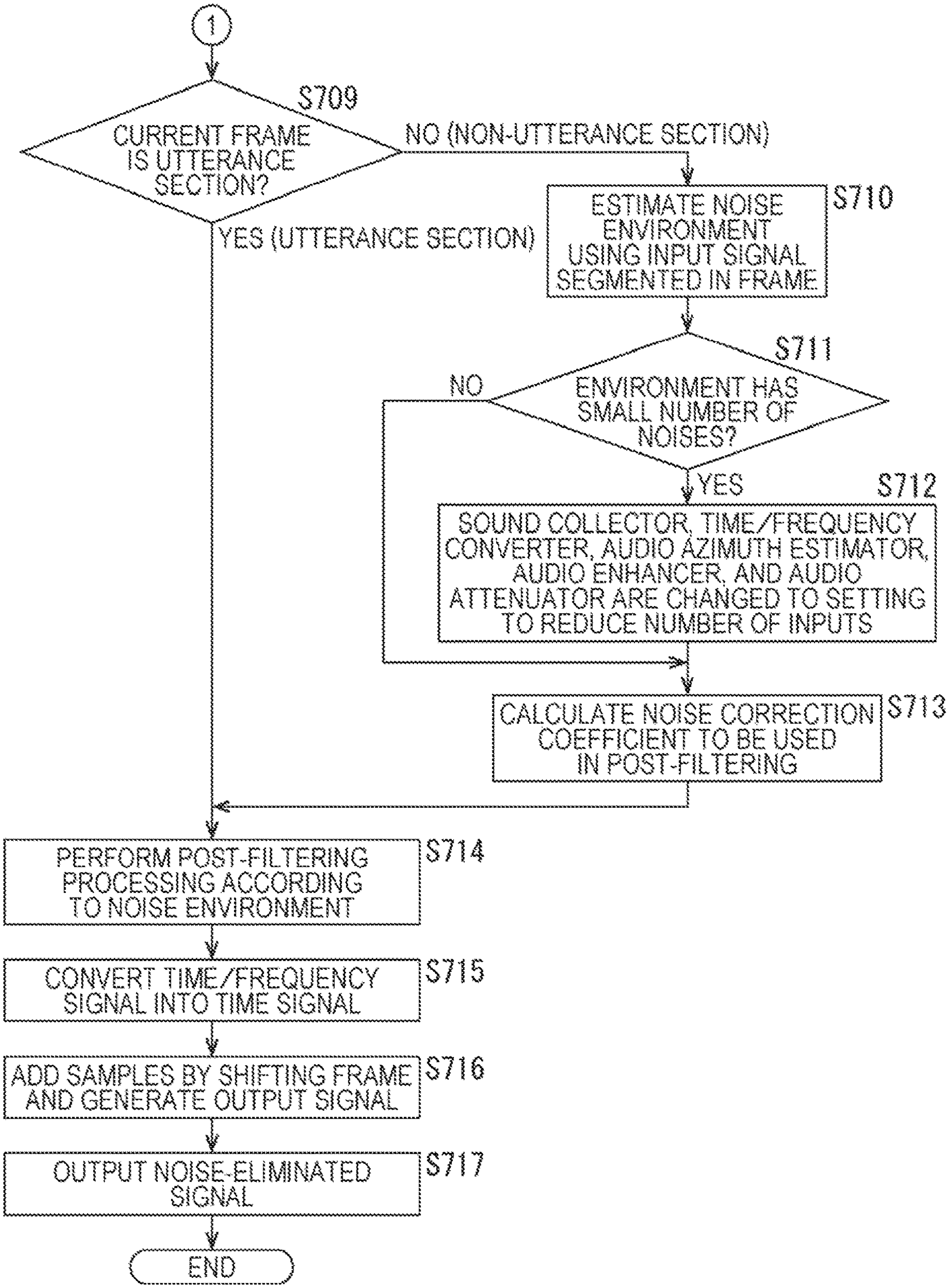
FIG. 40 is a flowchart explaining of the operation of the third (a) audio processing apparatus.

An operation of the audio processing apparatus 700 illustrated in FIG. 38 is described with reference to the flowcharts illustrated in FIGS. 39 and 40. The audio processing apparatus 700 is configured by combining the first (a) audio processing apparatus 100 and the second (a) audio processing apparatus 400 as described above, and the operation thereof is an operation combing the operation of the first (a) audio processing apparatus 100 (the operation based on the flowcharts illustrated in FIGS. 4 and 5) and the operation of the second (a) audio processing apparatus 400 (the operation based on the flowcharts illustrated in FIGS. 24 and 25).

Steps S701 to S717 are performed basically similarly to steps S401 to S417 performed by the second (a) audio processing apparatus 400 illustrated in FIGS. 24 and 25.

In the third (a) audio processing apparatus 700 similarly to the second (a) audio processing apparatus 400, the settings in the processing component change instruction unit 710 are changed according to the noise environment. Thus, in the third (a) audio processing apparatus 700 similarly to the second (a) audio processing apparatus 400, it is possible to reduce the power consumption.

Furthermore, in the third (a) audio processing apparatus 700, the post-filtering unit 708 performs the post-filtering processing according to the noise environment in step S714. This processing is performed similarly to the processing performed by the first (a) audio processing apparatus 100 in step S112 (FIG. 5).

In the third (a) audio processing apparatus 700 similarly to the first (a) audio processing apparatus 100, the post-filtering unit 708 performs the post-filtering processing according to the noise environment. Thus, in the third (a) audio processing apparatus 700 similarly to the first (a) audio processing apparatus 100, it is possible to appropriately perform the noise eliminating processing according to the noise environment and prevent the generation of a musical noise or the like.

<Second Operation of Third (a) Audio Processing Apparatus>

Figure 41:
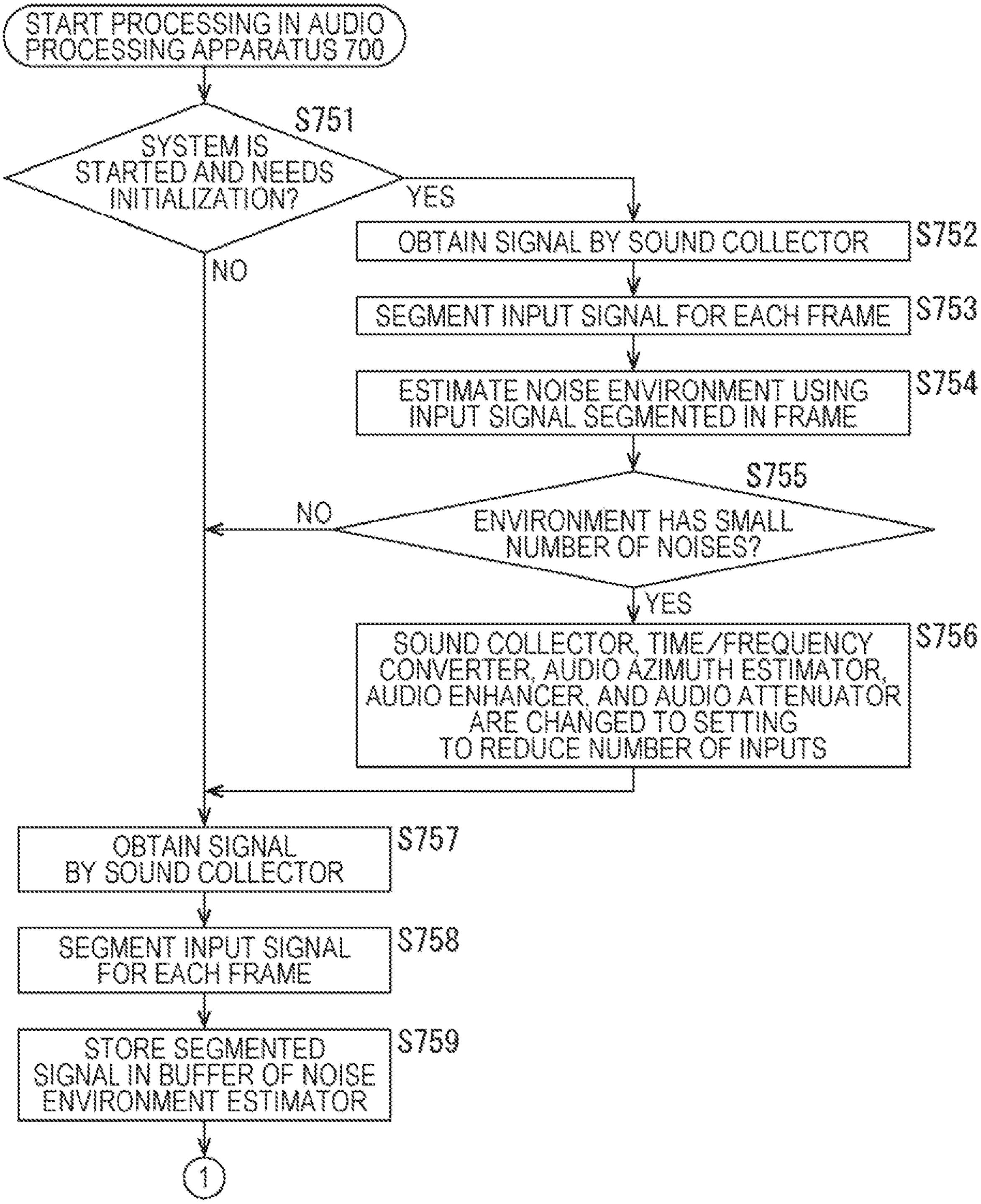
FIG. 41 is a flowchart explaining of another operation of the third (a) audio processing apparatus.
Figure 42:
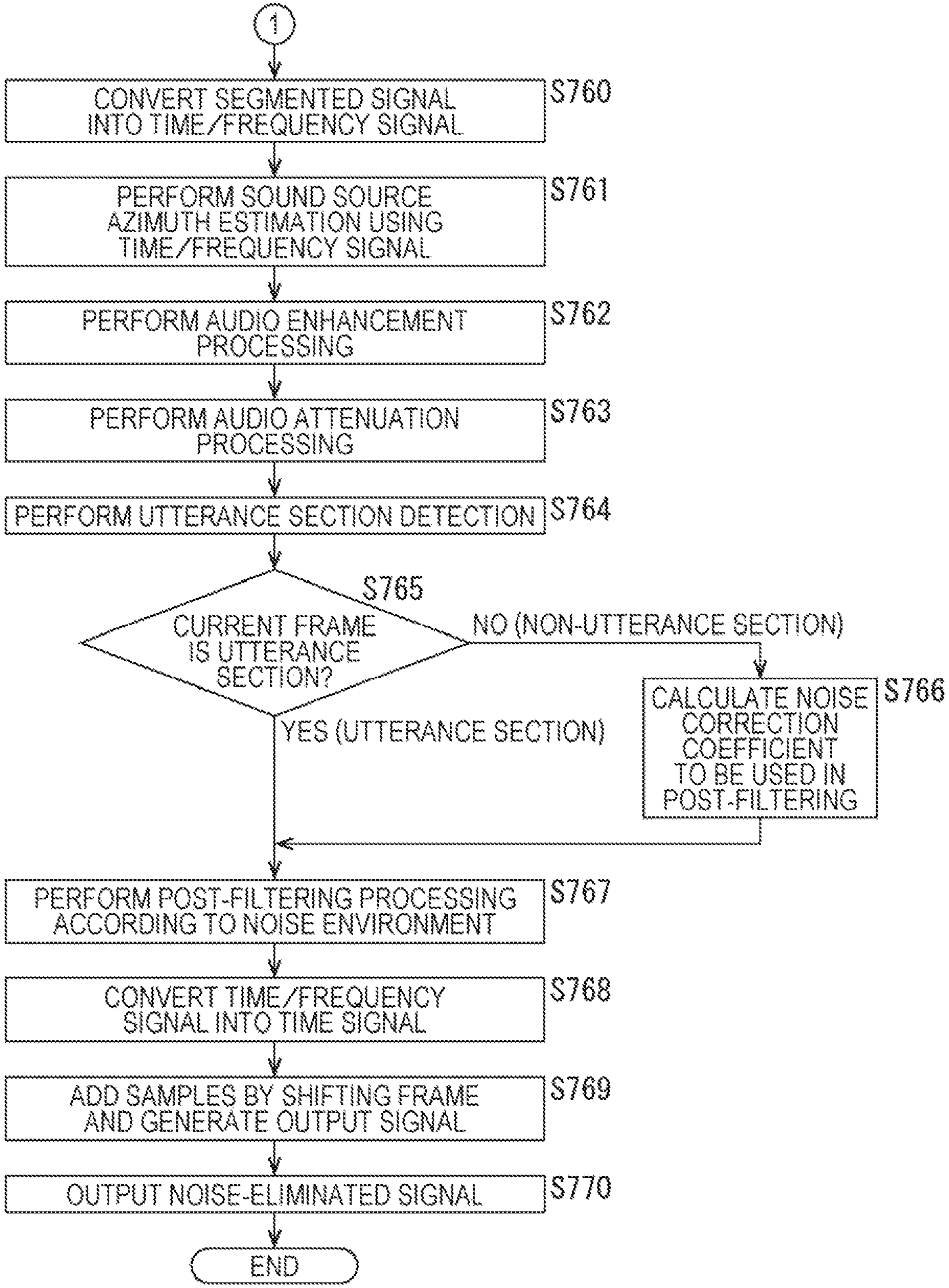
FIG. 42 is a flowchart explaining of the other operation of the third (a) audio processing apparatus.

Another operation of the audio processing apparatus 700 illustrated in FIG. 38 is described with reference to the flowcharts illustrated in FIGS. 41 and 42. The second operation of the third (a) audio processing apparatus 700 is an operation by combining the operation of the first (a) audio processing apparatus 100 (the operation based on the flowcharts illustrated in FIGS. 4 and 5) and the second operation of the second (a) audio processing apparatus 400 (the operation based on the flowcharts illustrated in FIGS. 26 and 27).

Figure 26:
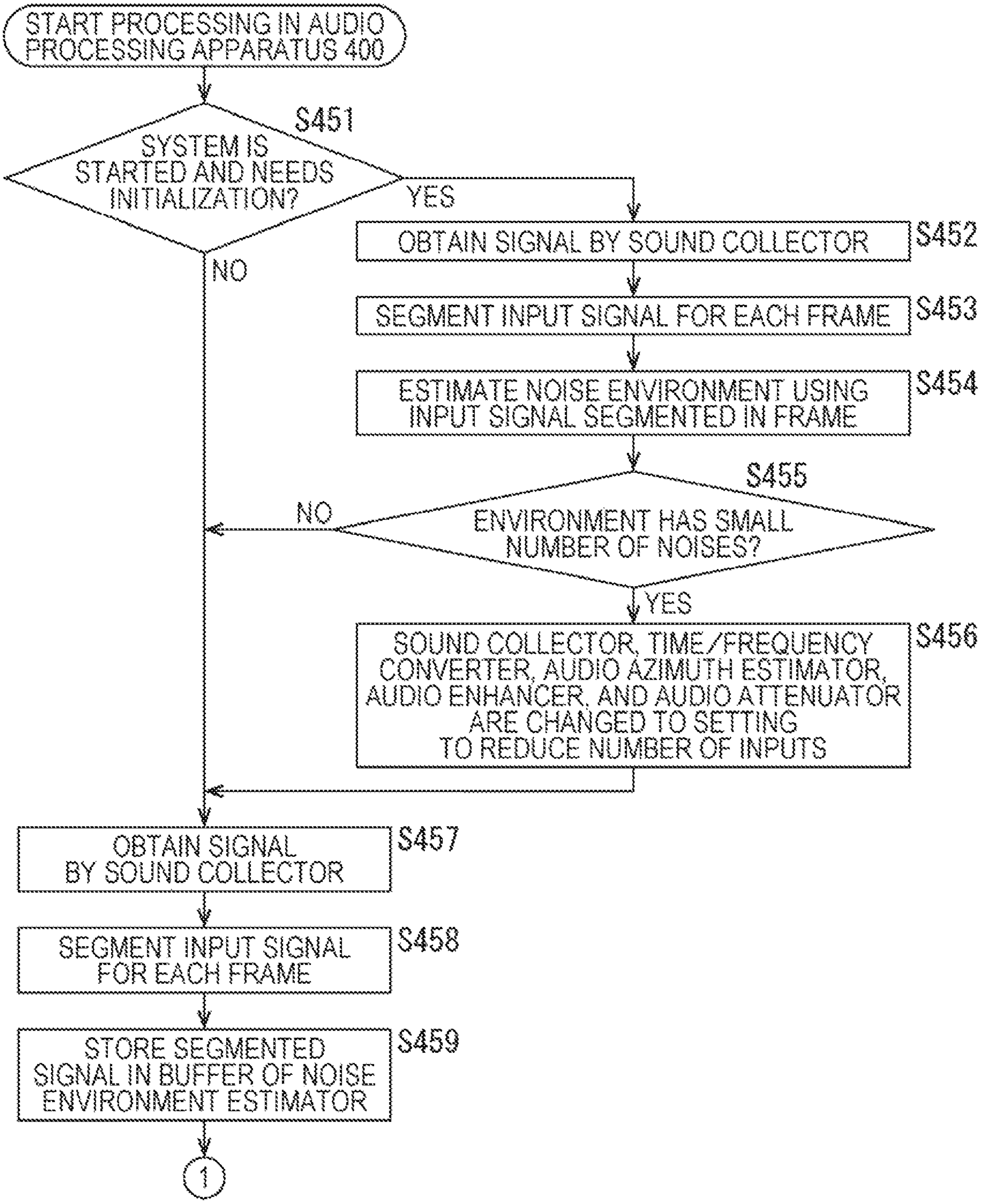
FIG. 26 is a flowchart explaining of another operation of the second (a) audio processing apparatus.

Steps S751 to S770 are performed basically similarly to steps S451 to S470 performed by the second (a) audio processing apparatus 400 illustrated in FIGS. 26 and 27.

In the third (a) audio processing apparatus 700 similarly to the second (a) audio processing apparatus 400, the settings in the processing component change instruction unit 710 are changed according to the noise environment at the time when the system is started. Thus, in the third (a) audio processing apparatus 700 similarly to the second (a) audio processing apparatus 400, it is possible to reduce the power consumption.

Furthermore, in the third (c) audio processing apparatus 700, the post-filtering unit 708 performs the post-filtering processing according to the noise environment in step S767. This processing is performed similarly to the processing performed by the first (a) audio processing apparatus 100 in step S112 (FIG. 5).

In the third (a) audio processing apparatus 700 similarly to the first (a) audio processing apparatus 100, the post-filtering unit 708 performs the post-filtering processing according to the noise environment. Thus, in the third (a) audio processing apparatus 700 similarly to the first (a) audio processing apparatus 100, it is possible to appropriately perform the noise eliminating processing according to the noise environment and prevent the generation of a musical noise or the like.

<Internal Configuration of Third (b) Audio Processing Apparatus>

Figure 43:
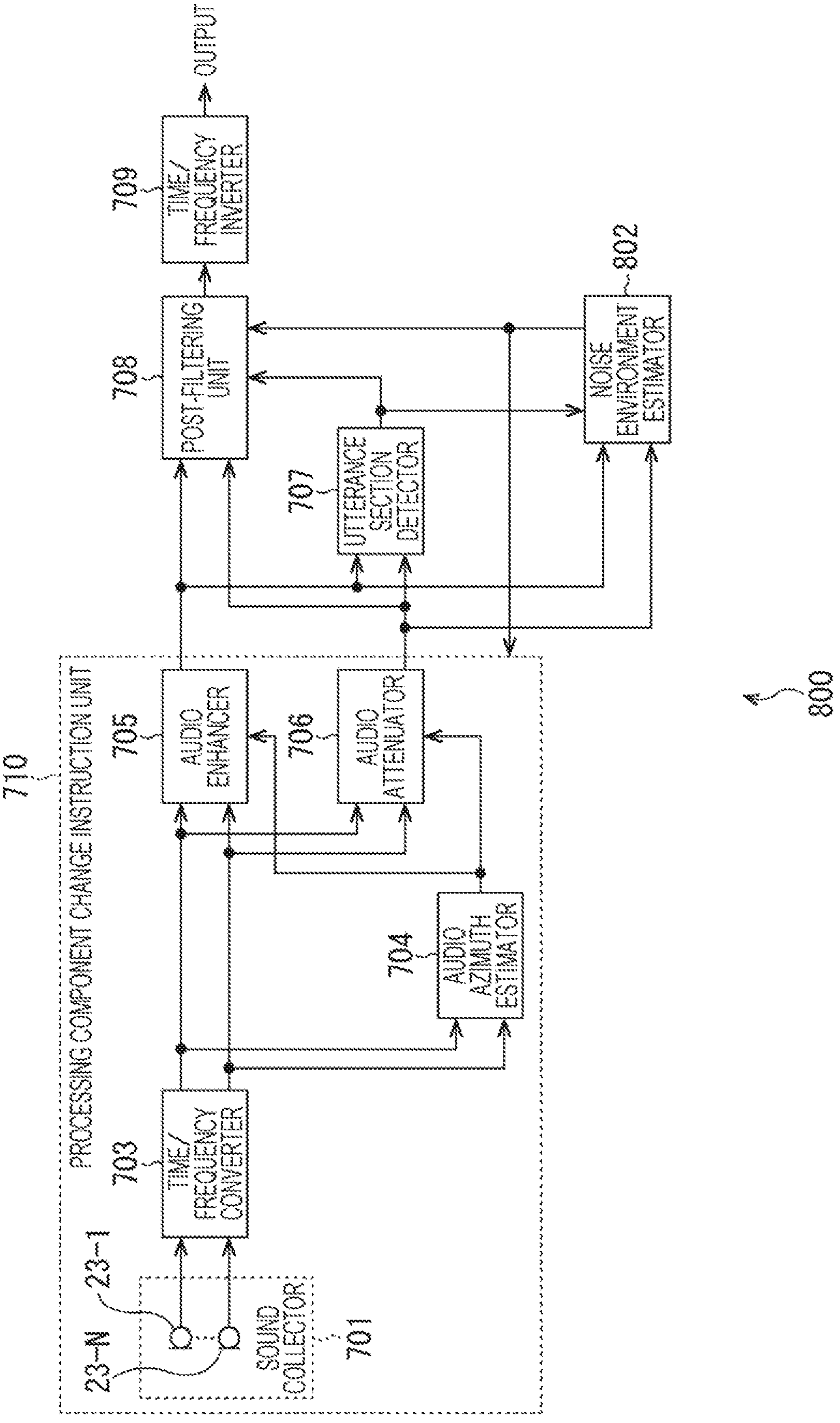
FIG. 43 is a diagram illustrating an internal configuration of a third (b) audio processing apparatus.

FIG. 43 is a diagram illustrating a configuration of a third (b) audio processing apparatus 800. The audio processing apparatus 800 is provided inside the mobile phone 10 and constitutes a part of the mobile phone 10. The third (b) audio processing apparatus 800 illustrated in FIG. 43 is configured by combining the above described first (b) audio processing apparatus 200 (FIG. 15) and second (b) audio processing apparatus 500 (FIG. 28).

Furthermore, in the third (b) audio processing apparatus 800 similarly to the above described third (a) audio processing apparatus 700, the internal configuration of the processing component change instruction unit 710 is changed according to the estimation result of the noise environment by the noise environment estimator 801.

Furthermore, the estimation result by the noise environment estimator 801 is also supplied to the post-filtering unit 708, and the post-filtering unit 708 is configured so as to control the strength of the noise elimination according to the estimated noise environment.

<First Operation of Third (b) Audio Processing Apparatus>

Figure 44:
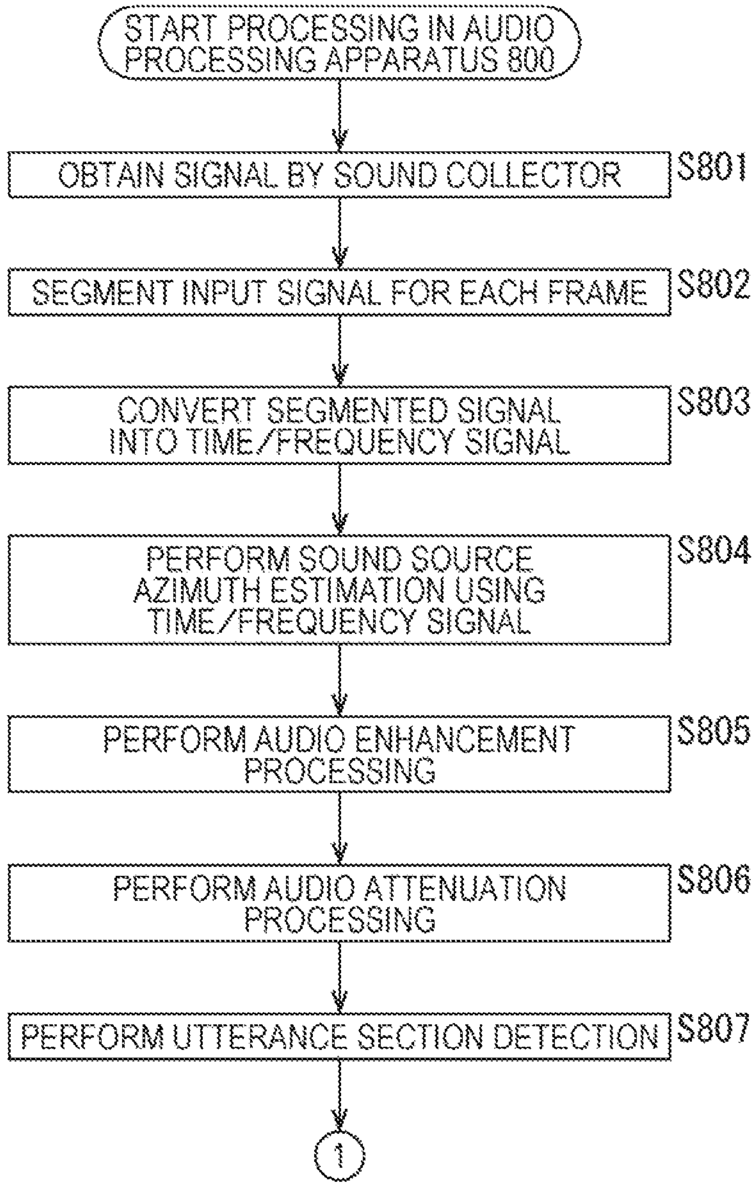
FIG. 44 is a flowchart explaining of an operation of the third (b) audio processing apparatus.
Figure 45:
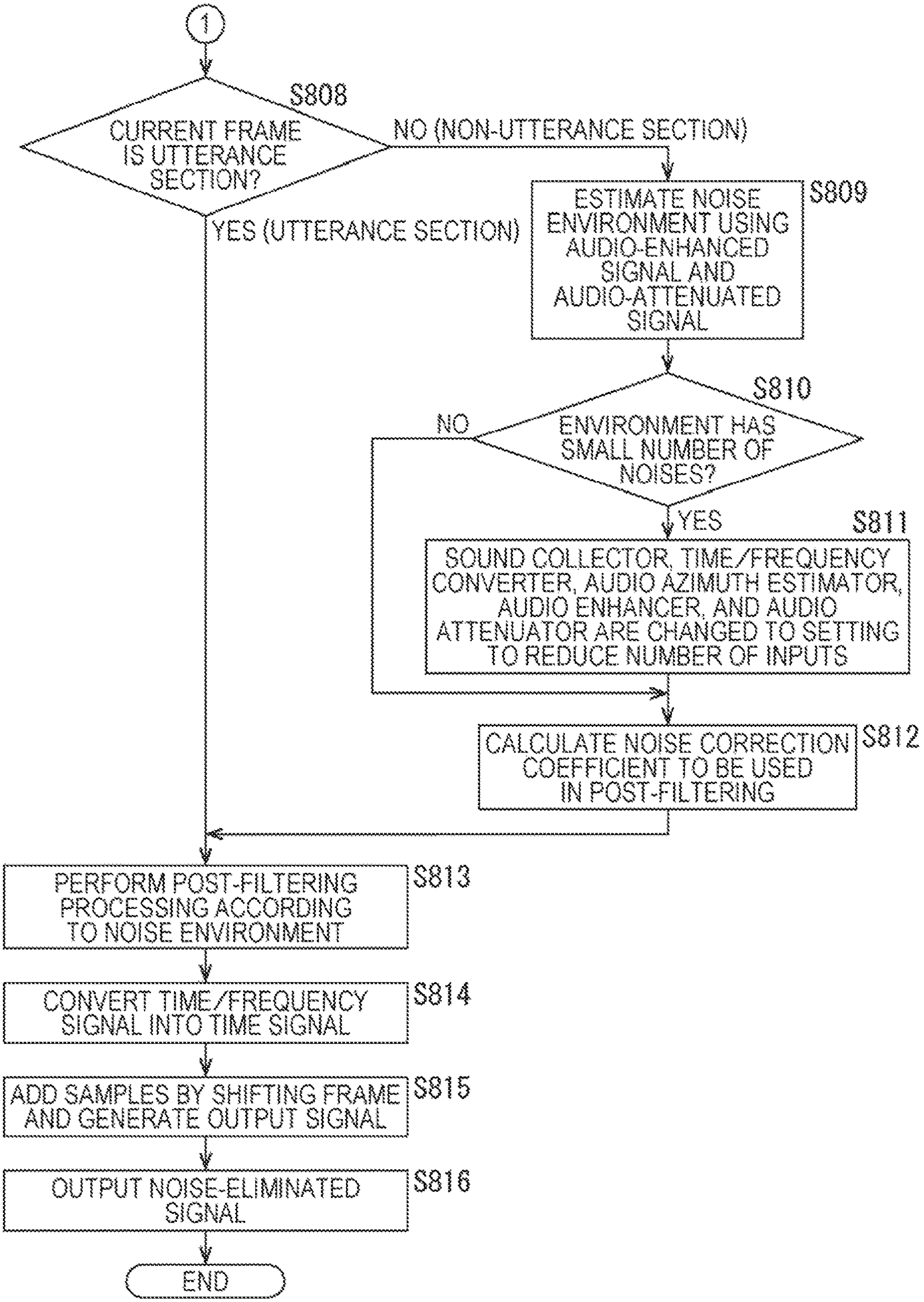
FIG. 45 is a flowchart explaining of the operation of the third (b) audio processing apparatus.

Another operation of the audio processing apparatus 800 illustrated in FIG. 43 is described with reference to the flowcharts illustrated in FIGS. 44 and 45.

The audio processing apparatus 800 is configured by combining the first (b) audio processing apparatus 200 and the second (b) audio processing apparatus 500 as described above, and the operation thereof is an operation combing the operation of the first (b) audio processing apparatus 200 (the operation based on the flowcharts in FIGS. 17 and 18) and the operation of the second (b) audio processing apparatus 500 (the operation based on the flowcharts in FIGS. 29 and 30).

Steps S801 to S816 are performed basically similarly to steps S501 to S516 performed by the second (b) audio processing apparatus 500 illustrated in FIGS. 29 and 30.

In the third (b) audio processing apparatus 800 similarly to the second (b) audio processing apparatus 500, the settings in the processing component change instruction unit 710 are changed according to the noise environment. Thus, in the third (b) audio processing apparatus 800 similarly to the second (b) audio processing apparatus 500, it is possible to reduce the power consumption.

Figure 18:
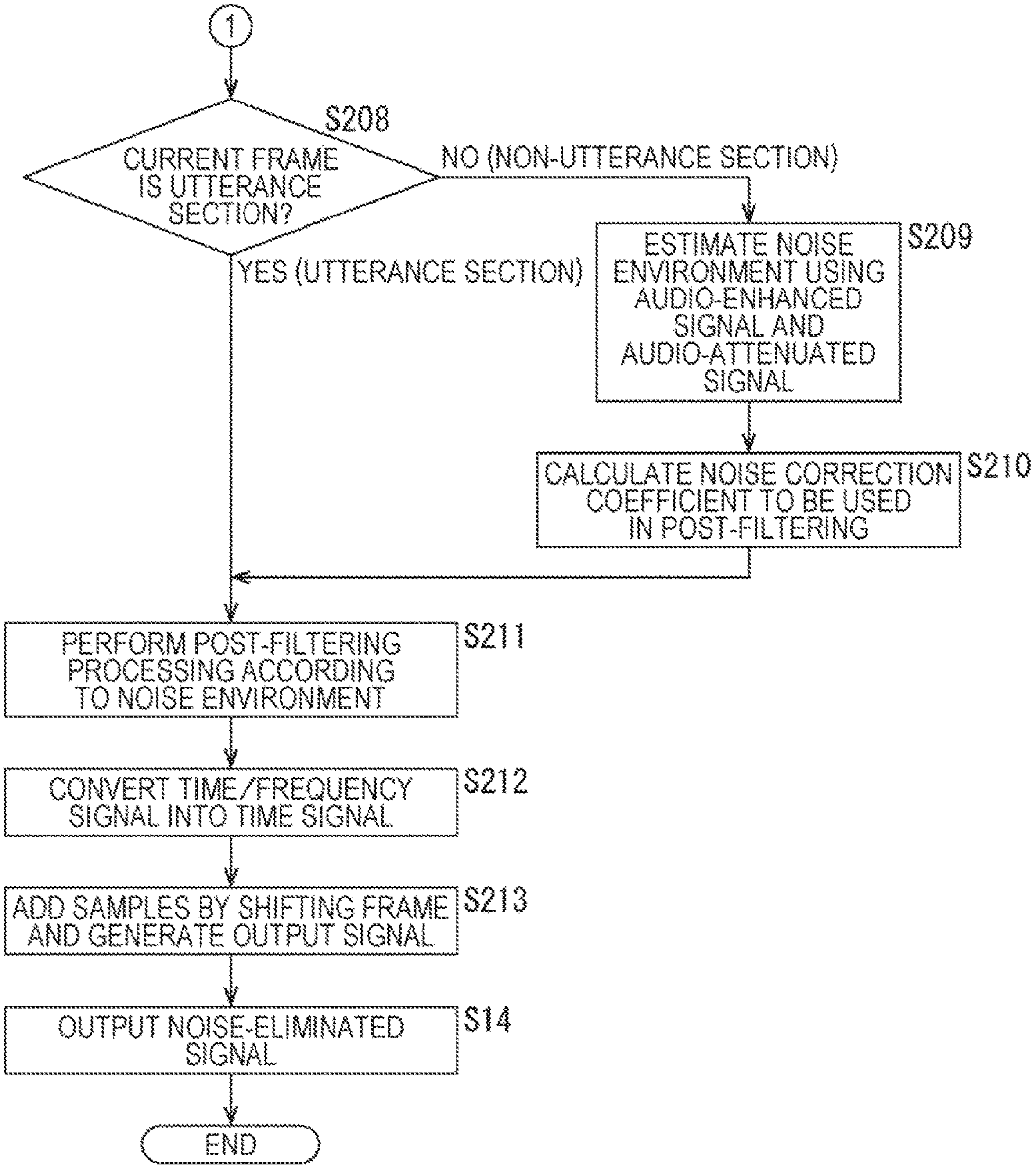
FIG. 18 is a flowchart explaining of the operation of the first (b) audio processing apparatus.

In the third (b) audio processing apparatus 800, the post-filtering unit 708 performs the post-filtering processing according to the noise environment in step S813 This processing is performed similarly to the processing performed by the first (b) audio processing apparatus 200 in step S211 (FIG. 18).

In the third (b) audio processing apparatus 800 similarly to the first (b) audio processing apparatus 200, the post-filtering unit 708 performs the post-filtering processing according to the noise environment. Thus, in the third (b) audio processing apparatus 800 similarly to the first (b) audio processing apparatus 200, it is possible to appropriately perform the noise eliminating processing according to the noise environment and prevent the generation of a musical noise or the like.

Furthermore, the audio processing apparatus 800 (FIG. 43) may have a configuration in which the buffer region (memory) is omitted, since it is not necessary to temporarily hold the signal in the time domain segmented in a frame for the noise environment estimation.

<Second Operation of Third (b) Audio Processing Apparatus>

Figure 46:
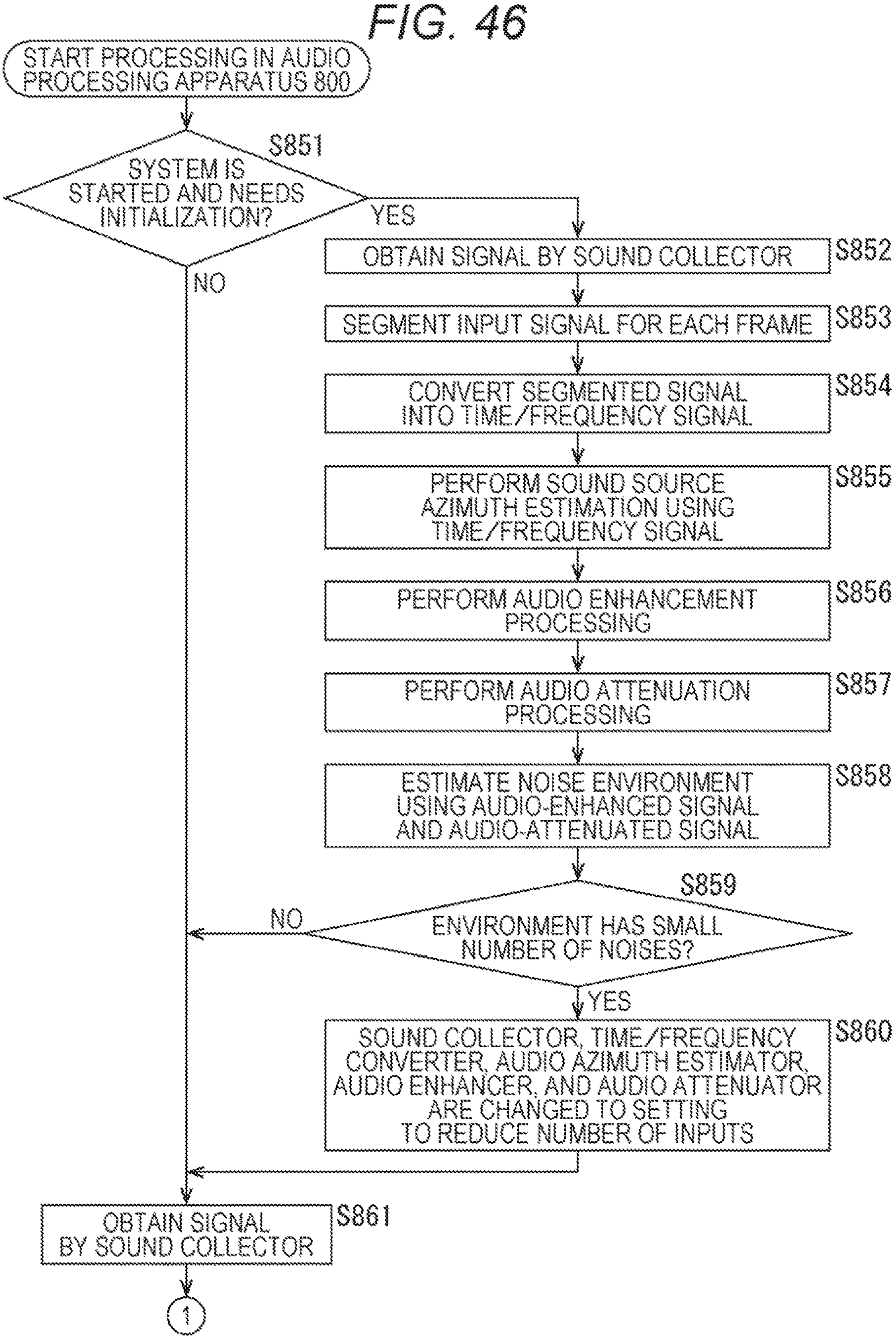
FIG. 46 is a flowchart explaining of another operation of the third (b) audio processing apparatus.
Figure 47:
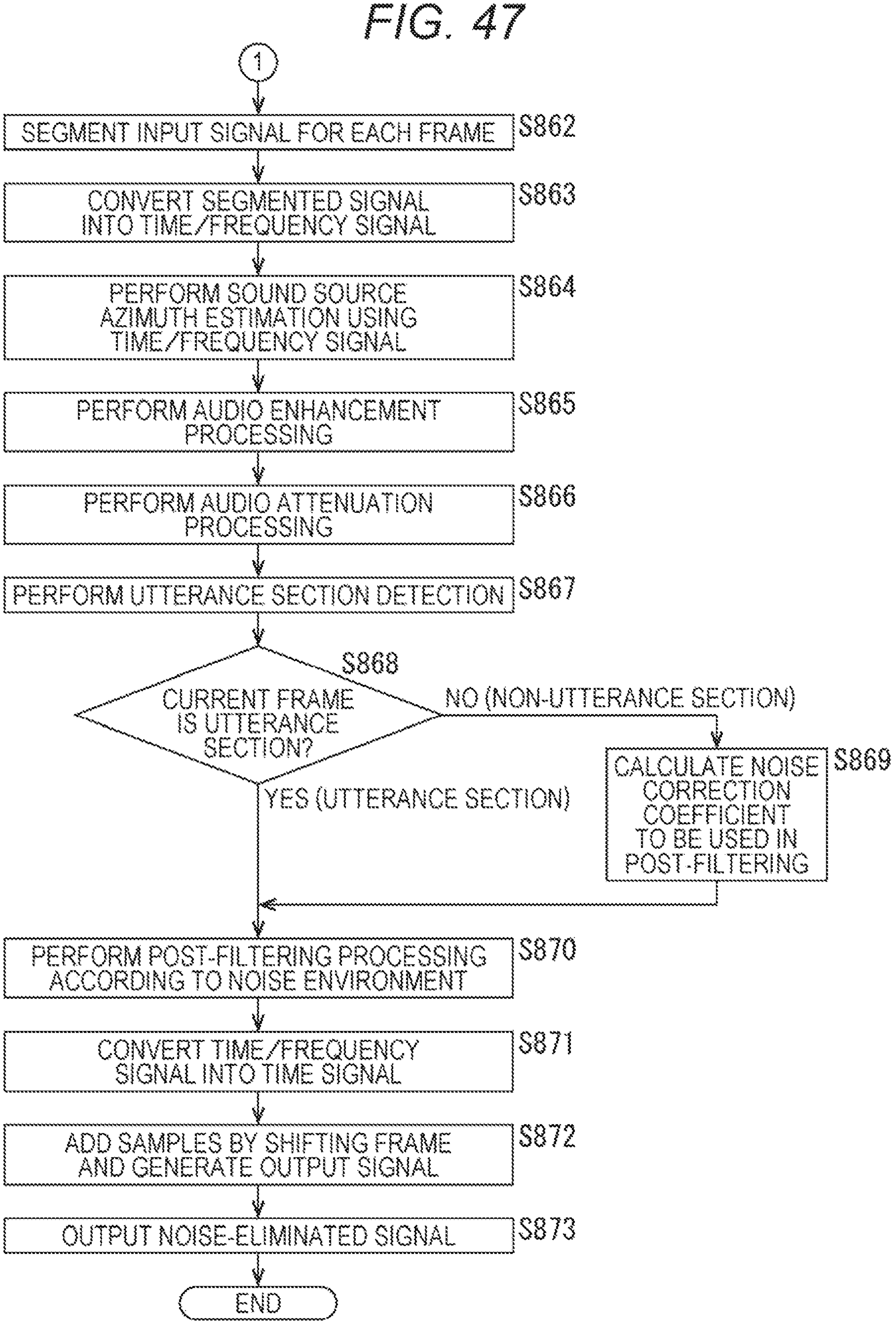
FIG. 47 is a flowchart explaining of the other operation of the third (b) audio processing apparatus.

Another operation of the audio processing apparatus 800 illustrated in FIG. 43 is described with reference to the flowcharts illustrated in FIGS. 46 and 47.

Figure 31:
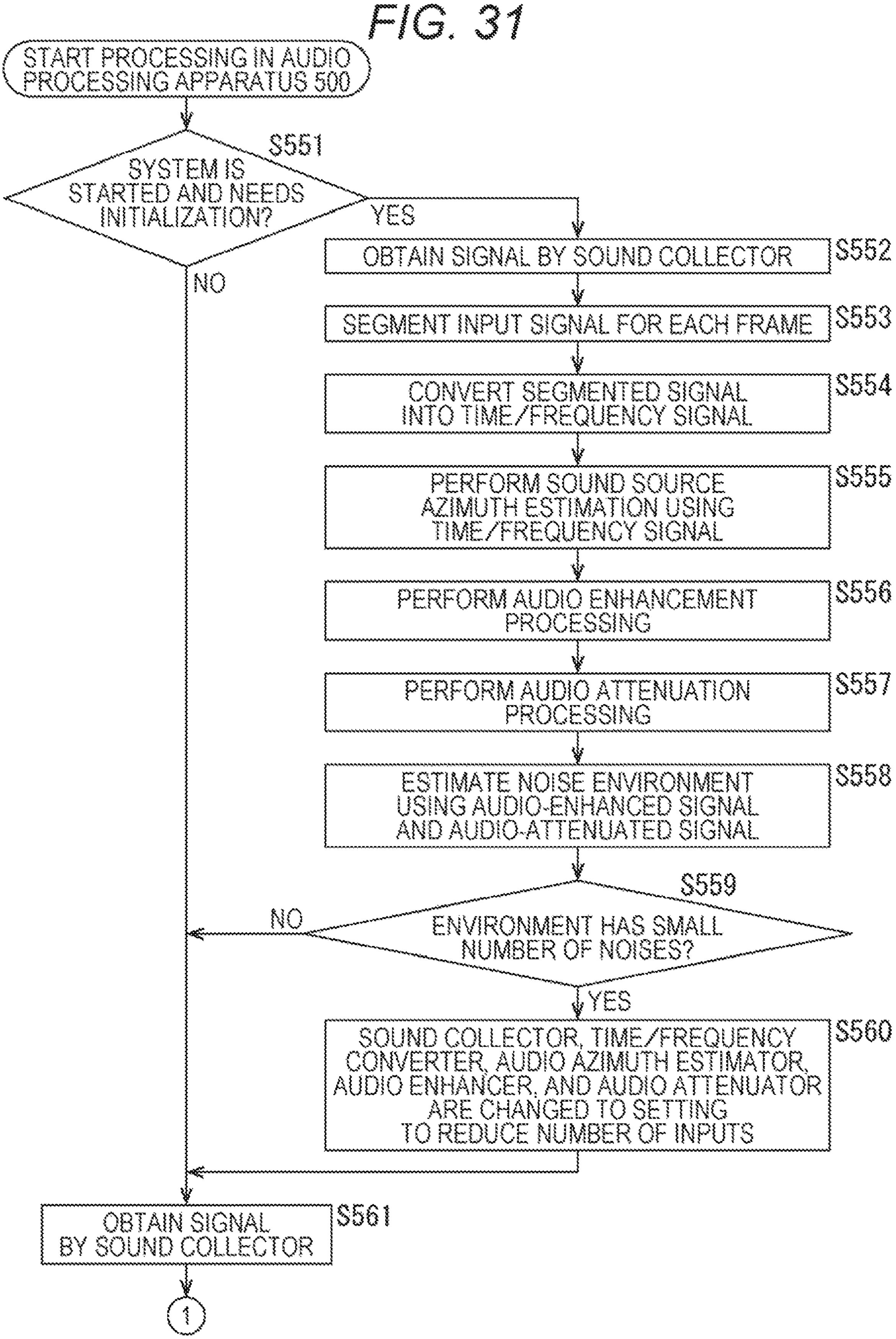
FIG. 31 is a flowchart explaining of another operation of the second (b) audio processing apparatus.
Figure 32:
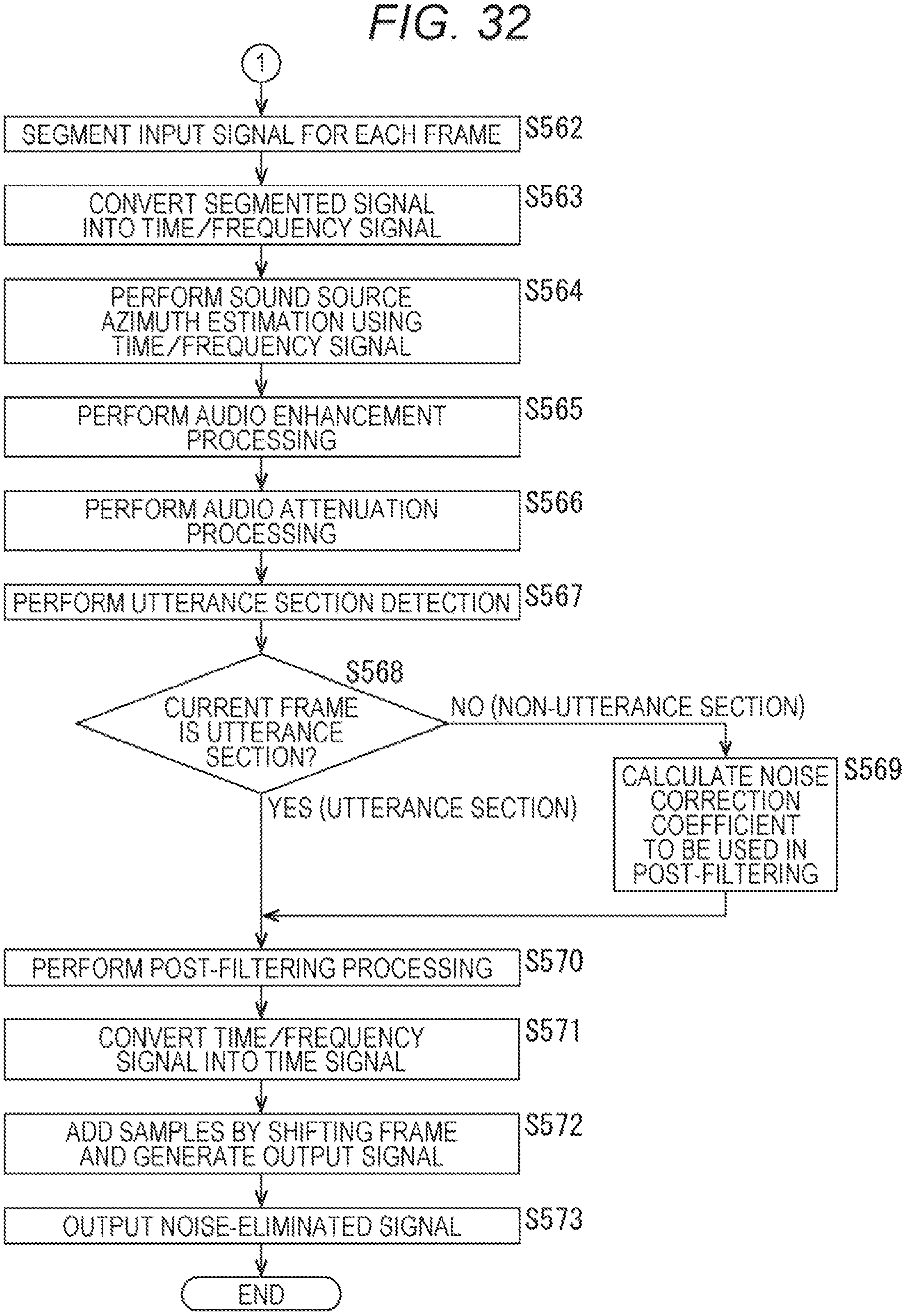
FIG. 32 is a flowchart explaining of the other operation of the second (b) audio processing apparatus.

The second operation of the third (b) audio processing apparatus 800 is an operation by combining the operation of the first (b) audio processing apparatus 200 (the operation based on the flowcharts illustrated in FIGS. 17 and 18) and the second operation of the second (b) audio processing apparatus 500 (the operation based on the flowcharts illustrated in FIGS. 31 and 32).

Steps S851 to S873 are performed basically similarly to steps S551 to S573 performed by the second (b) audio processing apparatus 500 illustrated in FIGS. 31 and 32.

In the third (b) audio processing apparatus 800 similarly to the second (b) audio processing apparatus 500, the settings in the processing component change instruction unit 710 are changed according to the noise environment at the time when the system is started. Thus, in the third (b) audio processing apparatus 800 similarly to the second (b) audio processing apparatus 500, it is possible to reduce the power consumption.

Furthermore, in the third (b) audio processing apparatus 800, the post-filtering unit 708 performs the post-filtering processing according to the noise environment in step S870. This processing is performed similarly to the processing performed by the first (b) audio processing apparatus 200 in step S211 (FIG. 18).

In the third (b) audio processing apparatus 800 similarly to the first (b) audio processing apparatus 200, the post-filtering unit 708 performs the post-filtering processing according to the noise environment. Thus, in the third (b) audio processing apparatus 800 similarly to the first (b) audio processing apparatus 200, it is possible to appropriately perform the noise eliminating processing according to the noise environment and prevent the generation of a musical noise or the like.

Furthermore, the audio processing apparatus 800 (FIG. 43) may have a configuration in which the buffer region (memory) is omitted, since it is not necessary to temporarily hold the signal in the time domain segmented in a frame for the noise environment estimation.

<Internal Configuration of Third (c) Audio Processing Apparatus>

Figure 48:
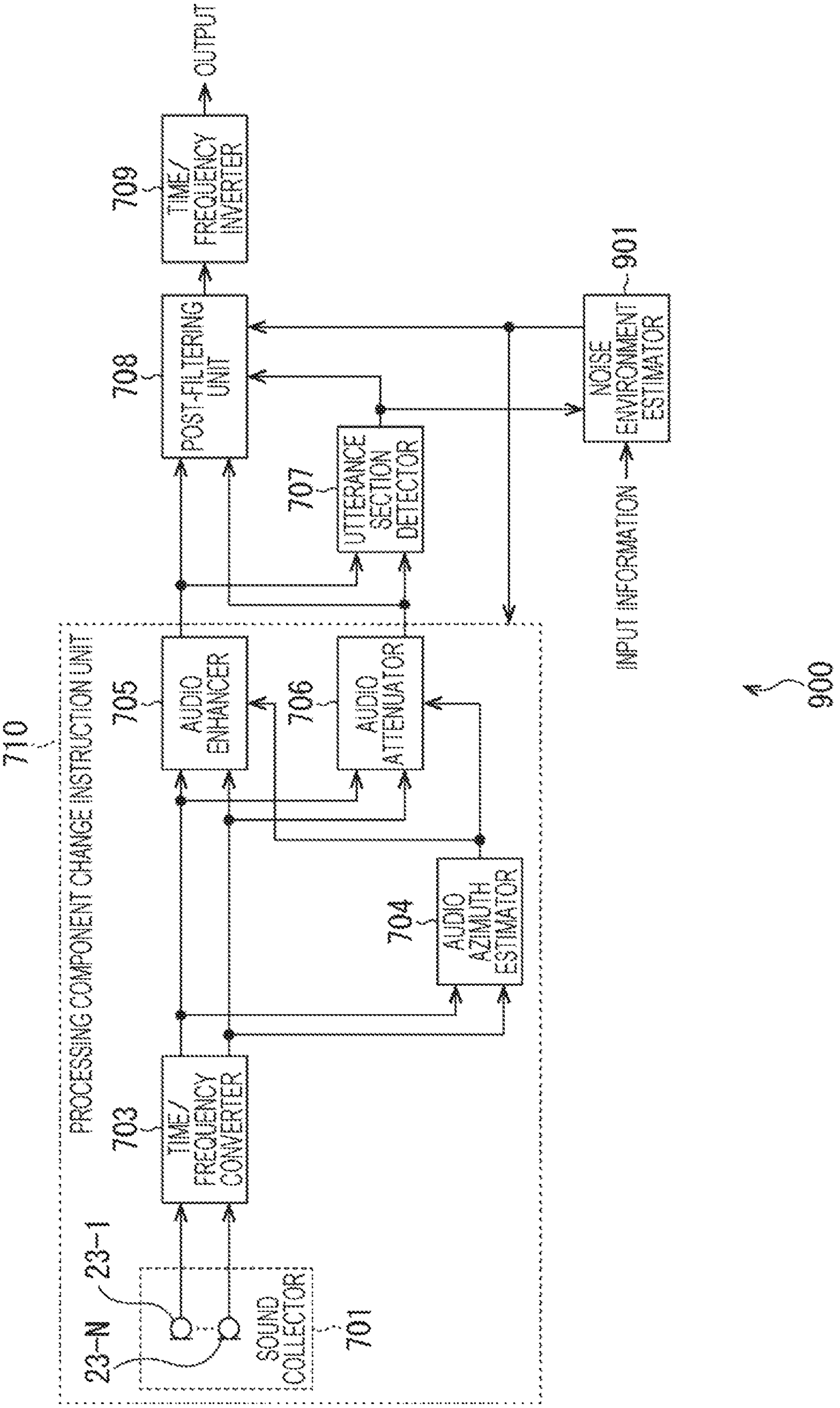
FIG. 48 is a diagram illustrating an internal configuration of a third (c) audio processing apparatus.

FIG. 48 is a diagram illustrating a configuration of a third (c) audio processing apparatus 900. The audio processing apparatus 900 is provided inside the mobile phone 10 and constitutes a part of the mobile phone 10. The third (c) audio processing apparatus 900 illustrated in FIG. 48 is configured by combining the above described first (c) audio processing apparatus 300 (FIG. 19) and second (c) audio processing apparatus 600 (FIG. 33).

Furthermore, in the third (c) audio processing apparatus 900 similarly to the above described third (a) audio processing apparatus 700, the internal configuration of the processing component change instruction unit 710 is changed according to the estimation result of the noise environment by the noise environment estimator 901.

Furthermore, the estimation result by the noise environment estimator 901 is also supplied to the post-filtering unit 708, and the post-filtering unit 708 is configured so as to control the strength of the noise elimination according to the estimated noise environment.

The noise environment estimator 901 estimates the noise environment on the basis of the information input externally.

<First Operation of Third (c) Audio Processing Apparatus>

Figure 49:
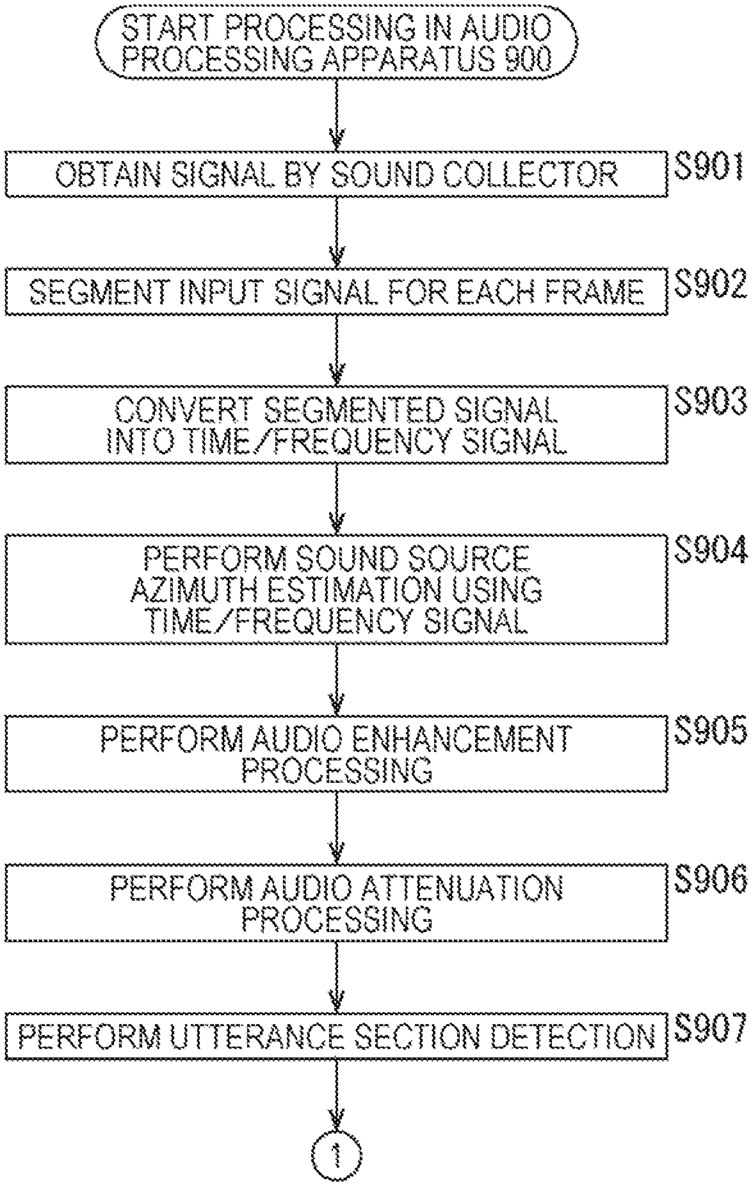
FIG. 49 is a flowchart explaining of an operation of the third (c) audio processing apparatus.
Figure 50:
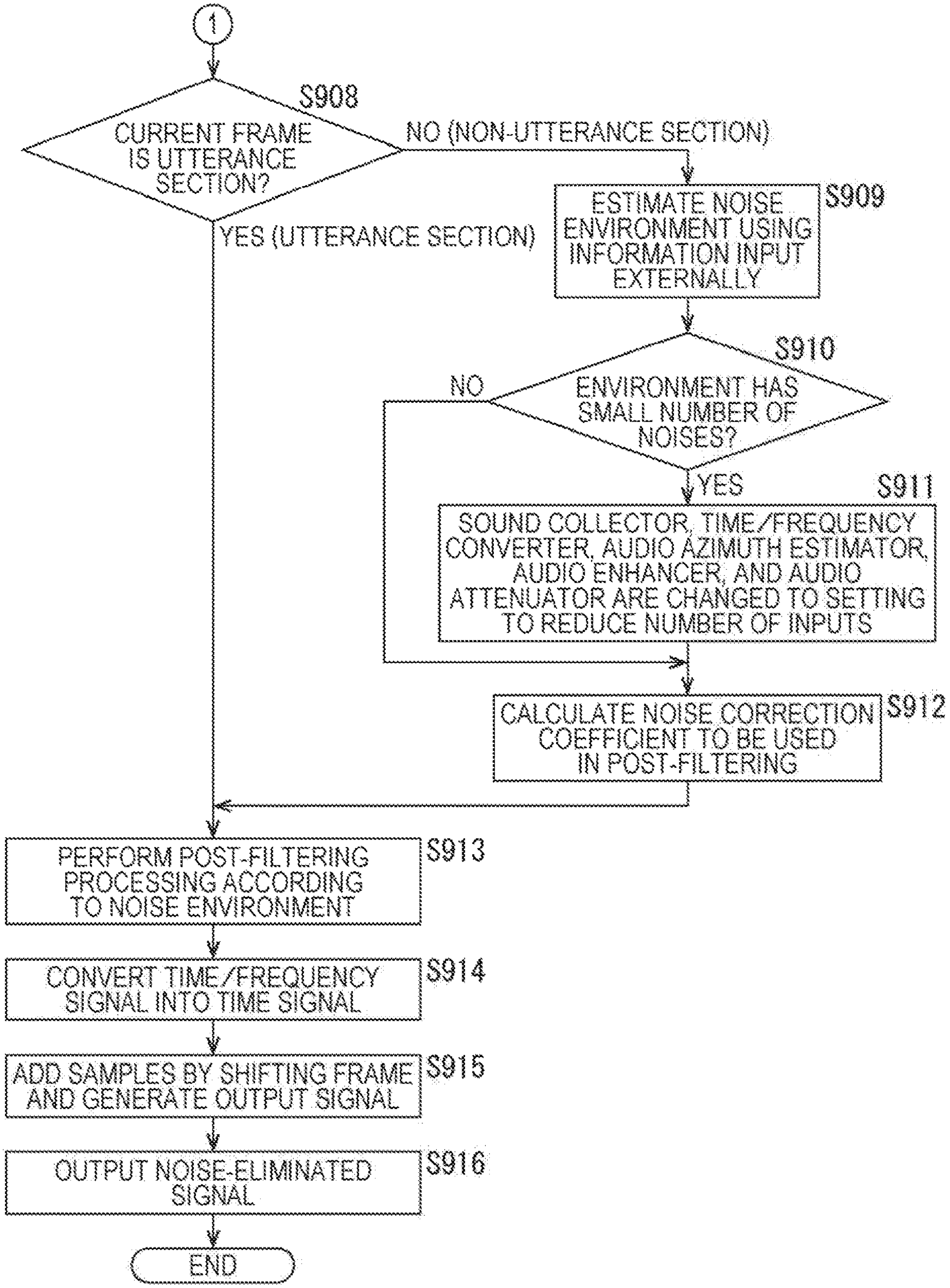
FIG. 50 is a flowchart explaining of the operation of the third (c) audio processing apparatus.

An operation of the audio processing apparatus 900 illustrated in FIG. 48 is described with reference to the flowcharts illustrated in FIGS. 49 and 50.

Figure 34:
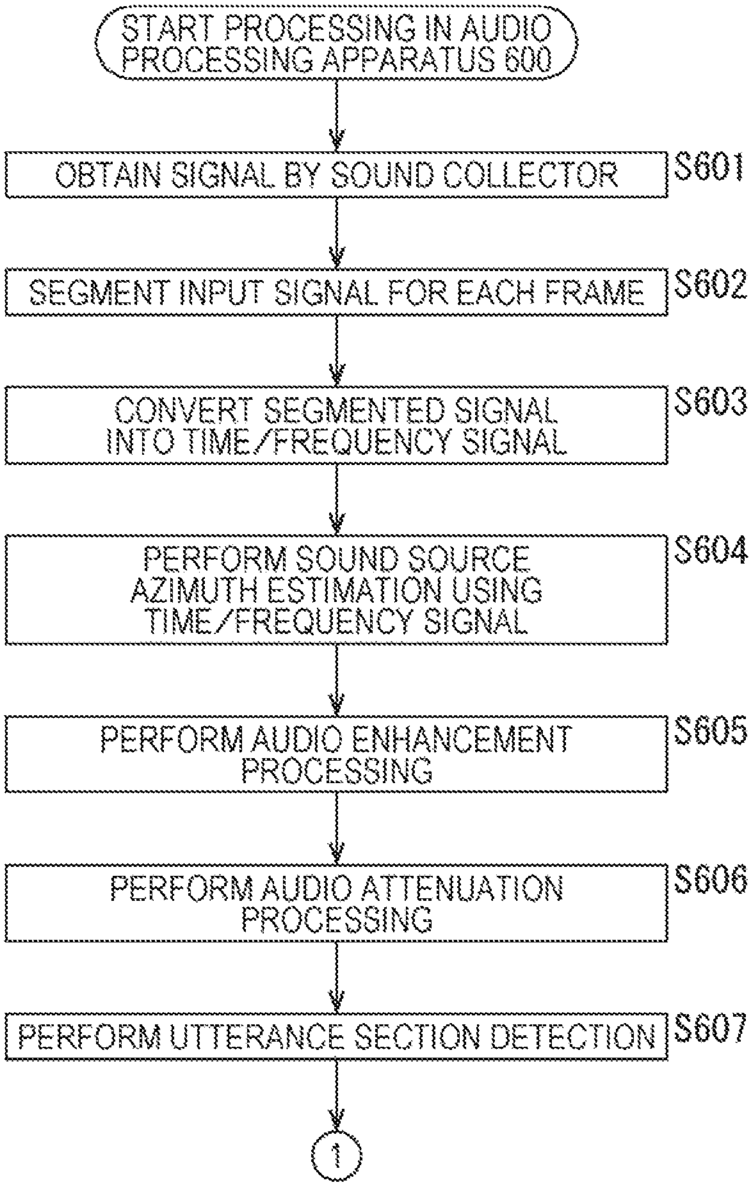
FIG. 34 is a flowchart explaining of an operation of the second (c) audio processing apparatus.

The audio processing apparatus 900 is configured by combining the first (c) audio processing apparatus 300 and the second (c) audio processing apparatus 600 as described above, and the operation thereof is an operation combing the operation of the first (c) audio processing apparatus 300 (the operation based on the flowcharts illustrated in FIGS. 20 and 21) and the operation of the second (c) audio processing apparatus 600 (the operation based on the flowcharts illustrated in FIGS. 34 and 35).

Steps S901 to S916 are performed basically similarly to steps S601 to S616 performed by the second (c) audio processing apparatus 600 illustrated in FIGS. 34 and 35.

In the third (c) audio processing apparatus 900 similarly to the second (c) audio processing apparatus 600, the settings in the processing component change instruction unit 710 are changed according to the noise environment. Thus, in the third (c) audio processing apparatus 900 similarly to the second (c) audio processing apparatus 600, it is possible to reduce the power consumption.

In the third (c) audio processing apparatus 900, the post-filtering unit 708 performs the post-filtering processing according to the noise environment in step S913. This processing is performed similarly to the processing performed by the first (c) audio processing apparatus 300 in step S311 (FIG. 21).

In the third (c) audio processing apparatus 900 similarly to the first (c) audio processing apparatus 300, the post-filtering unit 708 performs the post-filtering processing according to the noise environment. Thus, in the third (c) audio processing apparatus 900 similarly to the first (c) audio processing apparatus 300, it is possible to appropriately perform the noise eliminating processing according to the noise environment and prevent the generation of a musical noise or the like.

Furthermore, the audio processing apparatus 900 (FIG. 48) may have a configuration in which the buffer region (memory) is omitted, since it is not necessary to temporarily hold the signal in the time domain segmented in a frame for the noise environment estimation.

<Second Operation of Third (c) Audio Processing Apparatus>

Figure 51:
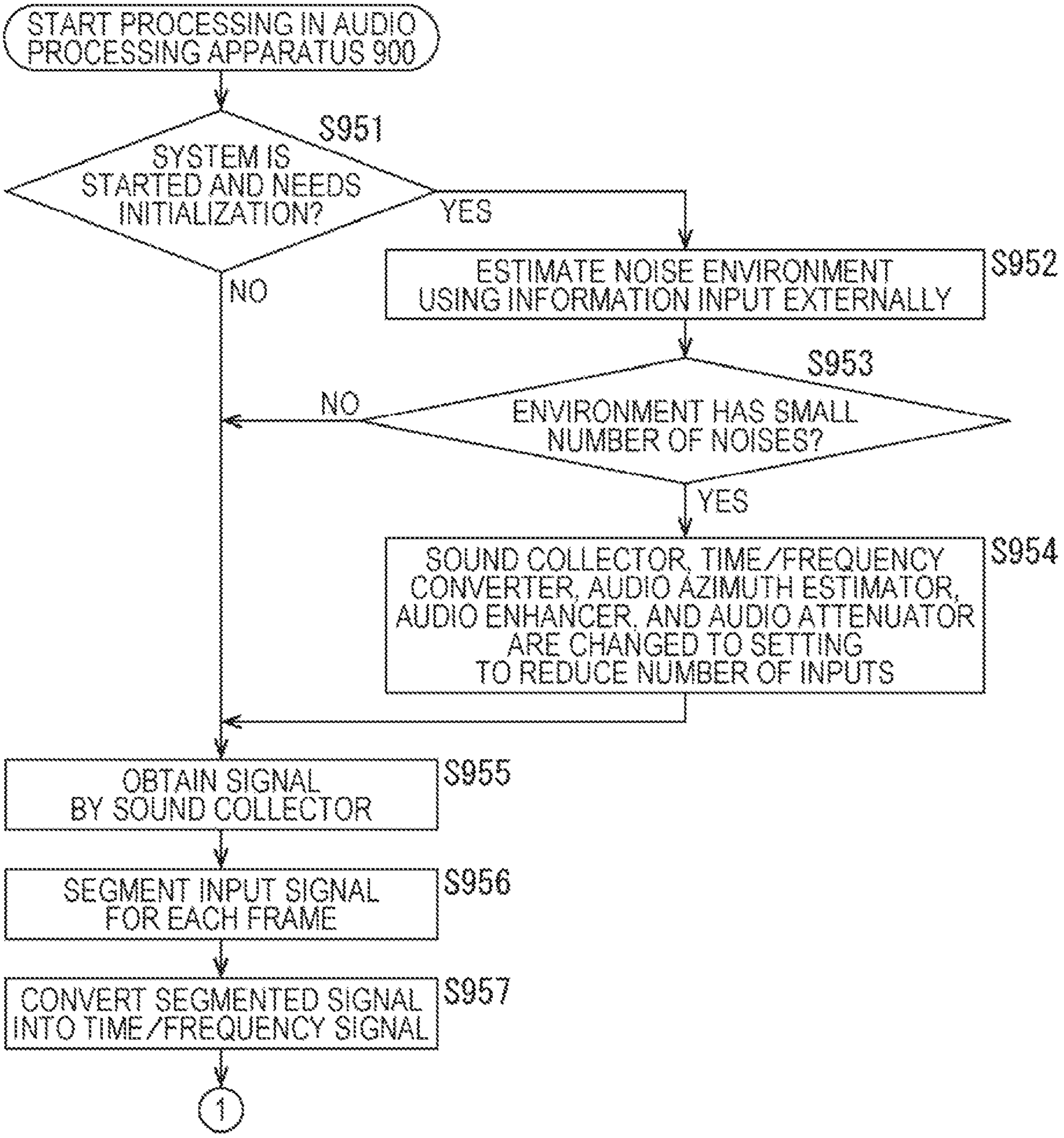
FIG. 51 is a flowchart explaining of another operation of the third (c) audio processing apparatus.
Figure 52:
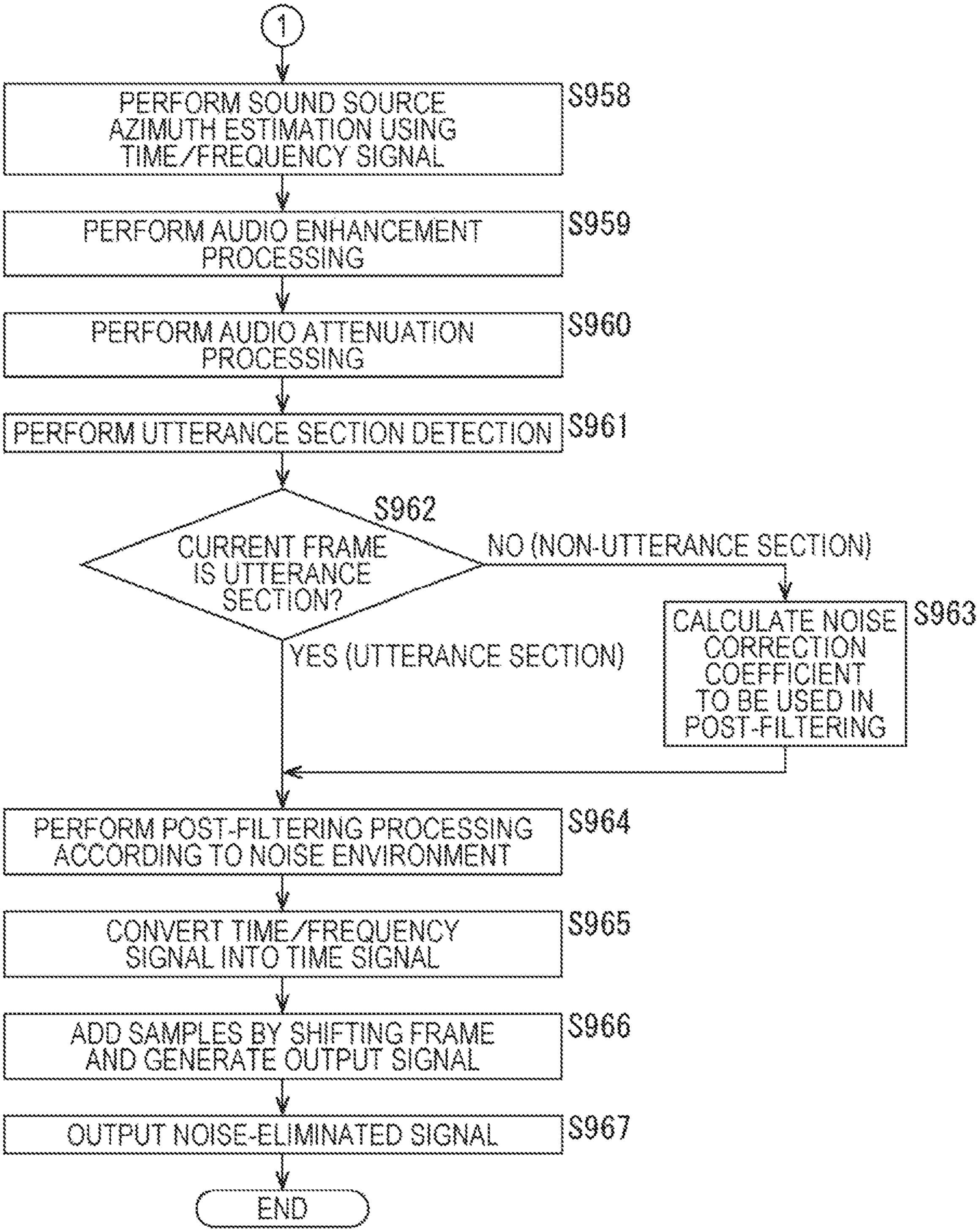
FIG. 52 is a flowchart explaining of the other operation of the third (c) audio processing apparatus.

Another operation of the audio processing apparatus 900 illustrated in FIG. 48 is described with reference to the flowcharts illustrated in FIGS. 51 and 52. The second operation of the third (c) audio processing apparatus 900 is an operation by combining the operation of the first (c) audio processing apparatus 300 (the operation based on the flowcharts illustrated in FIGS. 20 and 21) and the second operation of the second (c) audio processing apparatus 600 (the operation based on the flowcharts illustrated in FIGS. 36 and 37).

Figure 36:
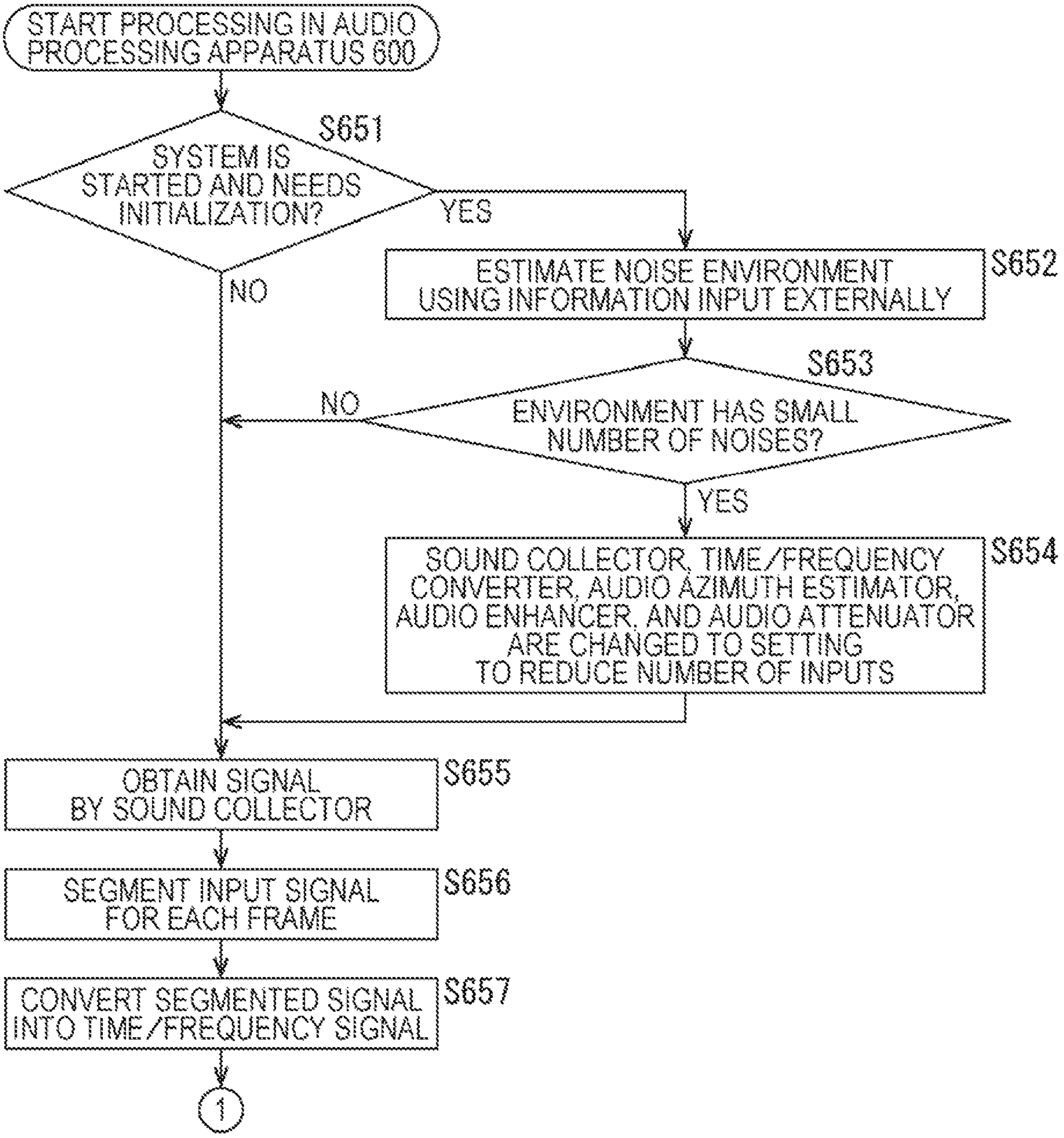
FIG. 36 is a flowchart explaining of another operation of the second (c) audio processing apparatus.
Figure 37:
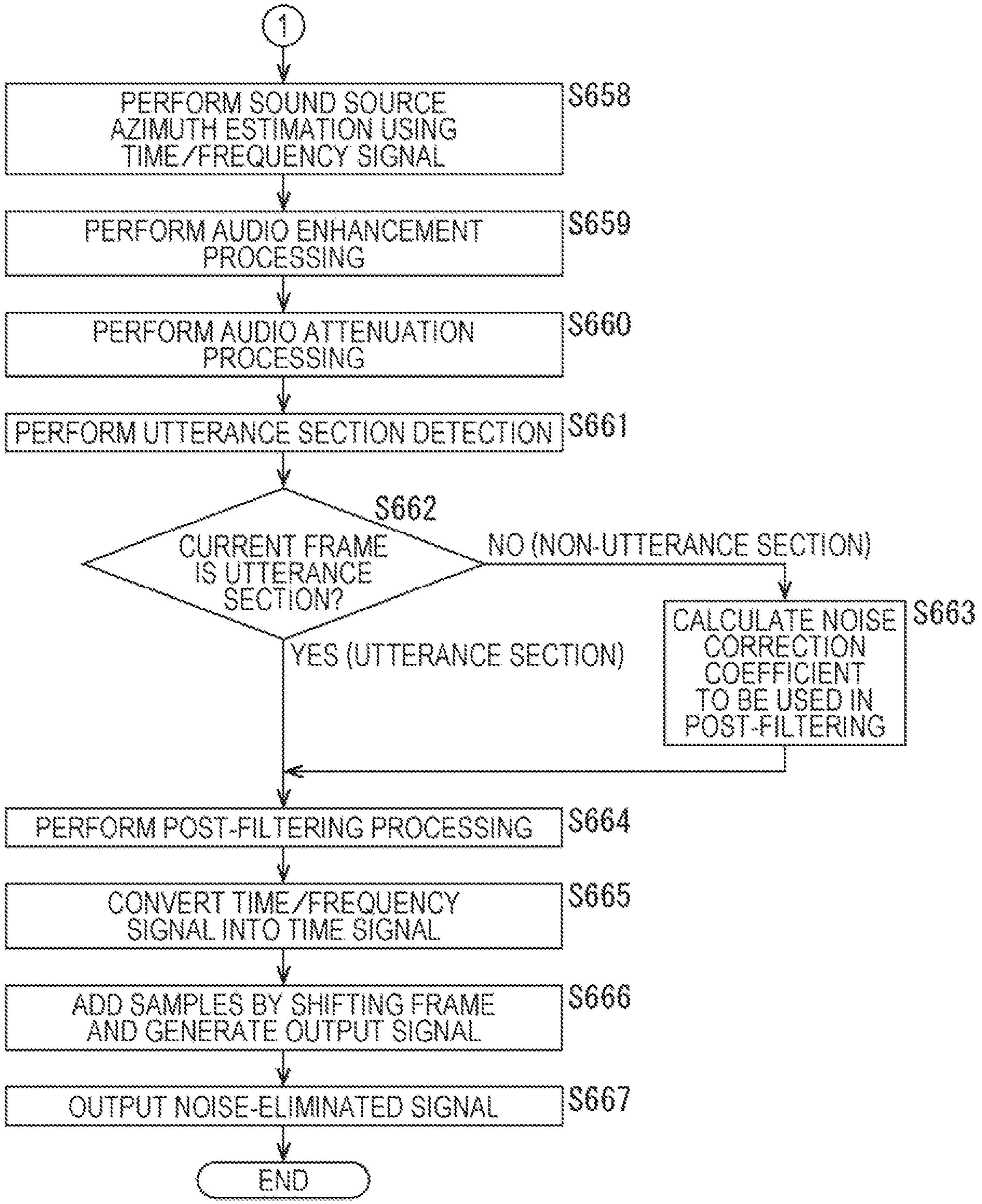
FIG. 37 is a flowchart explaining of the other operation of the second (c) audio processing apparatus.

Steps S951 to S967 are performed basically similarly to steps S651 to S667 performed by the second (c) audio processing apparatus 600 illustrated in FIGS. 36 and 37.

In the third (c) audio processing apparatus 900 similarly to the second (c) audio processing apparatus 600, the settings in the processing component change instruction unit 710 are changed according to the noise environment at the time when the system is started. Thus, in the third (c) audio processing apparatus 900 similarly to the second (c) audio processing apparatus 600, it is possible to reduce the power consumption.

Furthermore, in the third (c) audio processing apparatus 900, the post-filtering unit 708 performs the post-filtering processing according to the noise environment in step S964. This processing is performed similarly to the processing performed by the first (c) audio processing apparatus 300 in step S311 (FIG. 21).

In the third (c) audio processing apparatus 900 similarly to the first (c) audio processing apparatus 300, the post-filtering unit 708 performs the post-filtering processing according to the noise environment. Thus, in the third (c) audio processing apparatus 900 similarly to the first (c) audio processing apparatus 300, it is possible to appropriately perform the noise eliminating processing according to the noise environment and prevent the generation of a musical noise or the like.

Furthermore, the audio processing apparatus 900 (FIG. 48) may have a configuration in which the buffer region (memory) is omitted, since it is not necessary to temporarily hold the signal in the time domain segmented in a frame for the noise environment estimation.

In the above described audio processing apparatuses 100 to 900, the audio azimuth estimators 104, 404, and 704 and the operation to estimate the azimuth of audio may be omitted. For example, the case in which the audio processing apparatus to which the present technology is applied is applied to an eyeglasses-type terminal is described.

When a position of a microphone in the eyeglasses-type terminal is fixed, the positional relation between the user's mouth (sound source) and the microphone is not changed and substantially constant during the user mounts the eyeglasses-type terminal. In this case, since the azimuth of audio is substantially the same without estimating the azimuth, the audio azimuth estimator is removed and the audio processing apparatus may not estimate the azimuth of audio.

Although the above described audio processing apparatuses 100 to 900 are configured so that the processing in all the units is performed after the audio signal is converted into the time/frequency signal by the time/frequency converters 103, 403, and 703, the audio signal collected by the microphone 23 may be directly used without being converted into the time/frequency signal, and the processing in all the units may be performed. In other words, the time/frequency converters 103, 403, and 703 may be omitted, and the time/frequency inverters 109, 409, and 709 may be also omitted in this case.

According to the present technology, since the noise is estimated and the processing for the noise elimination is changed on the basis of the estimation result, the following effects can be obtained.

By applying the present technology, it is possible not only to appropriately perform the noise elimination under a situation in which there is one point sound source noise but also to perform the processing for optimal noise elimination under a plurality of sound sources or a diffusive noise environment.

Furthermore, it is possible to propagate natural audio in which the distortion peculiar to signal processing is suppressed and to achieve high-quality hands-free calling.

It is possible to prevent the deterioration of the performance of the audio recognition system due to the influence of the noise or processing distortion, and to implement a user interface using high-quality audio.

Furthermore, it is possible to prevent an event caused by false recognition in the audio recognition which a user does not intend, for example, abruptly making a telephone call, sending a mail, or the like.

It is possible to obtain the audio desired to be extracted only with a small non-directivity microphone and signal processing without using a directivity microphone having a large casing (a gun microphone), and to contribute to downsizing and lightweight of products.

It is possible to stop, according to the noise environment, the power source of signal processing modules and microphones which is unnecessary for sound extraction, and to contribute to low power consumption.

<Regarding Recording Medium>

The above described series of processing may be performed by hardware or software. When a series of processing is performed by software, a program constituting the software is installed in a computer. Here, the computer includes a computer embedded in dedicated hardware and a personal computer capable of performing various functions by installing various programs.

Figure 53:
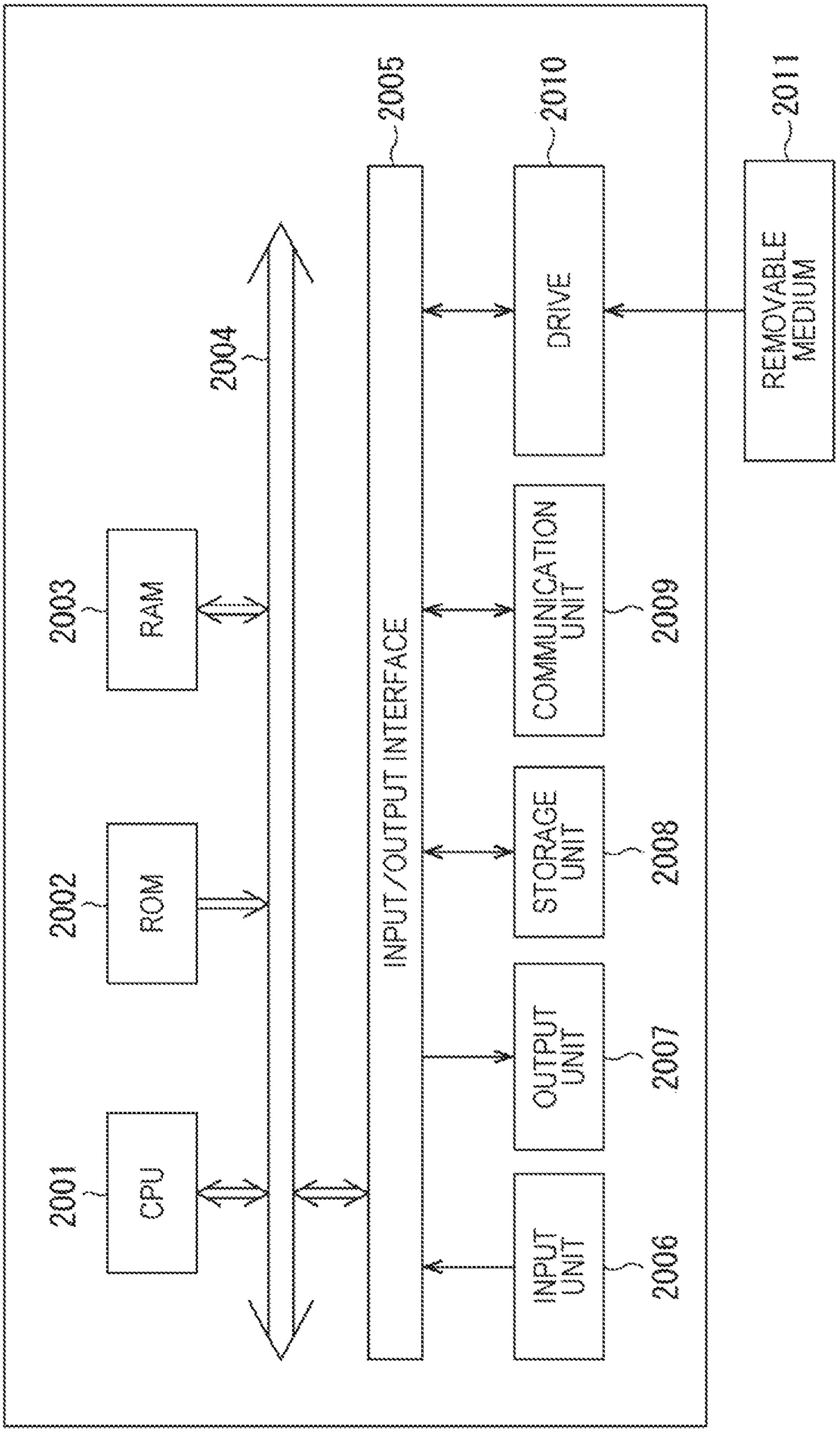
FIG. 53 is a diagram explaining a recording medium.

FIG. 53 is a block diagram illustrating a hardware configuration example of a computer which performs the above described series of processing by a program. In the computer, a central processing unit (CPU) 2001, a read-only memory (ROM) 2002, and a random-access memory (RAM) 2003 are connected with each other by a bus 2004. The bus 2004 is further connected to an input/output interface 2005. The input/output interface 2005 is connected with an input unit 2006, an output unit 2007, a storage unit 2008, a communication unit 2009, and a drive 2010.

The input unit 2006 includes a keyboard, a mouse, and a microphone. The output unit 2007 includes a display and a speaker. The storage unit 2008 includes a hard disk and a nonvolatile memory. The communication unit 2009 includes a network interface. The drive 2010 drives a removable medium 2011, such as a magnetic disc, an optical disc, a magneto-optical disc, or a semiconductor memory.

In the computer having the above configuration, the CPU 2001 loads a program stored in, for example, the storage unit 2008 into the RAM 2003 through the input/output interface 2005 and the bus 2004 and executes the program, and the above described series of processing is thereby performed.

The program executed by the computer (the CPU 2001) can be provided by being stored in the removable medium 2011 as, for example, a package media or the like. Furthermore, the program can be provided through a wired or wireless transmission media, such as a local area network, the internet, the digital satellite broadcasting.

In the computer, the program can be installed in the storage unit 2008 through the input/output interface 2005 by attaching the removable medium 2011 to the drive 2010. Furthermore, the program can be received by the communication unit 2009 through a wired or wireless transmission media and installed in the storage unit 2008. In addition to the above, the program can be pre-installed in the ROM 2002 or the storage unit 2008.

Note that, the program executed by the computer may be a program in which the processing is performed in the order described in the present specification in time series, or a program in which the processing is performed in parallel or at necessary timing, for example, when it is called.

Furthermore, a system in the present specification means an entire apparatus including a plurality of apparatuses.

Note that, the effects described in the present specification are merely exemplified and not limited, and there may be other effects.

Note that, embodiments of the present technology are not limited to the above described embodiments, and can be variously modified without departing from the scope of the present technology.

Note that, the present technology may have the following configurations:

(1)

An audio processing apparatus including:

a sound collector which collects audio;

an audio enhancer which enhances audio to be extracted using an audio signal collected by the sound collector;

an audio attenuator which attenuates the audio to be extracted using the audio signal collected by the sound collector;

a noise environment estimator which estimates a surrounding noise environment; and a post-filtering unit which performs post-filtering processing using an audio-enhanced signal from the audio enhancer and an audio-attenuated signal from the audio attenuator, in which the post-filtering unit sets strength of processing for noise elimination according to the noise environment by the noise environment estimator.

(2)

The audio processing apparatus according to (1), in which the noise environment estimator estimates the noise environment using the audio collected by the sound collector.

(3)

The audio processing apparatus according to (1), in which the sound collector includes a plurality of microphones, and the noise environment estimator calculates a correlation between signals collected by the plurality of microphones and sets a value of the correlation as an estimation result of the noise environment.

(4)

The audio processing apparatus according to (1), in which the noise environment estimator estimates the noise environment using the audio-enhanced signal and the audio-attenuated signal.

(5)

The audio processing apparatus according to (1), in which a correlation between an amplitude spectrum of the audio-enhanced signal and an amplitude spectrum of the audio-attenuated signal is calculated, and a value of the correlation is set as an estimation result of the noise environment.

(6)

The audio processing apparatus according to (1), in which the noise environment estimator estimates the noise environment on the basis of information input externally.

(7)

The audio processing apparatus according to (6), in which the information input externally is at least one piece of information of information on a surrounding noise environment supplied by a user, position information, or time information.

(8)

The audio processing apparatus according to any one of (1) to (7) further including:

an utterance section estimator which estimates an utterance section using the audio-enhanced signal and the audio-attenuated signal, in which the noise environment estimator estimates the noise environment in a section estimated as a non-utterance section by the utterance section estimator.

(9)

The audio processing apparatus according to any one of (1) to (8), in which the audio enhancer generates the audio-enhanced signal using addition-type beam forming, Delay and Sum beam forming, or adaptive beam forming.

(10)

The audio processing apparatus according to any one of (1) to (9), in which the audio attenuator generates the audio-attenuated signal using subtraction-type beam forming, Null beam forming, or adaptive Null beam forming.

(11)

The audio processing apparatus according to any one of (1) to (10), in which the number of microphones included in the sound collector and the number of inputs to the audio enhancer and the audio attenuator are changed on the basis of an estimation result by the noise environment estimator.

(12)

The audio processing apparatus according to (11), in which the change is performed during starting or operating.

(13)

An audio processing method including the steps of:

collecting audio by a sound collector;

generating an audio-enhanced signal in which audio to be extracted is enhanced using an audio signal collected by the sound collector;

generating an audio-attenuated signal in which the audio to be extracted is attenuated using the audio signal collected by the sound collector;

estimating a surrounding noise environment; and performing post-filtering processing using the audio-enhanced signal and the audio-attenuated signal, in which the post-filtering processing includes a step of setting strength of processing for noise elimination according to the estimated noise environment.

(14)

A program causing a computer to perform processing including the steps of:

collecting audio by a sound collector;

generating an audio-enhanced signal in which audio to be extracted is enhanced using an audio signal collected by the sound collector;

generating an audio-attenuated signal in which the audio to be extracted is attenuated using the audio signal collected by the sound collector;

estimating a surrounding noise environment; and performing post-filtering processing using the audio-enhanced signal and the audio-attenuated signal, in which the post-filtering processing includes a step of setting strength of processing for noise elimination according to the estimated noise environment.

REFERENCE SIGNS LIST

100 Audio processing apparatus
101 Sound collector
102 Noise environment estimator
103 Time/frequency converter
104 Audio azimuth estimator
105 Audio enhancer
106 Audio attenuator
107 Utterance section detector
108 Post-filtering unit
109 Time/frequency inverter
200 Audio processing apparatus
201 Noise environment estimator
300 Audio processing apparatus
301 Noise environment estimator
400 Audio processing apparatus
402 Noise environment estimator
410 Processing component change instruction unit
500 Audio processing apparatus
501 Noise environment estimator
600 Audio processing apparatus
601 Noise environment estimator
700 Audio processing apparatus
702 Noise environment estimator
800 Audio processing apparatus
801 Noise environment estimator
900 Audio processing apparatus
901 Noise environment estimator

The invention claimed is:

1. An audio processing apparatus, comprising:

a sound collector configured to collect audio, wherein the collected audio includes a plurality of audio signals;

an audio azimuth estimator configured to estimate a direction of a sound source, of the collected audio, with respect to the sound collector;

an audio enhancer configured to enhance specific audio from the collected audio based on the plurality of audio signals and the direction of the sound source to generate an audio-enhanced signal;

an audio attenuator configured to attenuate the specific audio based on the plurality of audio signals and the direction of the sound source to generate an audio-attenuated signal;

an utterance section estimator configured to estimate an utterance section of the collected audio based on the direction of the sound source estimated by the audio azimuth estimator, the audio-enhanced signal from the audio enhancer, and the audio-attenuated signal from the audio attenuator;

a noise environment estimator configured to calculate a correlation coefficient of a correlation between the plurality of audio signals of the collected audio based on the estimation of the utterance section;

first circuitry configured to reduce a number of inputs, of the collected audio, to each of the audio azimuth estimator, the audio enhancer, and the audio attenuator based on the correlation coefficient that exceeds a threshold value; and second circuitry configured to:

filter the audio-enhanced signal from the audio enhancer;

filter the audio-attenuated signal from the audio attenuator; and set a strength of a process for noise elimination from the collected audio, wherein the strength of the process for the noise elimination is set based on the correlation coefficient.

2. The audio processing apparatus according to claim 1, wherein the sound collector comprises a plurality of microphones, and the noise environment estimator is further configured to estimate surrounding noise environment based on a value of the correlation coefficient.

3. The audio processing apparatus according to claim 2, wherein the noise environment estimator is further configured to:

calculate a correlation between an amplitude spectrum of the audio-enhanced signal and an amplitude spectrum of the audio-attenuated signal; and set a value of the correlation between the amplitude spectrum of the audio-enhanced signal and an amplitude spectrum of the audio-attenuated signal as an estimation result of the surrounding noise environment.

4. The audio processing apparatus according to claim 2, wherein the utterance section estimator is further configured to estimate a non-utterance section of the collected audio, and the noise environment estimator is further configured to estimate the surrounding noise environment in the non-utterance section.

5. The audio processing apparatus according to claim 1, wherein the noise environment estimator is further configured to calculate the correlation coefficient based on the audio-enhanced signal and the audio-attenuated signal.

6. The audio processing apparatus according to claim 1, wherein the noise environment estimator is further configured to calculate the correlation coefficient based on information input externally.

7. The audio processing apparatus according to claim 6, wherein the information input externally is one of:

at least one piece of information on surrounding noise environment supplied based on a user operation, position information, or time information.

8. The audio processing apparatus according to claim 1, wherein the audio enhancer is further configured to generate the audio-enhanced signal based on one of an addition-type beam formation, a Delay and Sum beam formation, or an adaptive beam formation.

9. The audio processing apparatus according to claim 1, wherein the audio attenuator is further configured to generate the audio-attenuated signal based on one of a subtraction-type beam formation, a Null beam formation, or an adaptive Null beam formation.

10. The audio processing apparatus according to claim 1, wherein the number of inputs is reduced one of at start of the audio processing apparatus or in operation of the audio processing apparatus.

11. An audio processing method, comprising:

collecting audio by a sound collector, wherein the collected audio includes a plurality of audio signals;

estimating, by an audio azimuth estimator, a direction of a sound source of the collected audio, with respect to the sound collector;

enhancing, by an audio enhancer, specific audio from the collected audio based on the plurality of audio signals and the direction of the sound source to generate an audio-enhanced signal;

attenuating, by an audio attenuator, the specific audio from the collected audio based on the plurality of audio signals and the direction of the sound source to generate an audio-attenuated signal;

estimating an utterance section of the collected audio, based on the direction of the sound source estimated by the audio azimuth estimator, the audio-enhanced signal, and the audio-attenuated signal;

calculating a correlation coefficient of a correlation between the plurality of audio signals of the collected audio based on the estimation of the utterance section;

reducing a number of inputs, of the collected audio, to each of the audio azimuth estimator, the audio enhancer, and the audio attenuator based on the correlation coefficient that exceeds a threshold value; and executing a post-filtering process based on the audio-enhanced signal and the audio-attenuated signal, wherein the post-filtering process comprises setting a strength of a process for noise elimination from the collected audio, and the strength of the process for the noise elimination is set based on the correlation coefficient.

12. A non-transitory computer-readable medium having stored thereon computer-executable instructions that, when executed by a computer, cause the computer to perform operations, the operations comprising:

collecting audio by a sound collector, wherein the collected audio includes a plurality of audio signals;

estimating, by an audio azimuth estimator, a direction of a sound source of the collected audio, with respect to the sound collector;

enhancing, by an audio enhancer, specific audio from the collected audio based on the plurality of audio signals and the direction of the sound source to generate an audio-enhanced signal;

attenuating, by an audio attenuator, the specific audio from the collected audio based on the plurality of audio signals and the direction of the sound source to generate an audio-attenuated signal;

estimating an utterance section of the collected audio based on the direction of the sound source estimated by the audio azimuth estimator, the audio-enhanced signal, and the audio-attenuated signal;

calculating a correlation coefficient of a correlation between the plurality of audio signals of the collected audio based on the estimation of the utterance section;

reducing a number of inputs, of the collected audio, to each of the audio azimuth estimator, the audio enhancer, and the audio attenuator based on the correlation coefficient being greater than a threshold value; and executing a post-filtering process based on the audio-attenuated signal and the audio-attenuated signal, wherein the post-filtering process comprises setting a strength of a process for noise elimination from the collected audio, and the strength of the process for the noise elimination is set based on the correlation coefficient.

* * * * *